April 16, 1963 W. R. MILLER, JR., ET AL 3,085,311
AUTOMATED RAILROAD WHEEL SHOP
Filed May 13, 1959 28 Sheets-Sheet 1

INVENTORS
WILLIAM R. MILLER, JR.
PETER HOLD
BY FRANCIS E. COMPTON
GEORGE B. ANDERSON

ATTORNEYS

INVENTORS
WILLIAM R. MILLER, JR.
PETER HOLD
BY FRANCIS E. COMPTON
GEORGE B. ANDERSON
ATTORNEYS

INVENTORS
WILLIAM R. MILLER, JR.
PETER HOLD
FRANCIS E. COMPTON
GEORGE B. ANDERSON
ATTORNEYS

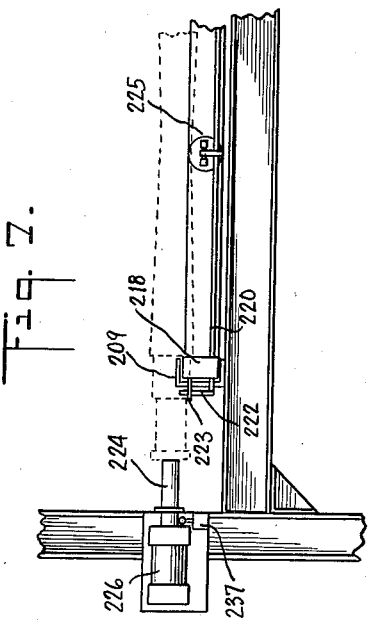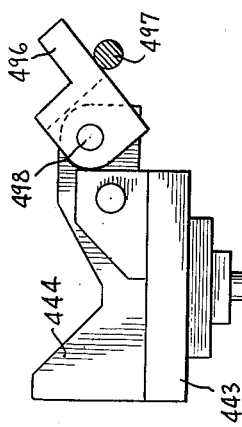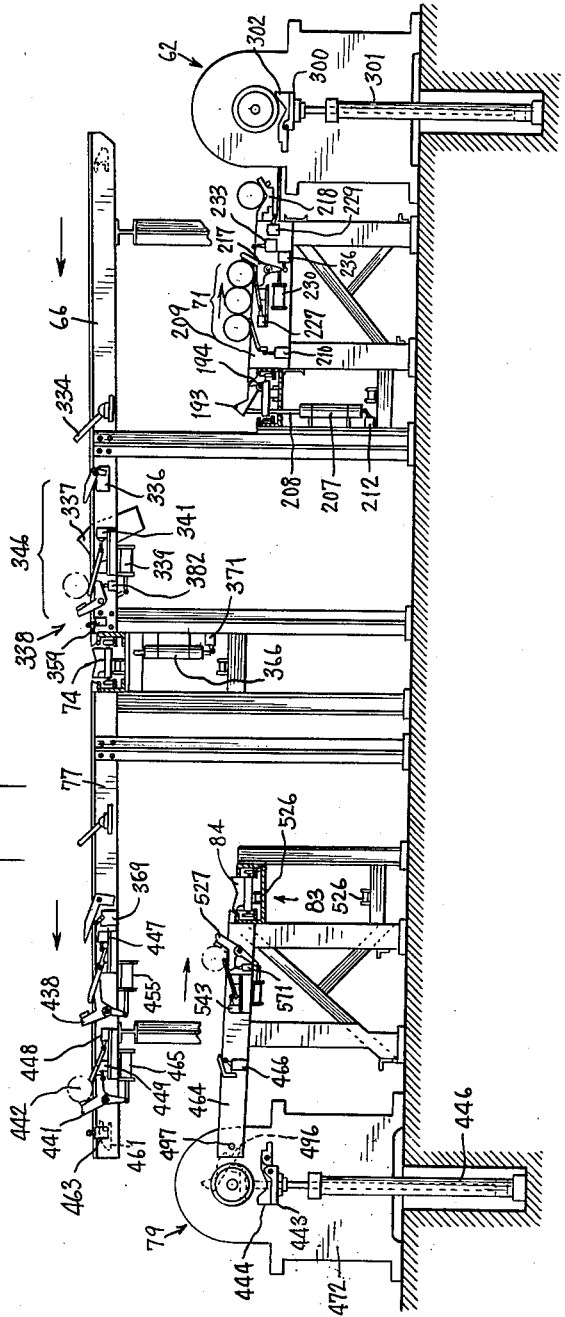

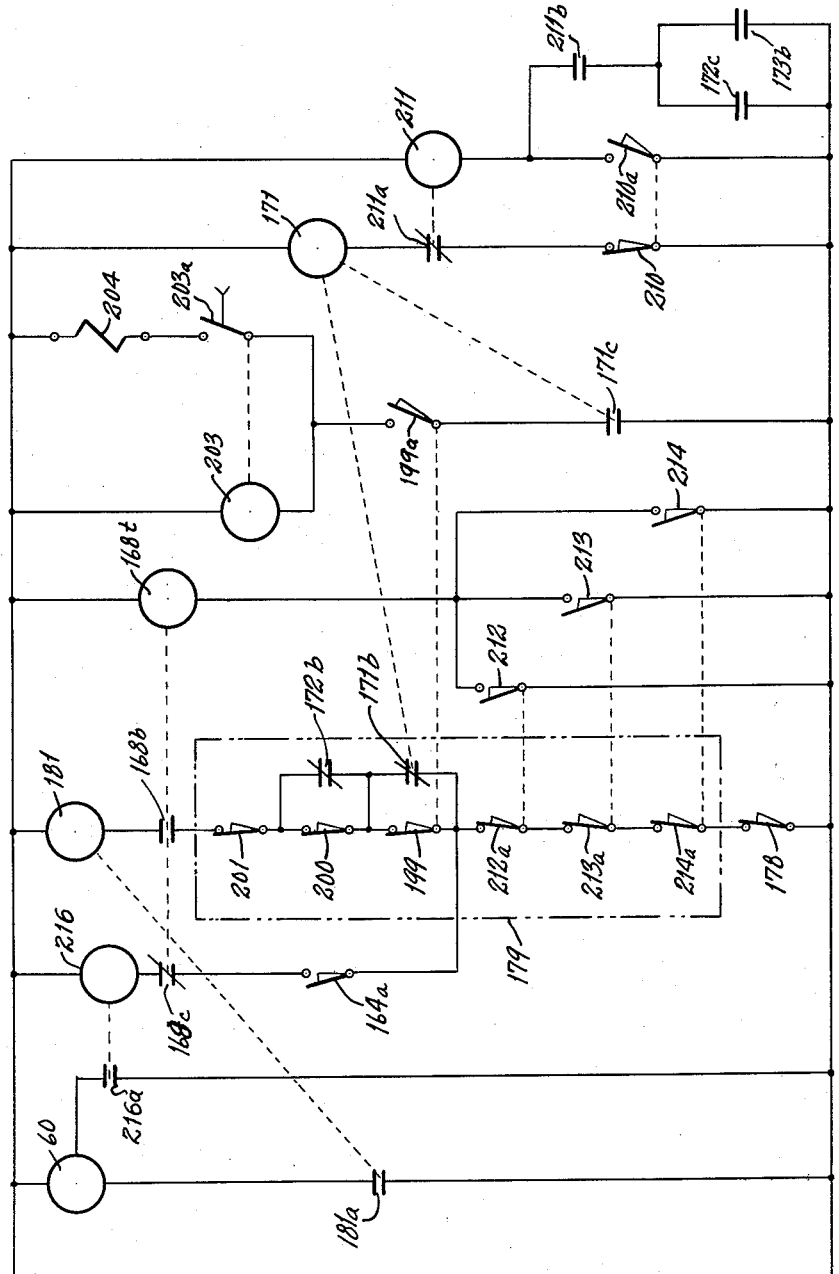

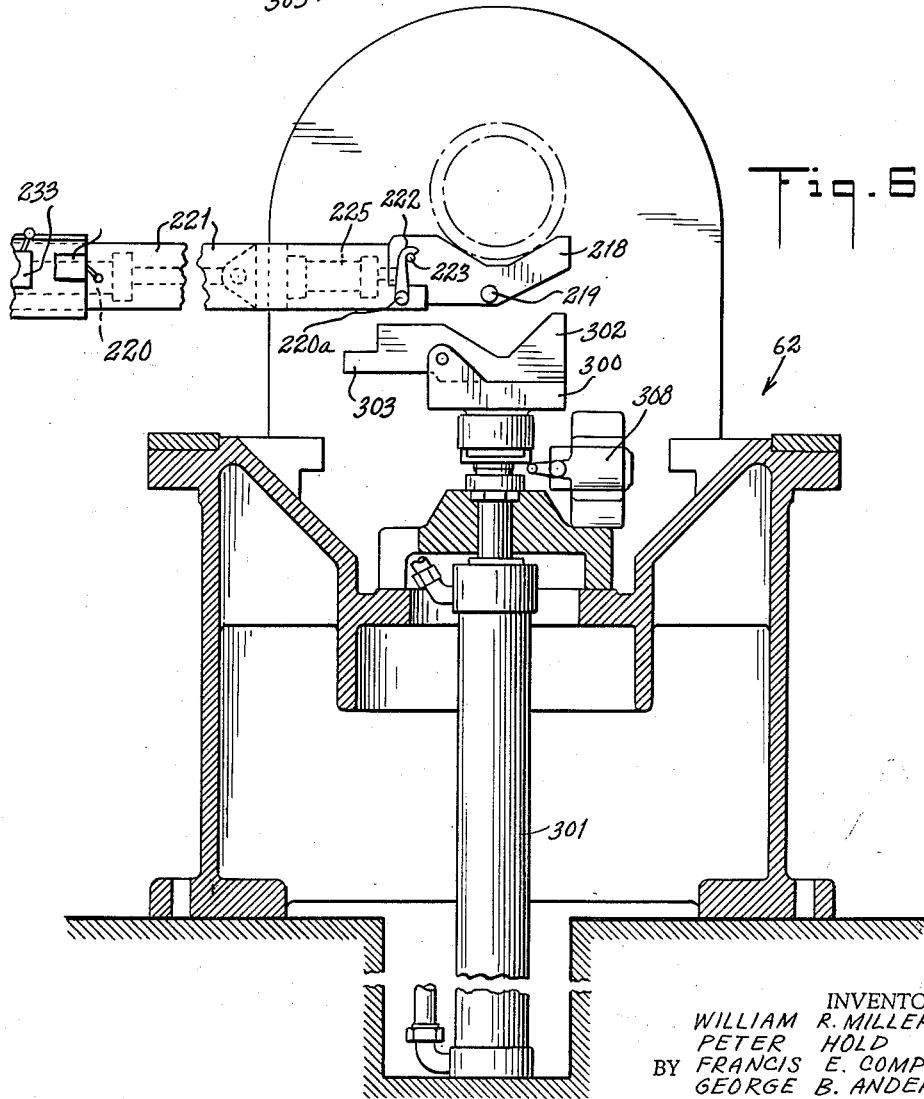

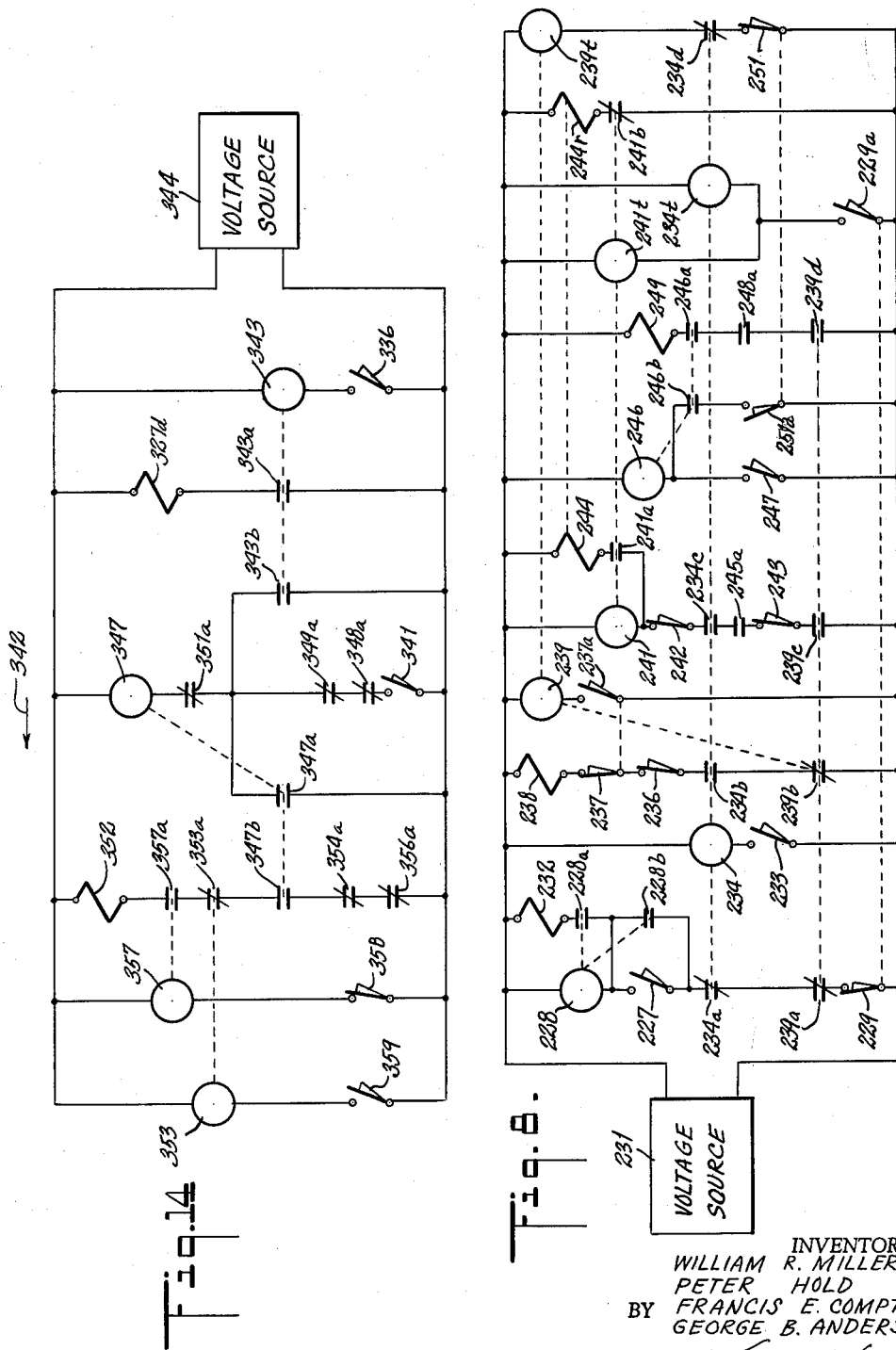

April 16, 1963  W. R. MILLER, JR., ET AL  3,085,311
AUTOMATED RAILROAD WHEEL SHOP
Filed May 13, 1959  28 Sheets-Sheet 8
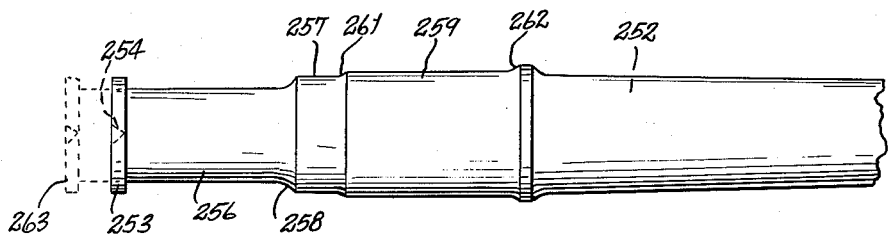
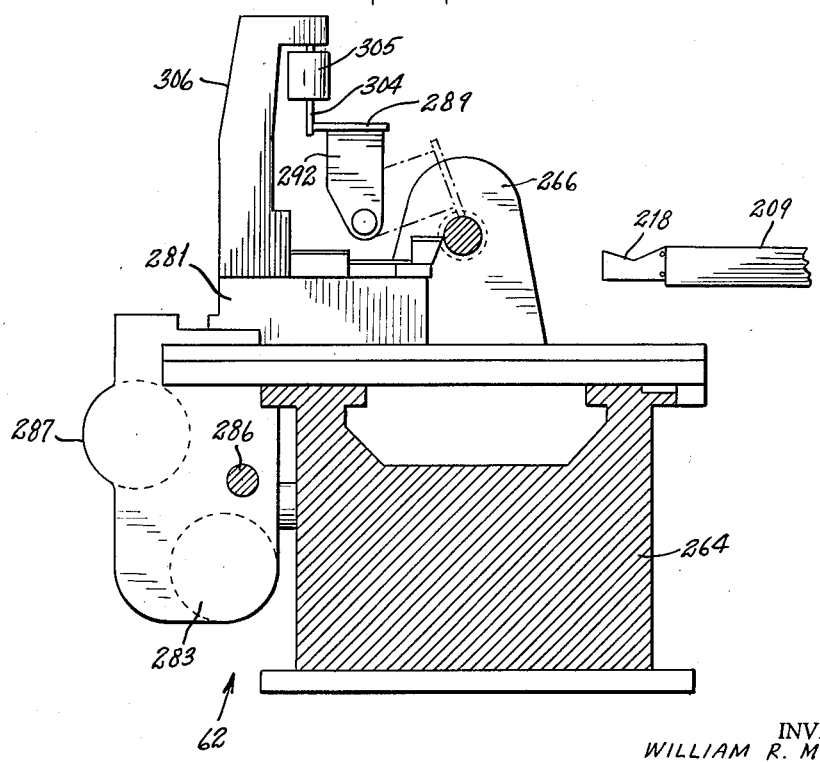
INVENTORS
WILLIAM R. MILLER, JR.
PETER HOLD
BY FRANCIS E. COMPTON
GEORGE B. ANDERSON
*Tenyon & Tenyon*
ATTORNEYS

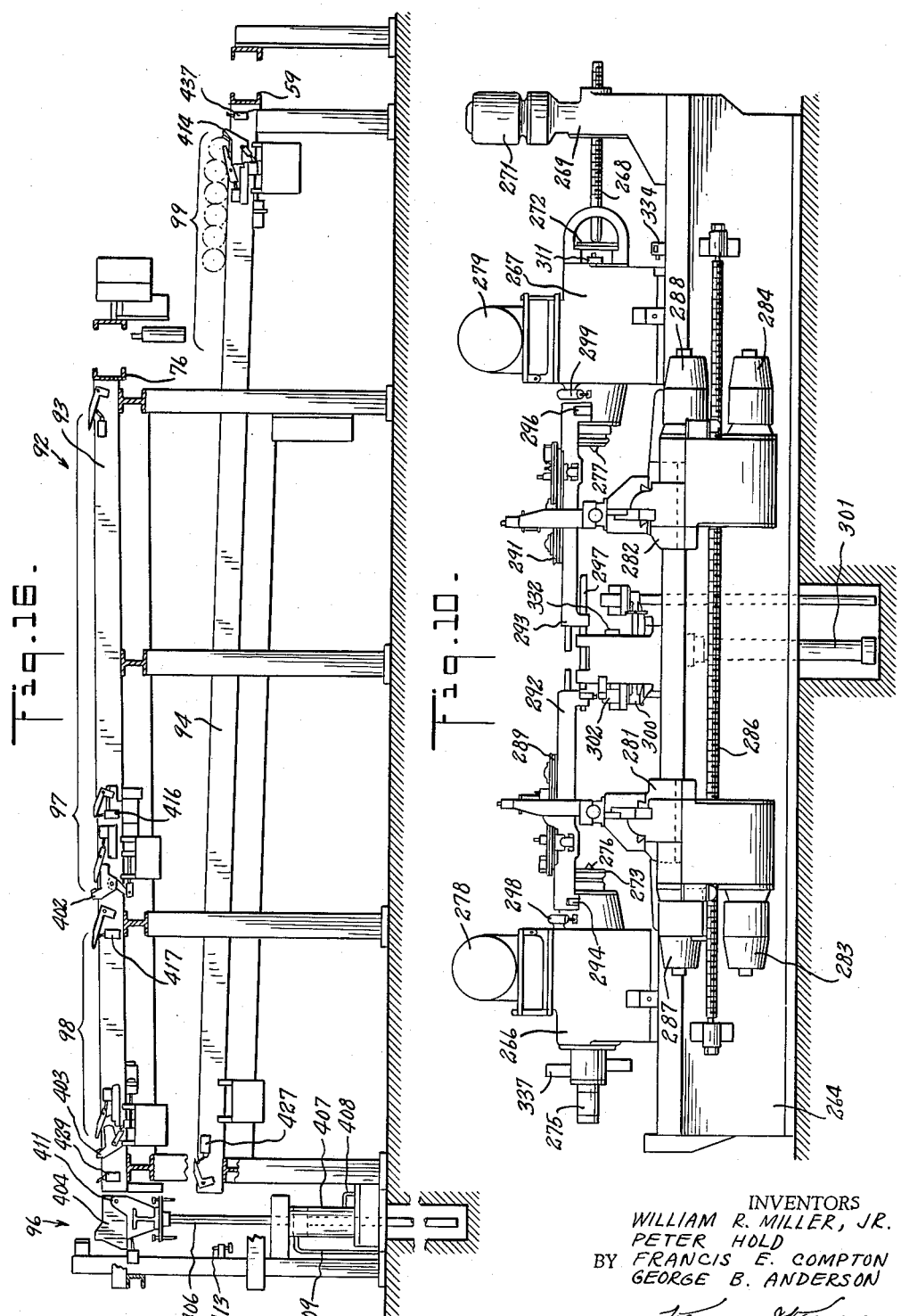

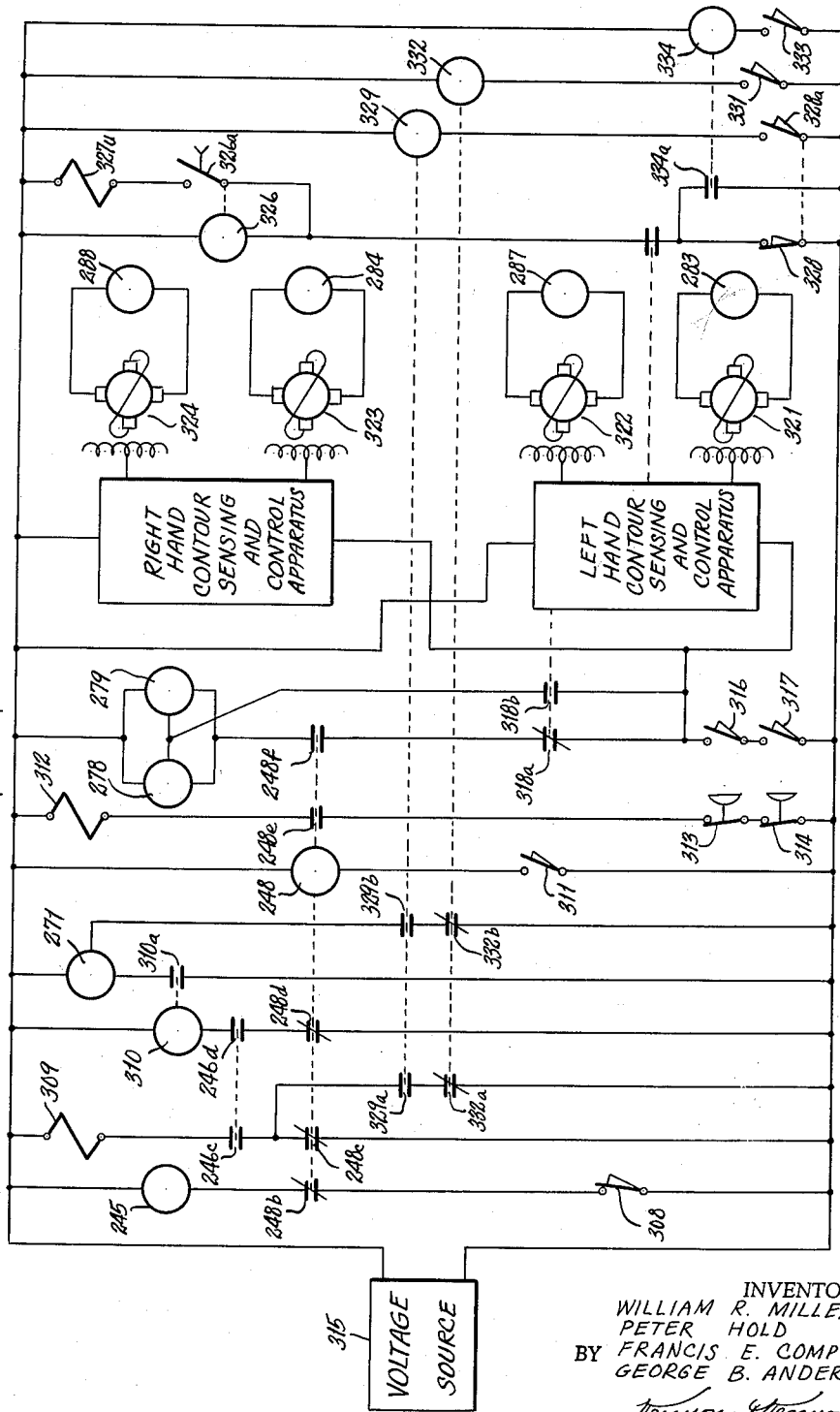

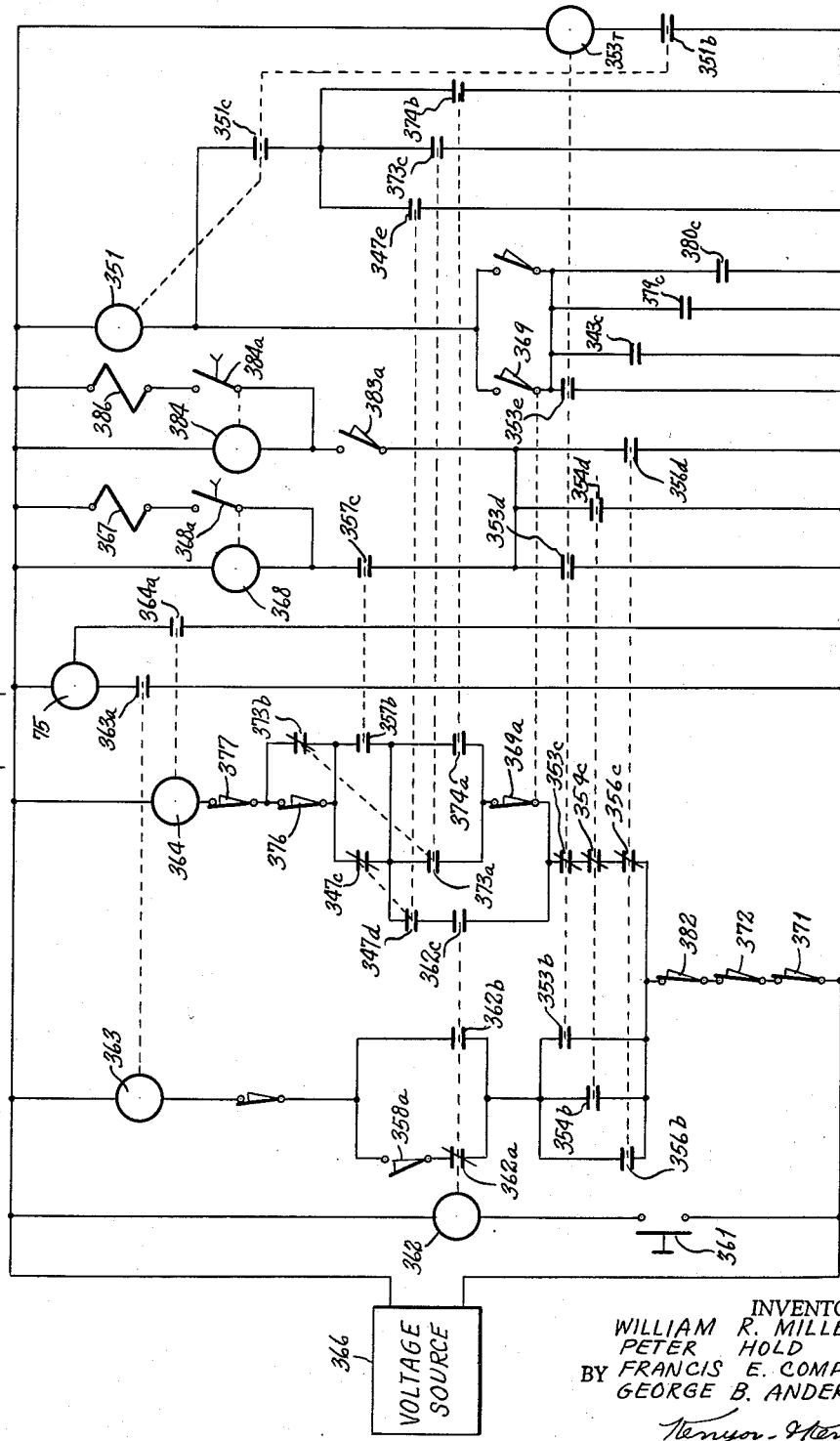

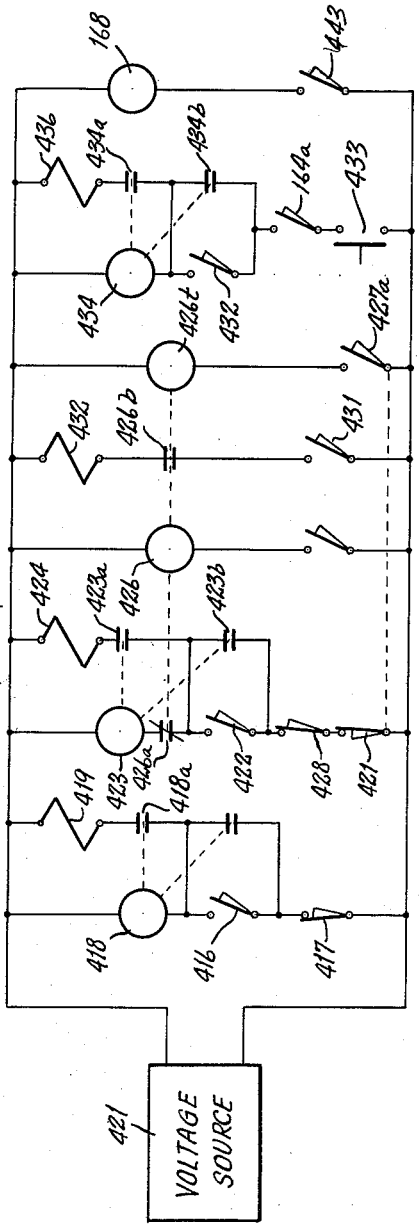

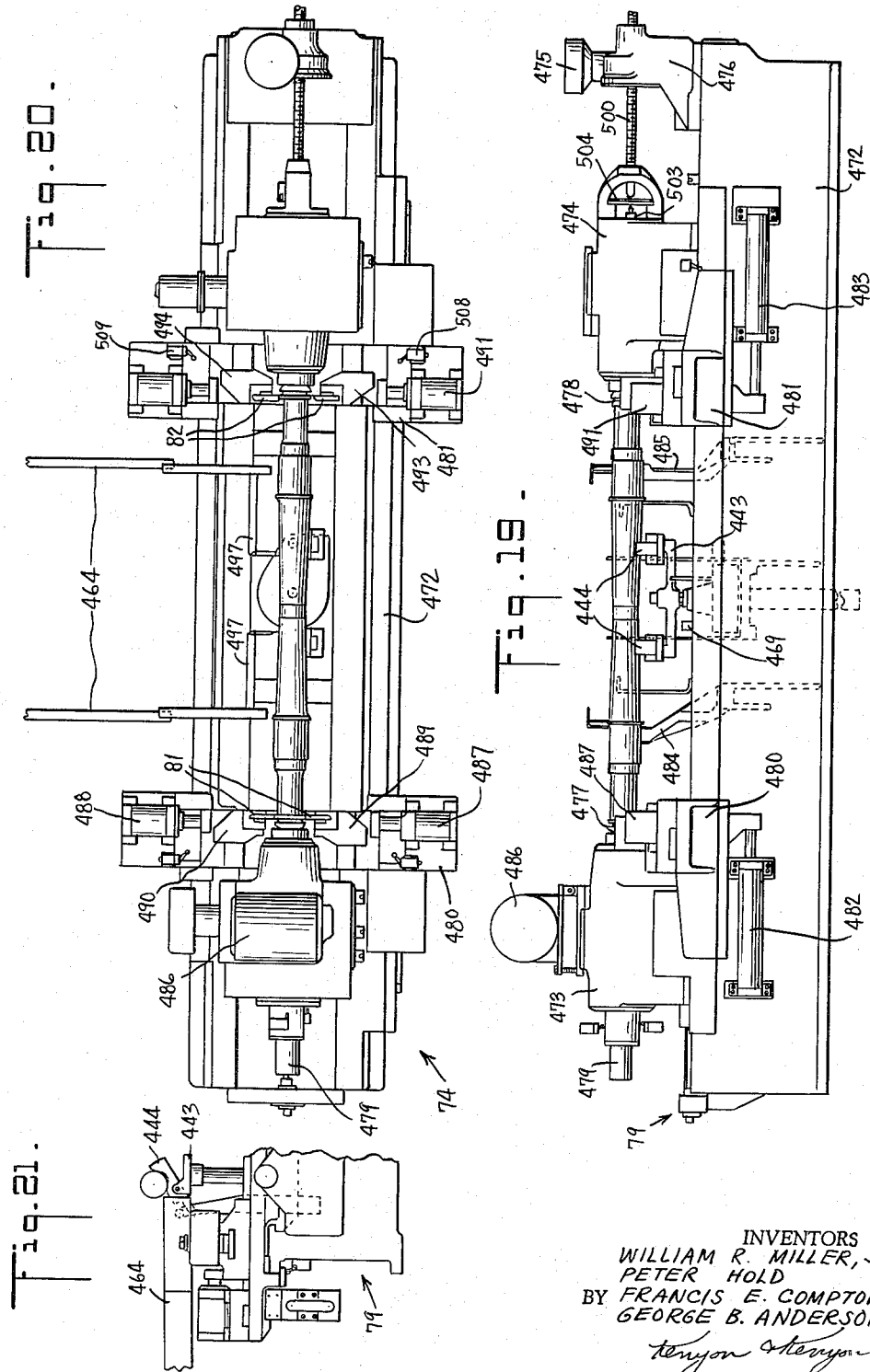

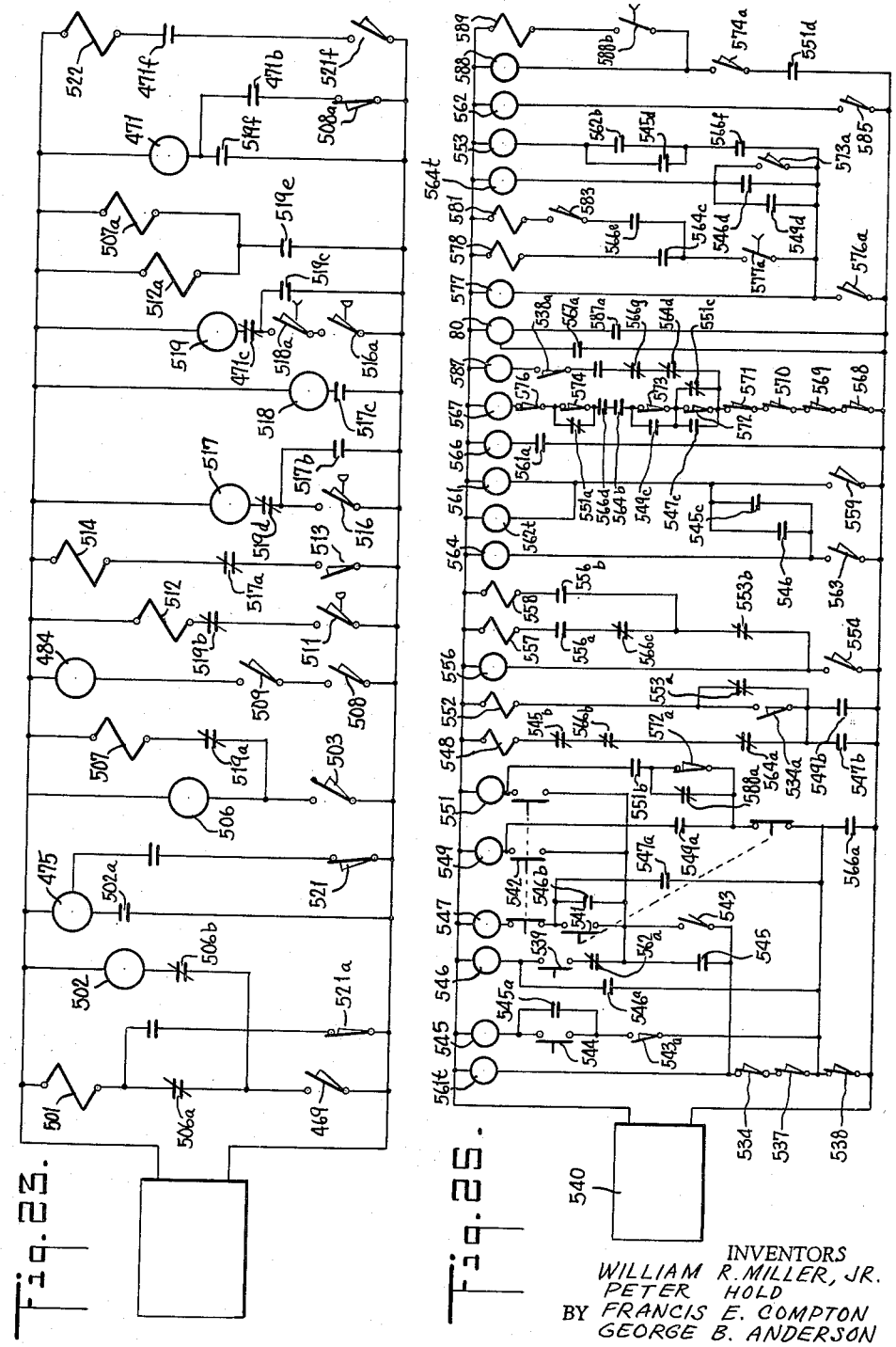

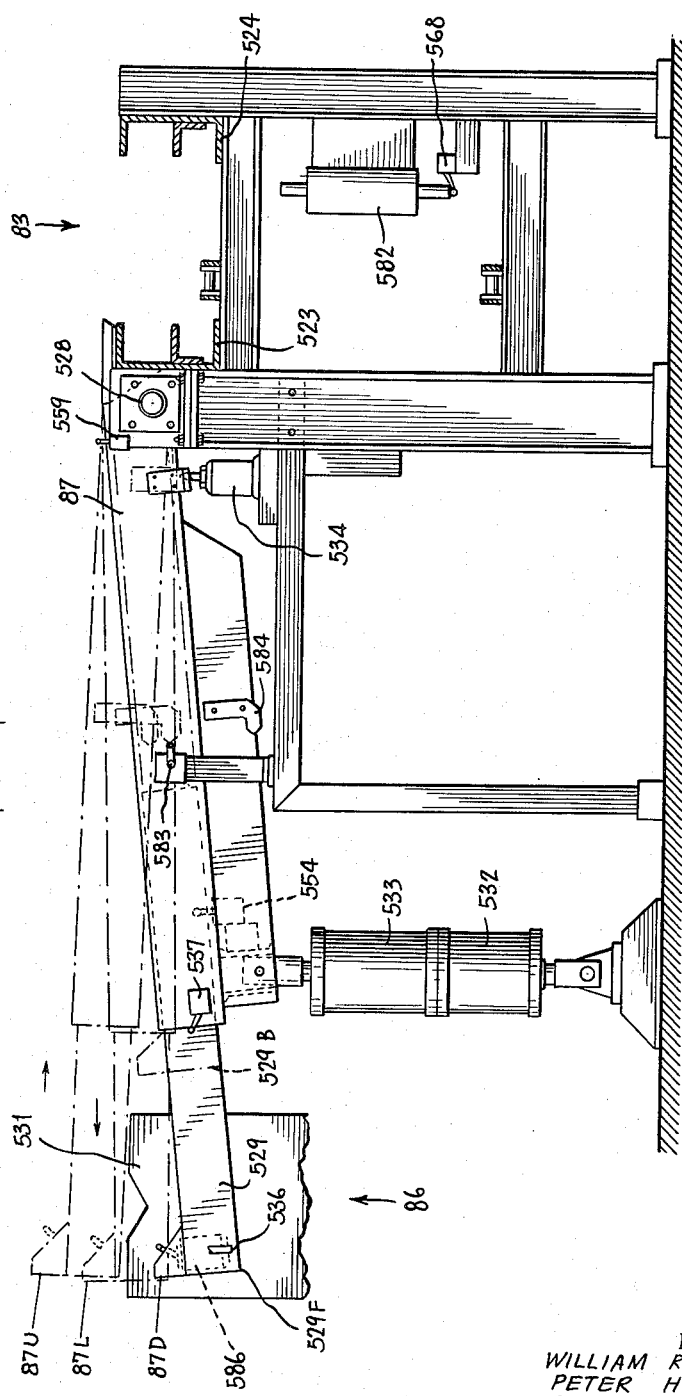

INVENTORS
WILLIAM R. MILLER, JR.
PETER HOLD
BY FRANCIS E. COMPTON
GEORGE B. ANDERSON

ATTORNEYS

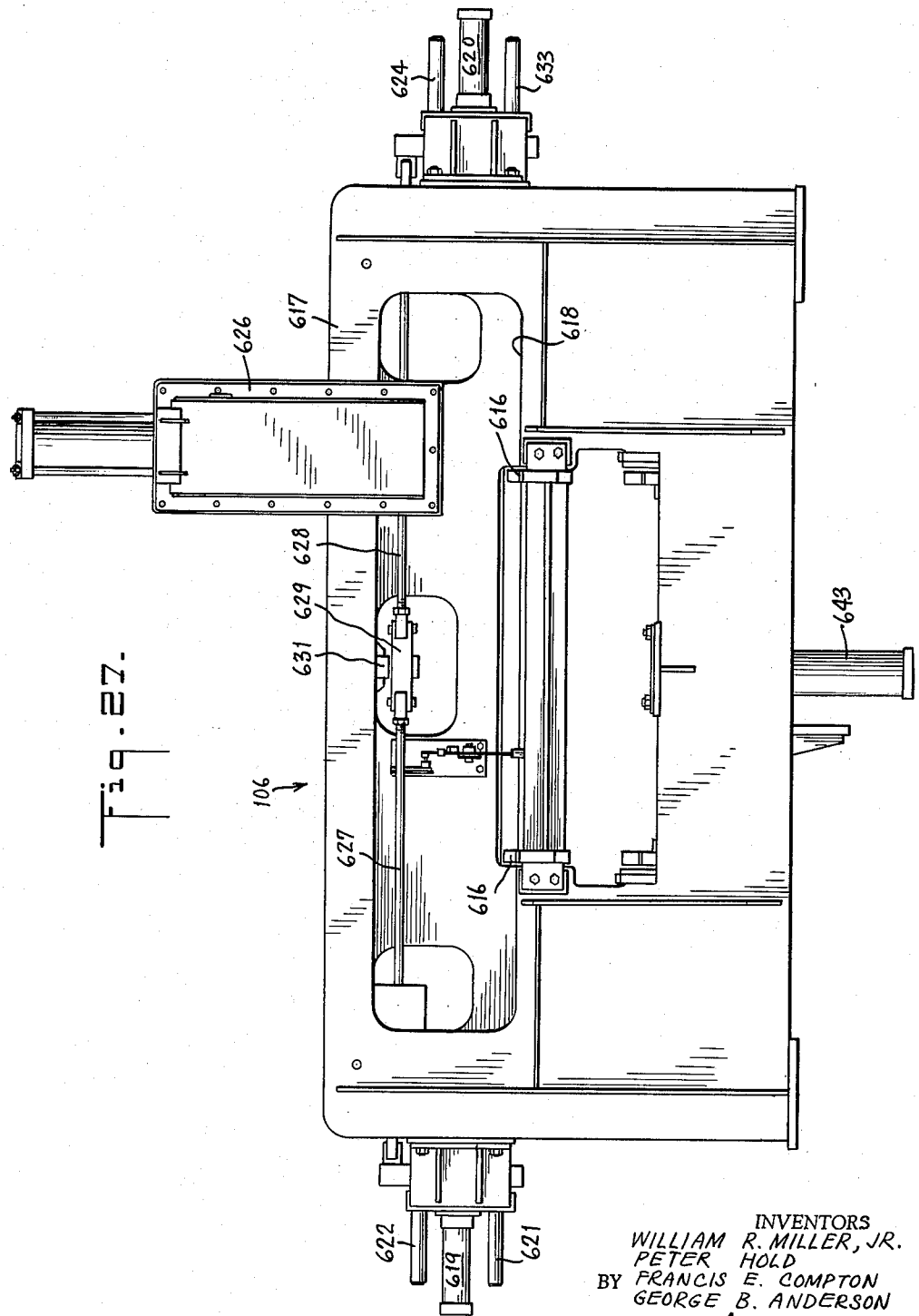

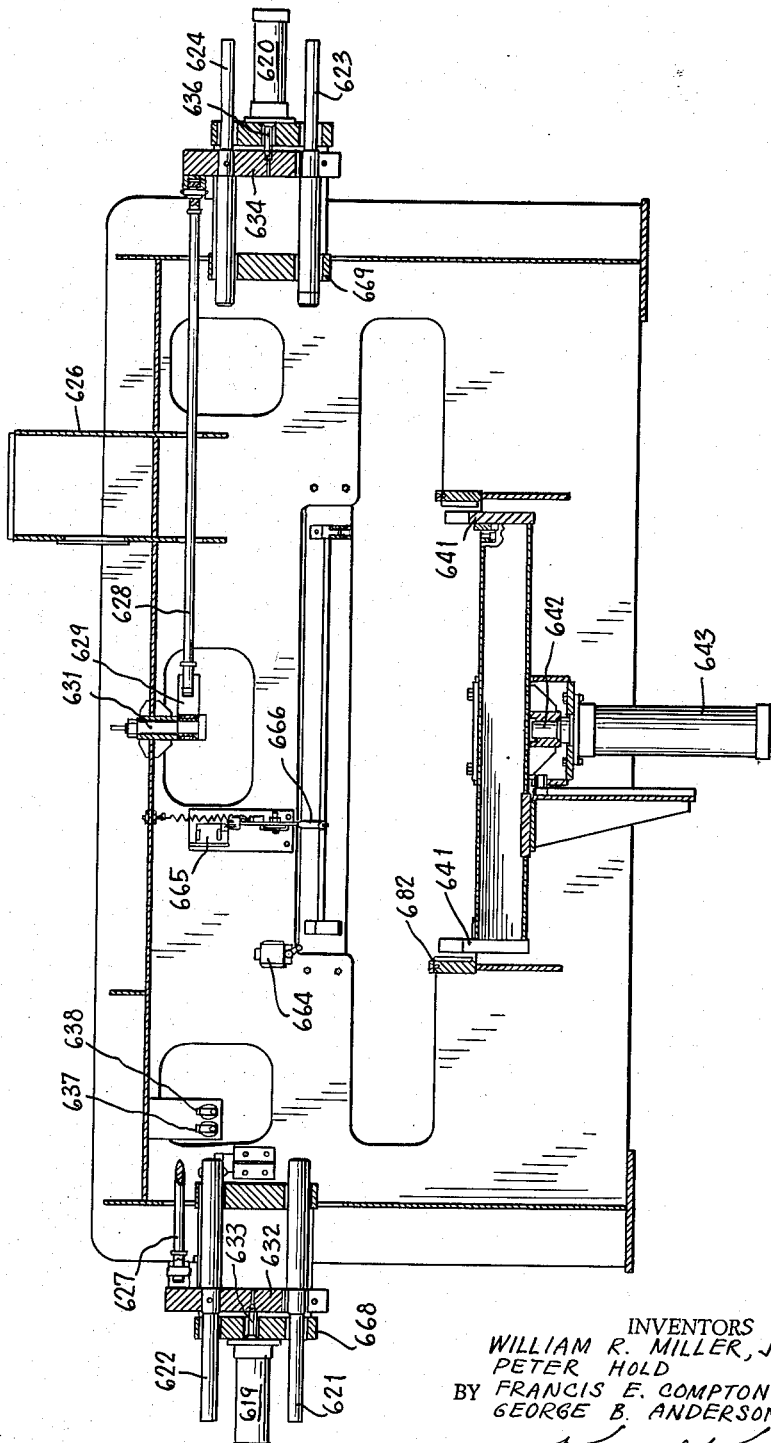

April 16, 1963   W. R. MILLER, JR., ET AL   3,085,311
AUTOMATED RAILROAD WHEEL SHOP
Filed May 13, 1959   28 Sheets-Sheet 19
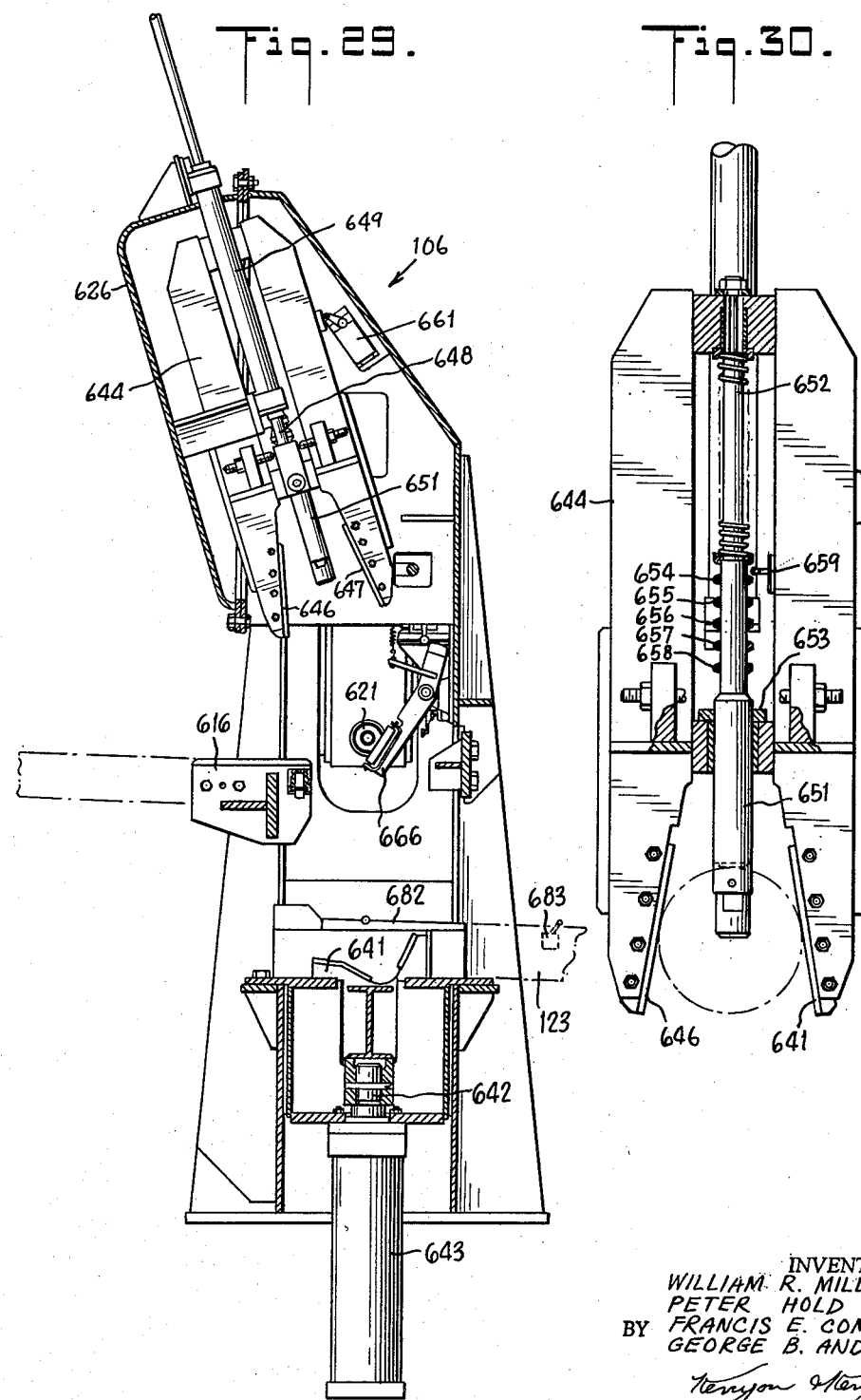
INVENTORS
WILLIAM R. MILLER, JR.
PETER HOLD
BY FRANCIS E. COMPTON
GEORGE B. ANDERSON
ATTORNEYS

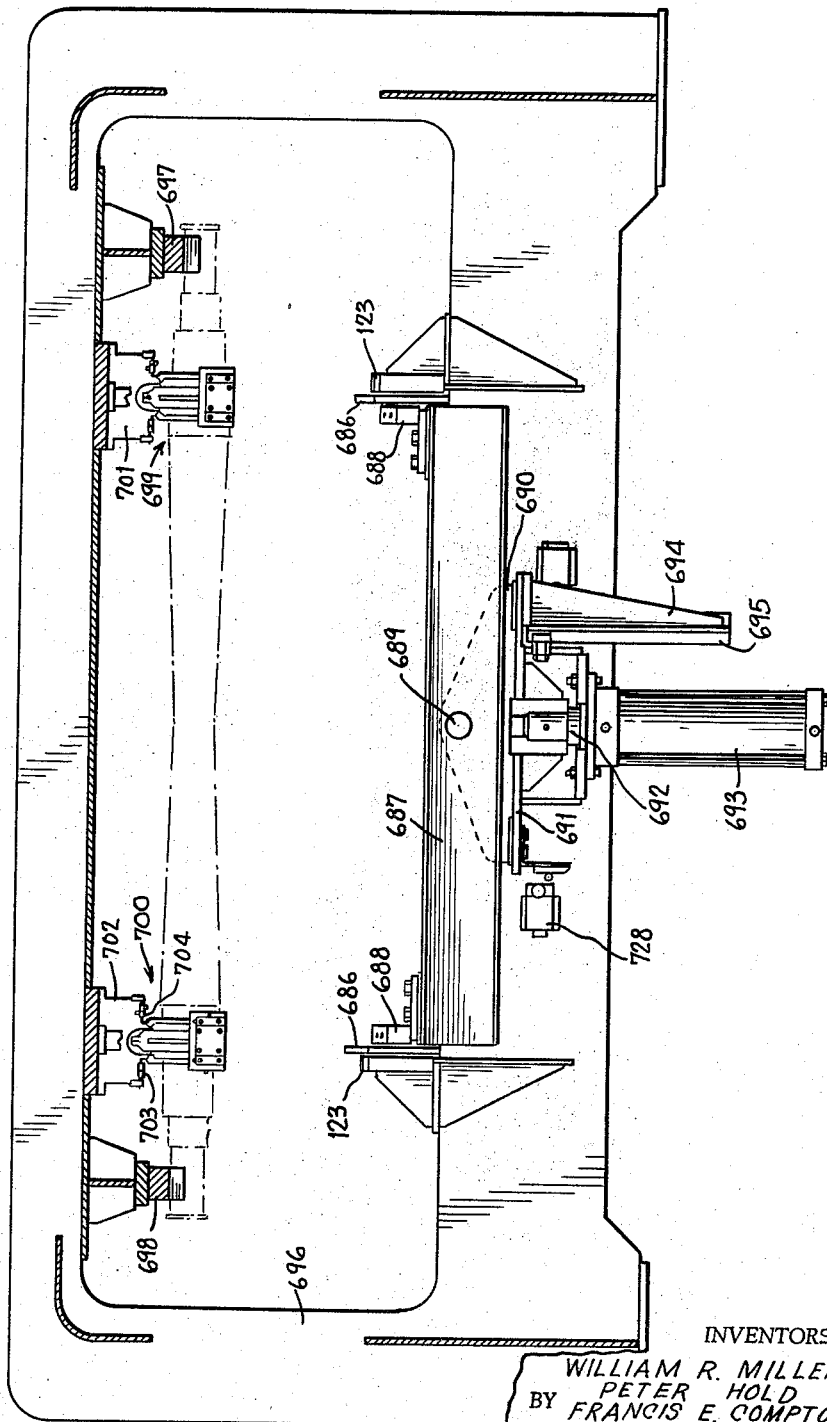

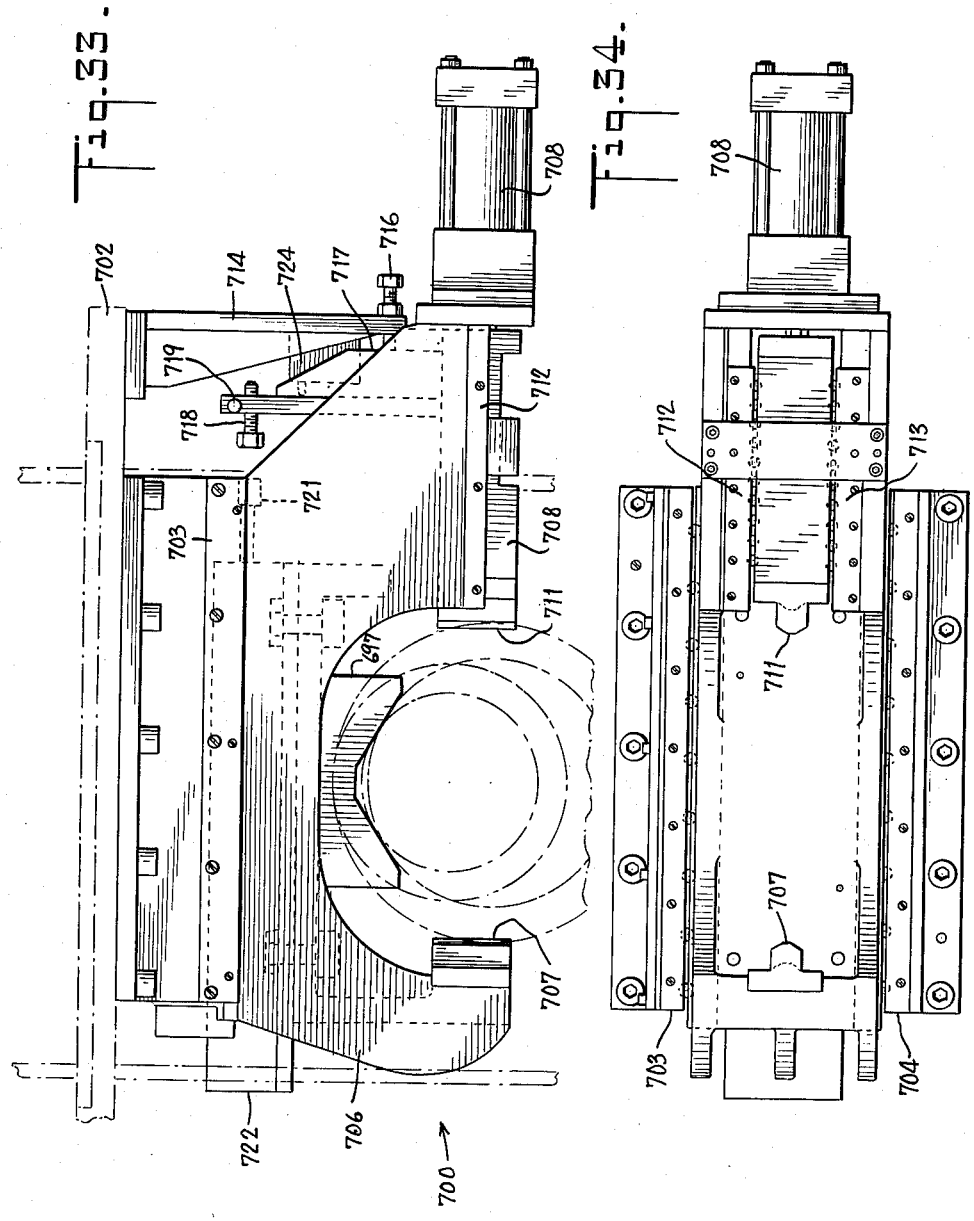

April 16, 1963 W. R. MILLER, JR., ET AL 3,085,311
AUTOMATED RAILROAD WHEEL SHOP
Filed May 13, 1959 28 Sheets-Sheet 22
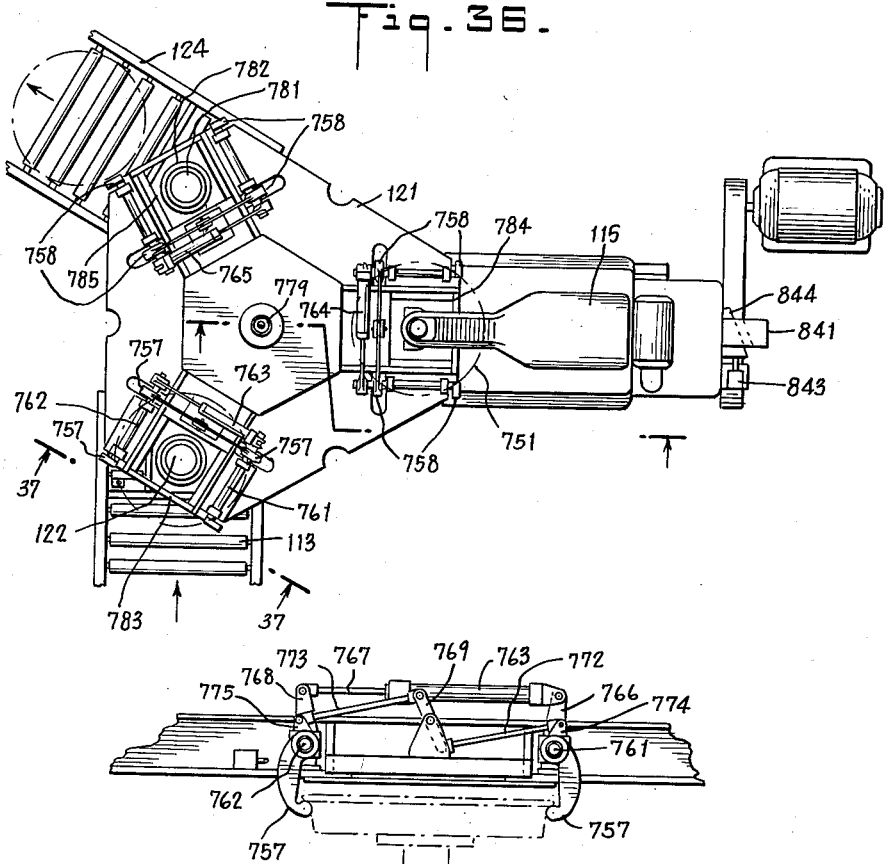
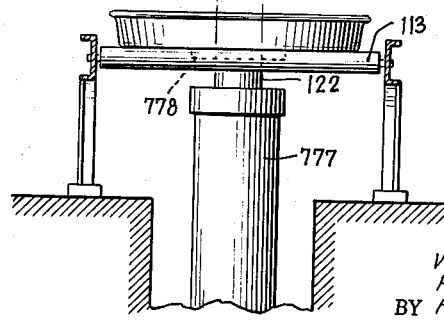
INVENTORS
WILLIAM R. MILLER, JR.
PETER HOLD
BY FRANCIS E. COMPTON
GEORGE B. ANDERSON
ATTORNEYS April 16, 1963

W. R. MILLER, JR., ET AL 3,085,311

AUTOMATED RAILROAD WHEEL SHOP

Filed May 13, 1959

INVENTORS
WILLIAM R. MILLER, JR.
PETER HOLD
BY FRANCIS E. COMPTON
GEORGE B. ANDERSON

Kenyon & Kenyon
ATTORNEYS

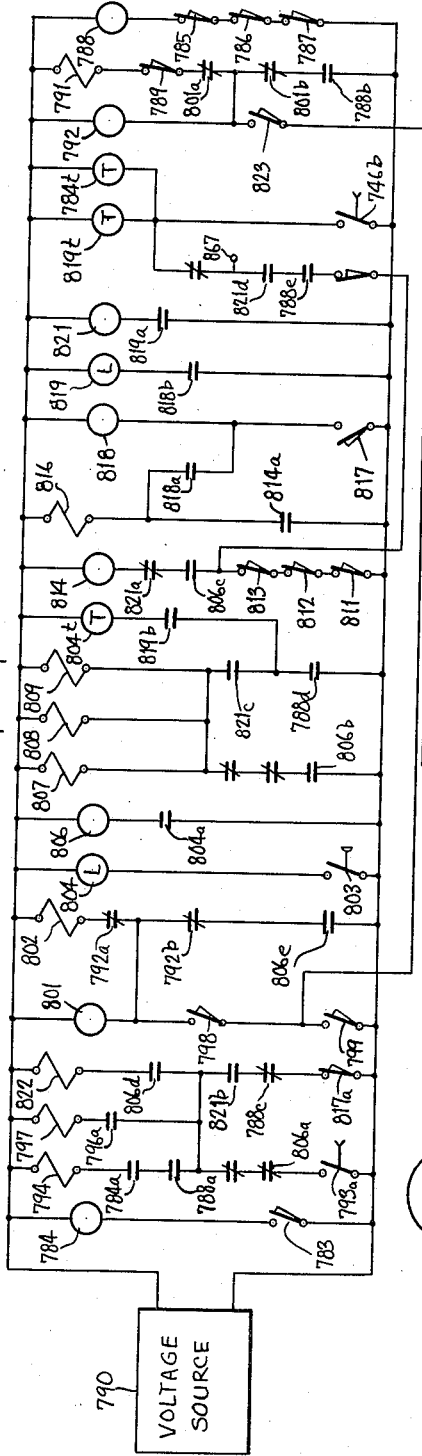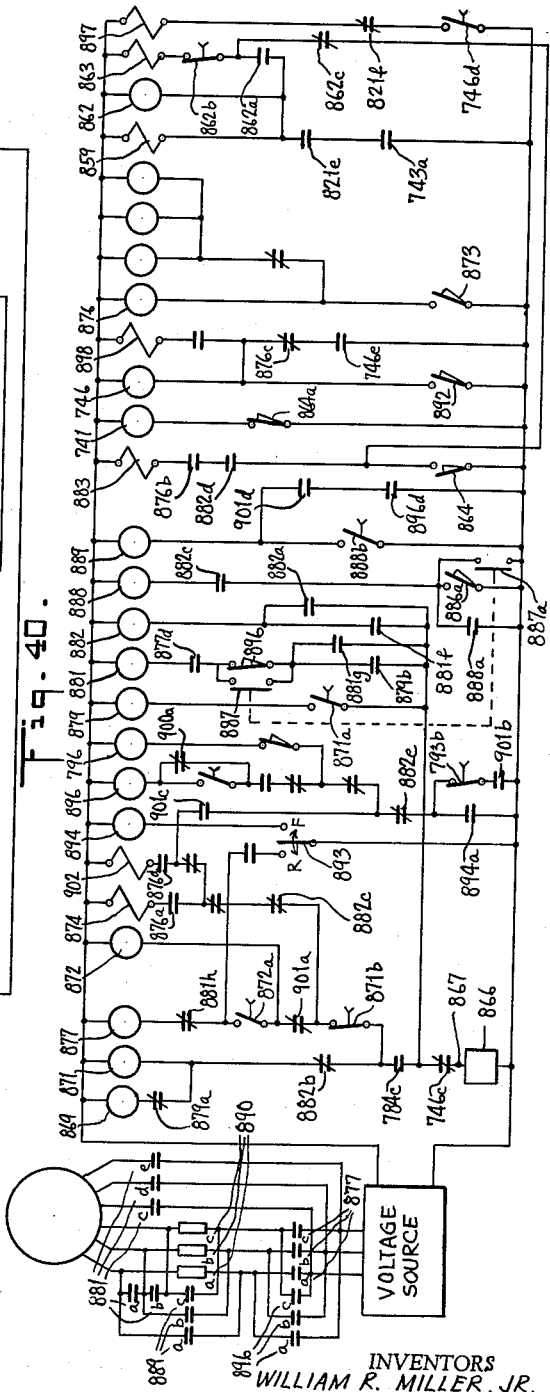

INVENTORS
WILLIAM R. MILLER, JR.
PETER HOLD
BY FRANCIS E. COMPTON
GEORGE B. ANDERSON

ATTORNEYS

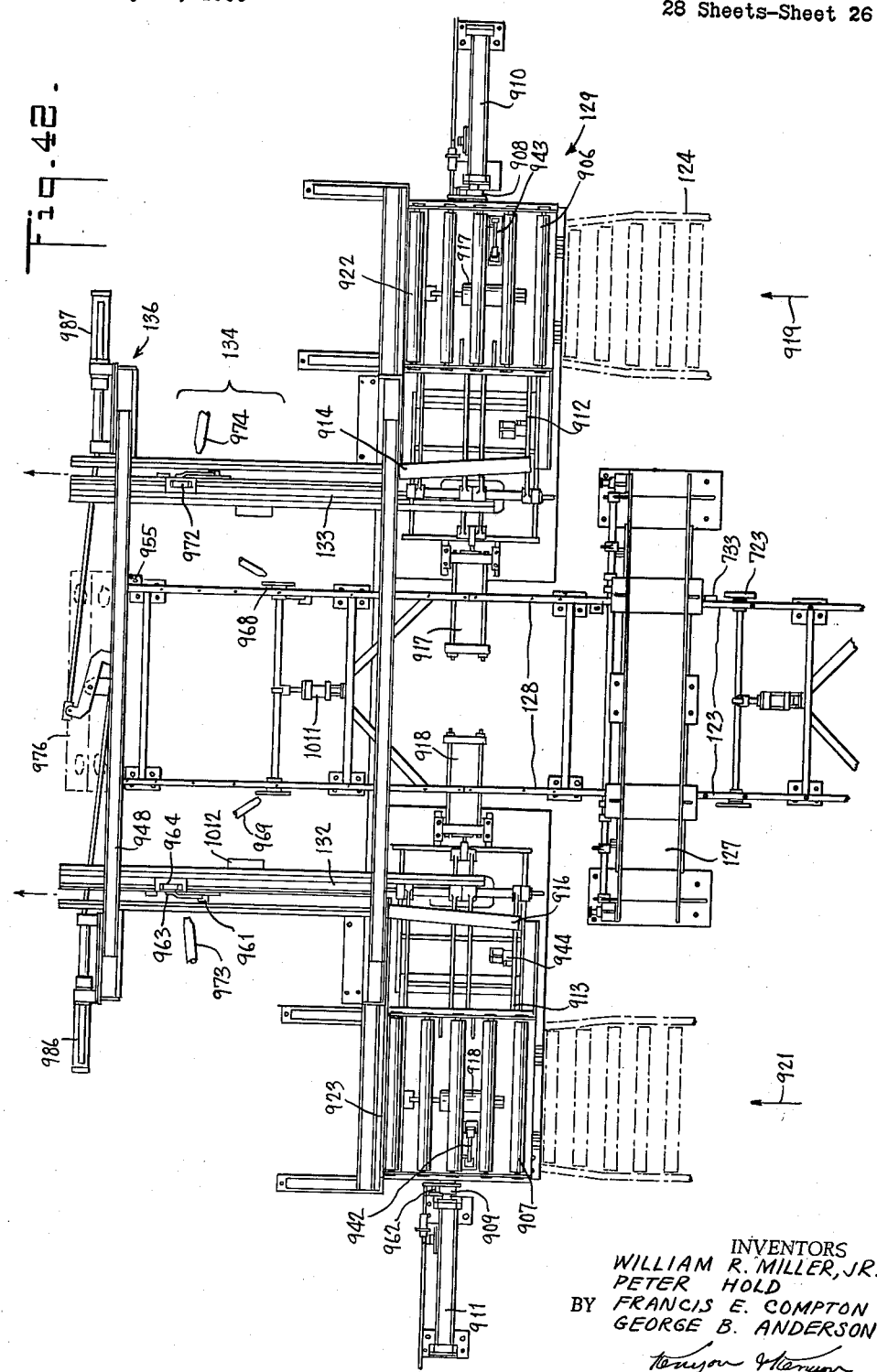

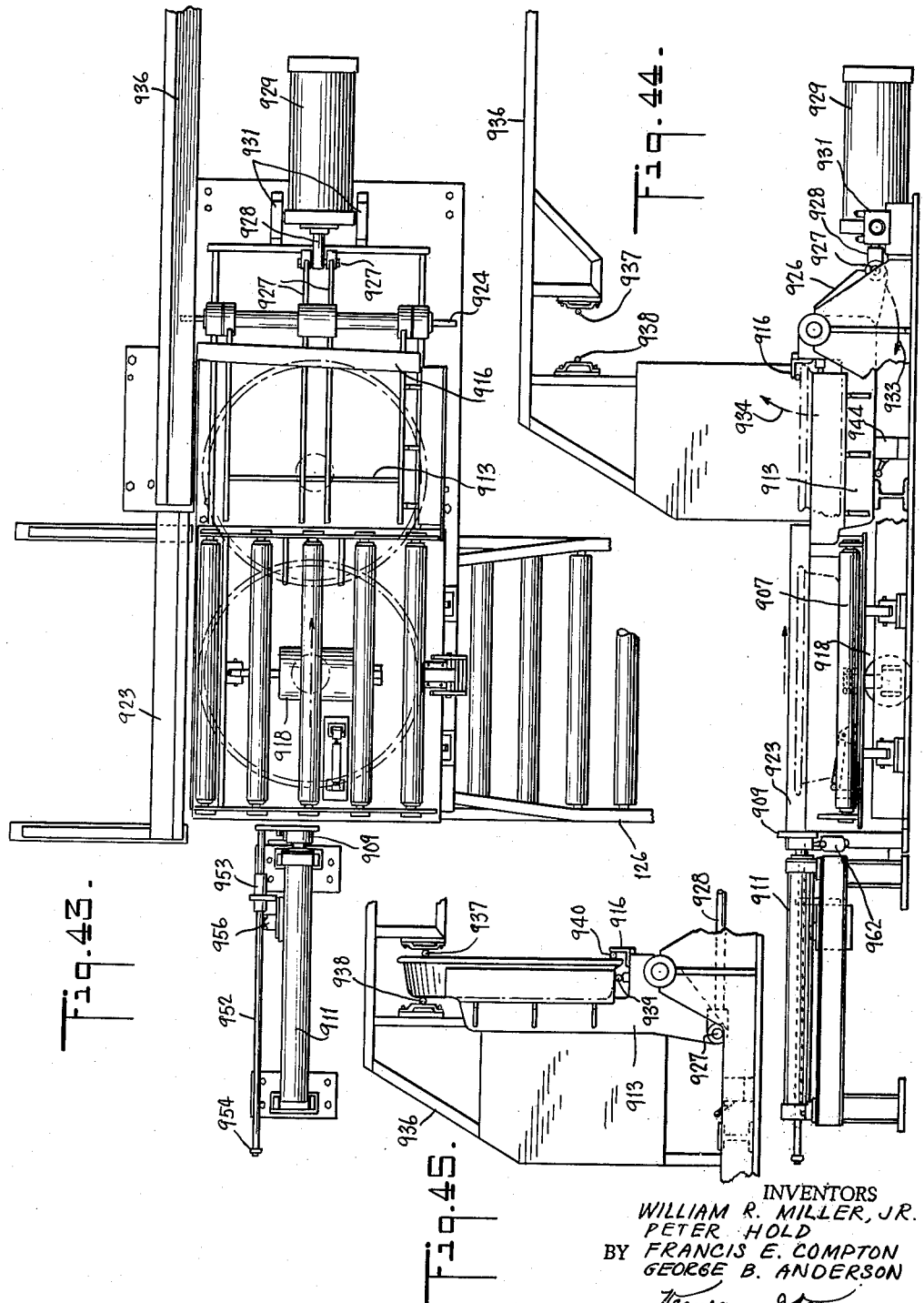

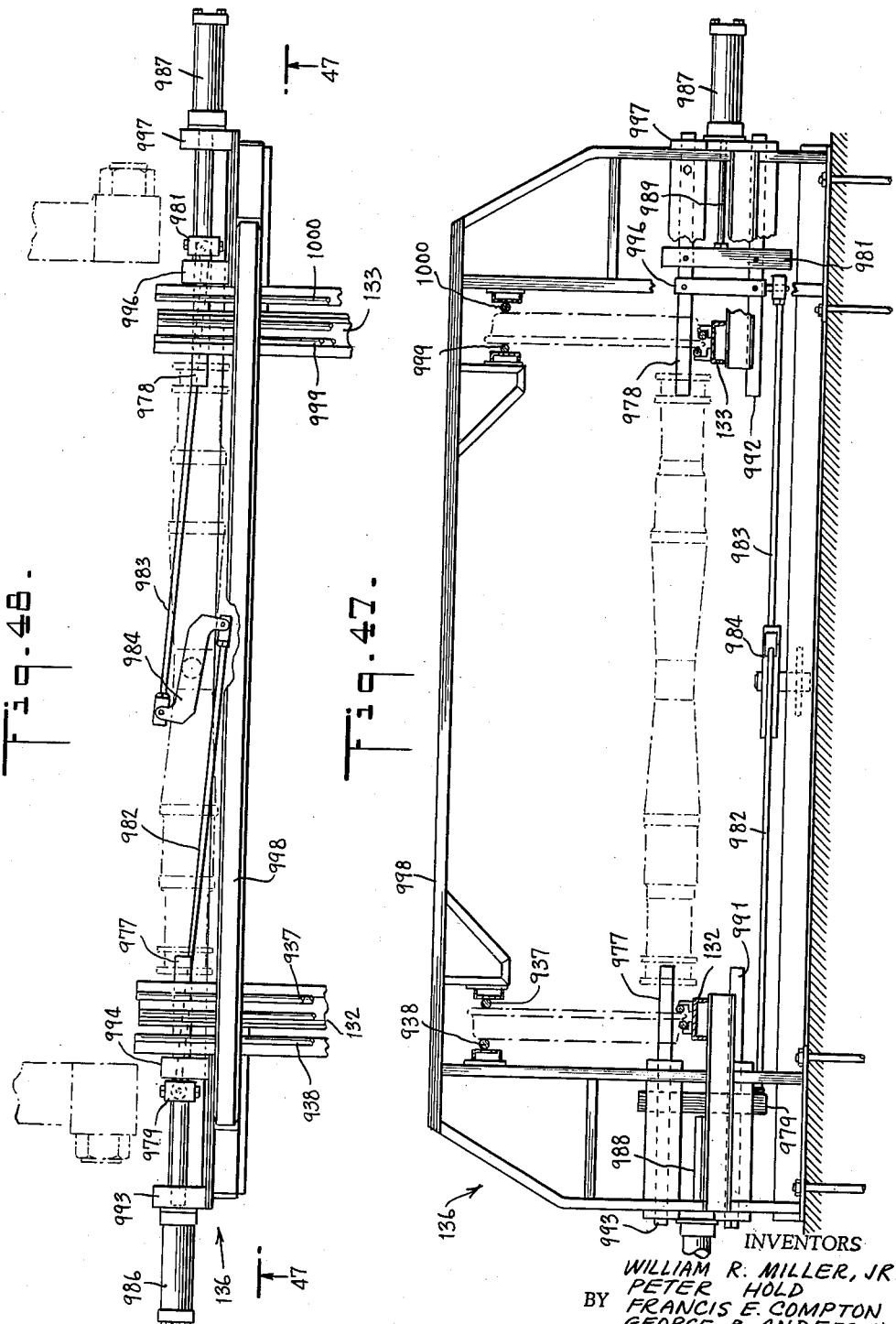

United States Patent Office 3,085,311
Patented Apr. 16, 1963

3,085,311
AUTOMATED RAILROAD WHEEL SHOP
William R. Miller, Jr., Rochester, N.Y., Peter Hold, Milford, Conn., and Francis E. Compton and George B. Anderson, Rochester, N.Y., assignors to Farrel-Birmingham Company, Inc., Ansonia, Conn., a corporation of Connecticut
Filed May 13, 1959, Ser. No. 812,876
24 Claims. (Cl. 29—33)

This invention relates to an automatic system and apparatus for reconditioning the working end portions of railroad car axles and for appropriately boring the hub bores of railroad wheels and mounting them on these axles.

Railroad wheels are press-fitted on the wheel seats of railroad axles to form an assembly. The wheels themselves of course, and the axle journals or bearing seats become worn with service, and the other axle parts may also wear or become damaged. Eventually the assembly must be removed from the car and sent to a wheel shop where the wheels are pressed from the axles, the latter's working end portions are reconditioned, new wheels, usually, are bored to fit the reconditioned wheel seats and these wheels are press fitted on these seats. Each wheel hub bore must be sized to fit the axle wheel seat for which it is intended, because these seats must be machined more or less during their reconditioning. This is also so if new axles are used. The parts are heavy and cumberstome yet most or all of the handling has heretofore been done manually. Also, the necessary gauging, machining, wheel mounting and the like have been under manual control. The operations must be in accord with standards set by the Association of American Railroads.

One object of the present invention is to provide an automatic or automated railroad wheel shop eliminating most if not all of the manual handling, operations and controls now practiced. An auxiliary object is the provision of individual machines and automatic controls which may be combined to form an overall machine or system providing this shop, or used individually or in subcombinations depending on the degree of automation desired.

Further objects will be apparent from the following specification which refers to the drawings in which:

FIGS. 1a and 1b together form a plan view to show the layout of the automated wheel shop of this invention;

Figure 1A:
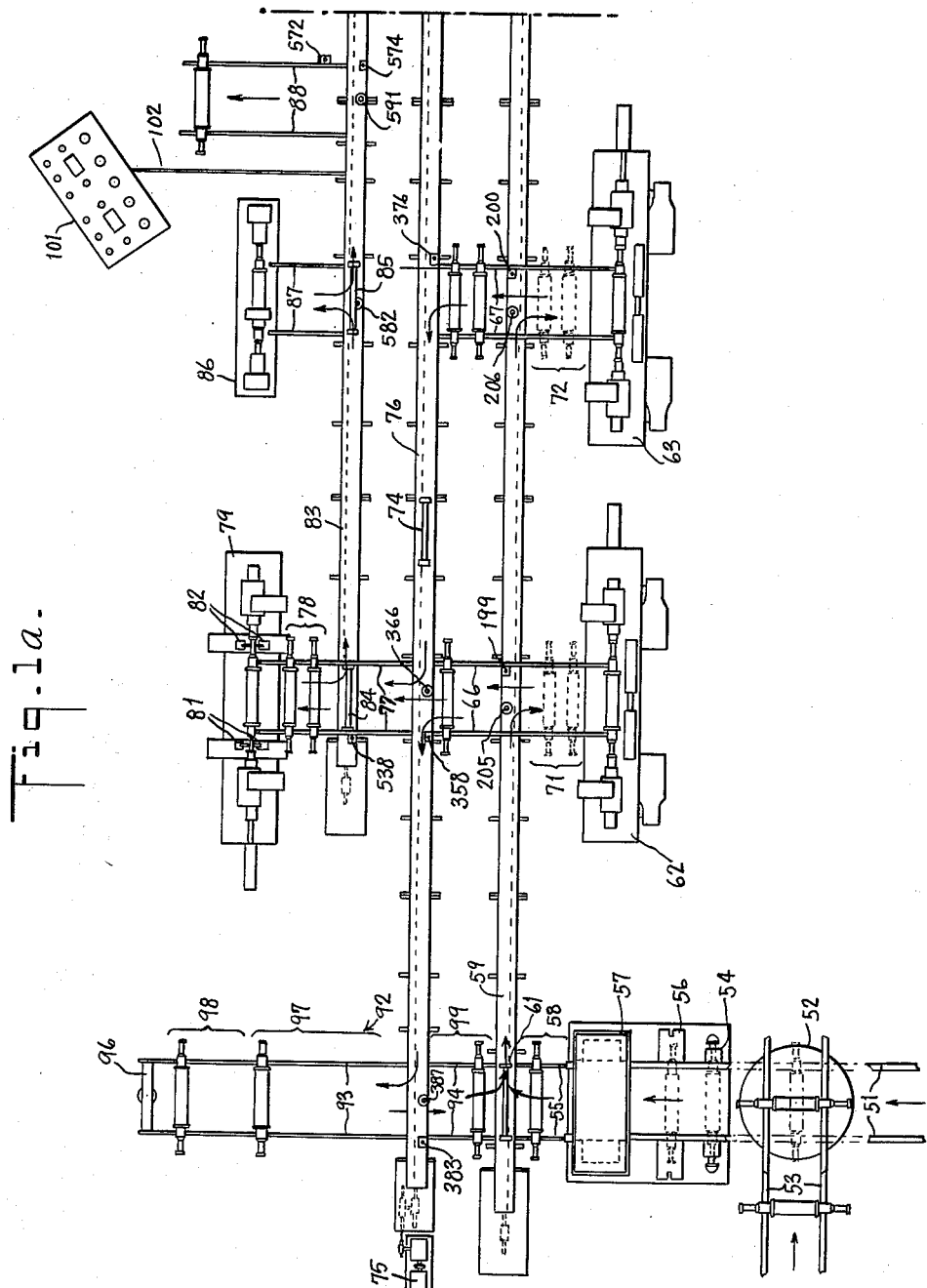
Figure 1B:
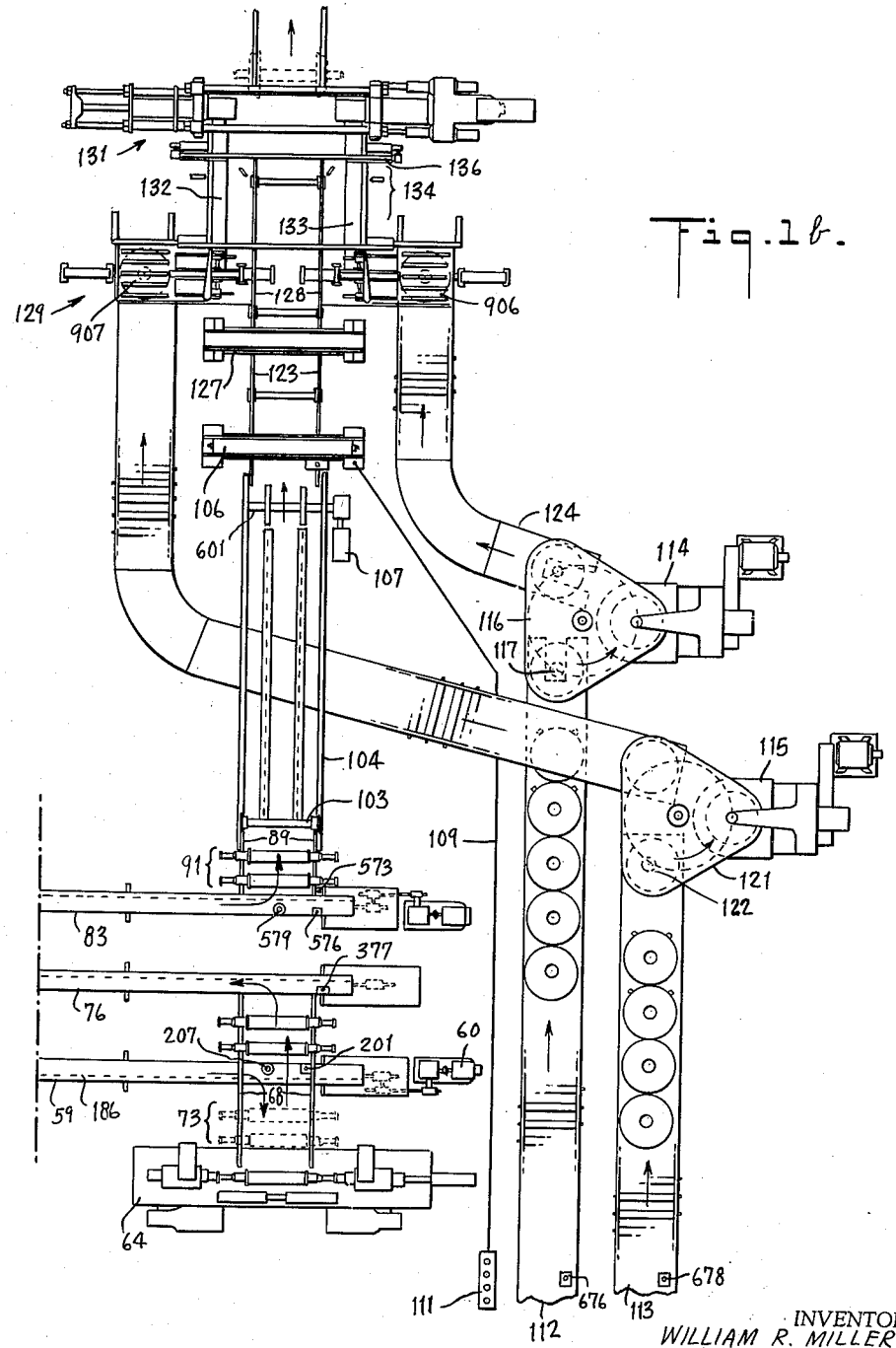
Figure 26:
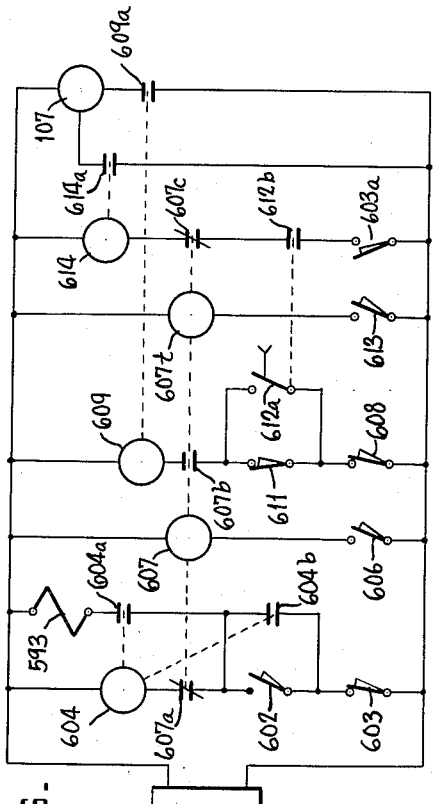
Figure 31:
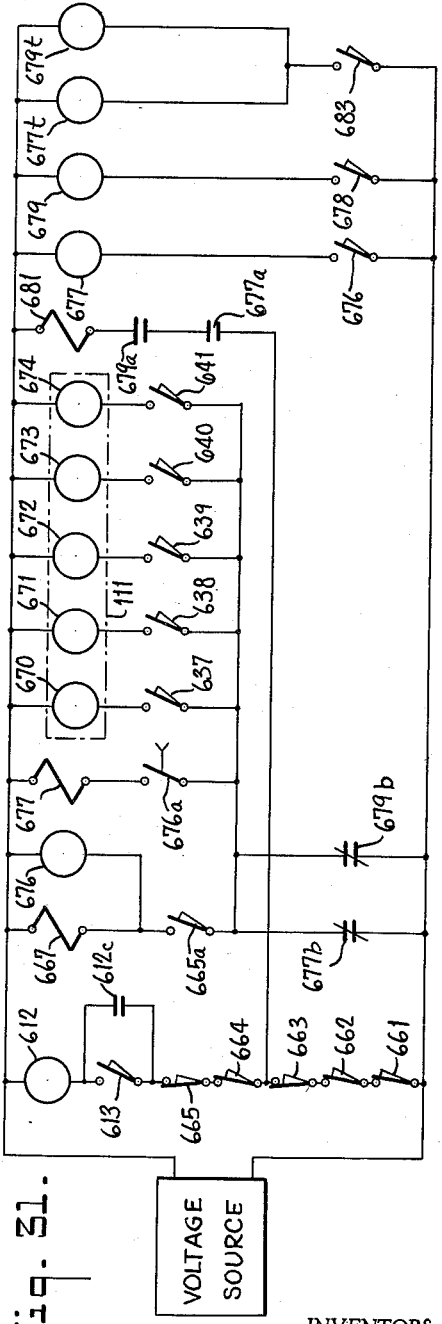
Figure 41:
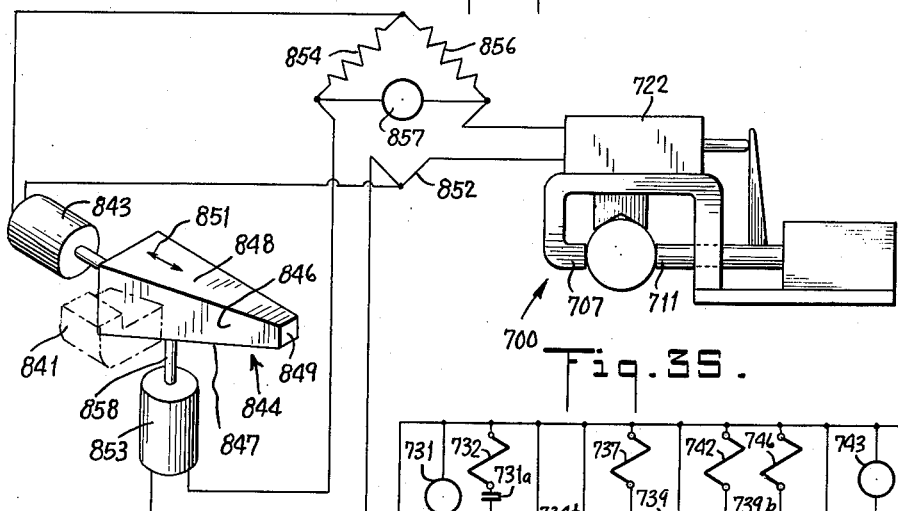
Figure 35:
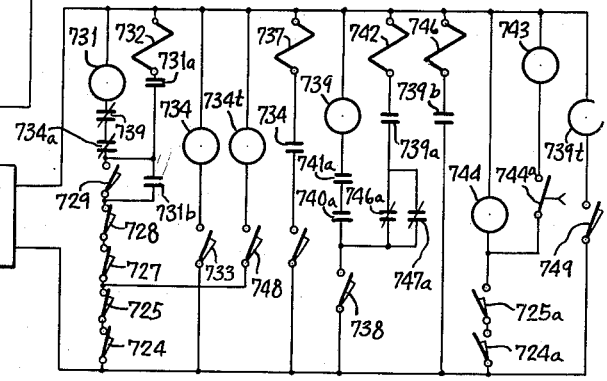
Figures 46, 49:
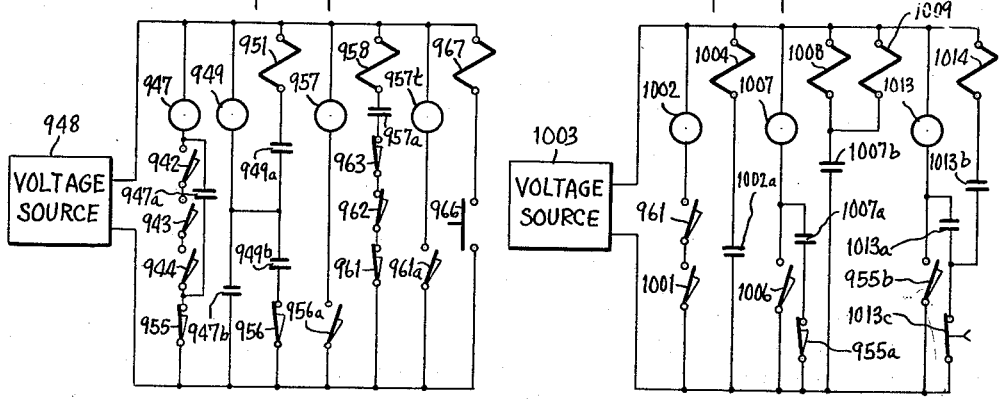

FIG. 4 in elevation shows the lathe rails for an axle lathe and a cross-section of the conveyers in FIG. 1a;

FIG. 5 is a schematic electrical diagram for components associated with the first conveyer along which axles move in FIG. 1a;

FIG. 6 shows a vertical cross section of an axle-machining lathe shown in end elevation in FIG. 4, together with details of mechanism for carrying axles to the lathe centers;

FIG. 7 shows a detail of an axle positioner associated with the rails in FIG. 6;

FIG. 8 is a schematic electrical diagram of the components connected with the lower rails to the lathe in FIG. 6;

FIG. 9 is a side view of the working end portions of an axle;

FIG. 10 shows a front elevation of an axle-machining lathe;

FIG. 11 is a detail of an elevator incorporated in the lathe of FIG. 10;

FIG. 12 is a cross sectional view of the lathe of FIG. 10 showing an automatic templet and follower mechanism;

FIG. 13 is a schematic electrical circuit diagram of automatic controls for the lathe in FIG. 10;

FIG. 14 is a schematic electrical diagram of components associated with the upper rails by means of which axles are carried away from the lathe in FIG. 10;

FIG. 15 is a schematic electrical diagram of a second conveyer in FIG. 1a;

FIG. 16 is a side elevational view of an axle storage rack in FIG. 1a;

FIG. 17 is a schematic electrical diagram of the components connected with the storage rack in FIG. 16;

FIG. 18 is a schematic electrical diagram of the components connected with the incoming rails to a burnishing lathe shown in FIG. 1a;

FIG. 19 is a front elevational view of the burnishing lathe;

FIG. 20 is a top view of FIG. 19;

FIG. 21 is a partial end view of FIG. 19;

FIG. 22 is a detail of a component of the elevator incorporated in the lathe of FIG. 19;

FIG. 23 is a schematic electrical diagram of components associated with the burnishing lathe in FIG. 19;

FIG. 24 is a side elevational view of a testing station shown in the layout in FIG. 1a;

FIG. 25 is a schematic electrical diagram of components associated with a third one of the conveyers in FIG. 1a and with the testing station in FIG. 24;

FIG. 26 is a schematic electrical diagram of components associated with one of the conveyers in FIG. 1b;

FIG. 27 is a front elevational view of an axle measuring station in FIG. 1b;

FIG. 28 is a cross sectional view from the front of a length measuring station in FIG. 27;

FIG. 29 is a side cross sectional view of the length measuring station in FIG. 27;

FIG. 30 is a detail of the wheel seat gauge in FIG. 29;

FIG. 31 is a schematic electrical diagram of components associated with the length measuring station of FIG. 27;

FIG. 32 is a front elevational view of an axle gauging station in FIG. 1b;

FIG. 33 is a side view of the gauge used in the gauging station of FIG. 32;

FIG. 34 is a top view of the gauge in FIG. 33;

FIG. 35 is a schematic electrical diagram of components associated with the movement of axles through the gauging station of FIG. 32;

FIG. 36 is a top view of one of two indexing tables shown in FIG. 1b;

FIG. 37 is a side elevational view of the indexing table shown in FIG. 36;

FIG. 38 is a side view of a wheel boring machine from FIG. 1b;

FIG. 39 is a schematic electrical diagram of components associated with the indexing table of FIG. 36;

FIG. 40 is a schematic electrical diagram of components involved in the automatic operation of the boring machine in FIG. 39;

FIG. 41 is a detail schematic drawing of a transducer and its controlled element used in the boring machine of FIG. 38;

FIG. 42 is a plan view of a wheel tip-up station in FIG. 1b;

FIG. 43 is a top view of the tip-up table in the tip-up station of FIG. 42;

FIG. 44 is a front view of the tip-up station of FIG 42;

FIG. 45 is a detail elevational drawing of one position of the tip-up table in FIG. 44;

FIG. 46 is a schematic electrical diagram of components associated with the tip-up station of FIG. 42;

FIG. 47 is a front elevational view of an axle positioning station of FIG. 1b;

FIG. 48 is a top view of the positioner in FIG. 47; and

FIG. 49 is a schematic electrical diagram of components associated with the axle positioning station of FIG. 44.

Briefly, the wheel shop comprises a layout starting with an incoming station for axles without wheels. These axles, which may be one of the standard sizes of freight car axles, are loaded onto a conveyer which carries them to a machining lathe. At the lathe the diameters and lengths of the axle sections to be machined are measured by means of automatic templets, or guides, and the cutting tools of the lathe are controlled by these guides to machine the axles to a predetermined smaller size.

Following the machining operation, the axles are moved by a second conveyer to a burnishing machine, which is a lathe having burnishing rollers instead of cutting tools. The purpose of the burnishing rollers is to smooth out the surfaces of certain sections, particularly the journals, of the axles so as to obtain a high degree of polish to reduce bearing friction. The ends of axles are automatically chamfered at this station to remove sharp edges. The burnished axles are then loaded onto a third conveyer which transports them to a testing device in which the axles are tested for cracks and other faults.

The axles are subsequently conveyed one at a time to an axle classifying station in which the diameter of one wheel seat and the length of each axle are measured to determine the category of the axle and whether it is new or has been used before. Information as to these broad categories is electrically transmitted to a loading station for a wheel conveyer, and wheels of the proper heavy or light duty type are loaded onto this conveyer and are transported thereby to two wheel boring machines. After being released from the length measuring device the axles move along to a precise axle gauging station at which the diameters of both wheel seats of each axle are accurately measured. Information as to the diameters of the wheel seats is transmitted directly to the two boring machines, and two railroad wheels are bored in accordance with this information to fit with the precise degree of force required by industry standards onto the particular axle being measured in the gauging station. These two wheels and the corresponding axle are then transported to a wheel tip-up station at which the wheels are placed in the proper plane for mounting on the axles. The matched wheels and axles thereafter go into a wheel press where they are forced together under extremely high pressure of the order of fifty to a hundred tons or more to form a wheel and axle unit ready to be mounted on a railroad freight car.

FIGS. 1a and 1b taken together show a complete railroad axle handling and machining system according to the invention. The invention which resides in the layout will first be described in broad terms with reference to these two figures, and details of components of the layout will then be filled in under section headings appropriately labeled.

In FIG. 1a railroad axles from which the wheels have been removed are supplied along an incoming track 53 to a turntable 52. New axles are supplied along a track 51. After passing over the turntable 52 the axles roll along the track to an aligning position 54 at which the axles are lined up so as to be approximately centered on rails 55. Thereafter the axles pass through a cleaning position 56 at which scale and dirt is removed from the non-machined portions of the axles between the wheel seats. The axles then pass to a second cleaning position 57 at which the machined parts of the axles are cleaned so that the accurate gauging which is later done on these machined parts will not be incorrect because of interference from particles of dirt. The axles are then lined up on rails 55 at location 58 adjacent a conveyor 59, awaiting the proper signal to be loaded onto the conveyer buggy 61 to be transported thereby to one of several axle lathes 62–64. Conveyer buggy 61 is chain-driven by a motor 60.

Three axle lathes 62–64 are shown in the present embodiment of the invention for the reason that it has been found that three lathes are required to perform the necessary machining to keep the remainder of the system operating without an uneconomical amount of stand-by time. However, a different number of lathes may be used if desired. The axles are transported by the buggy 61 along conveyer 59 to locations opposite the three lathes 62–64 and are unloaded onto inclined rails adjacent to the lathes to await machining. The rails onto which the axles are unloaded from the buggy 61 are not shown in FIG. 1a because they are directly under reversely inclined outgoing rails 66–68 which convey machined axles away from the lathes 62–64. However, axles are stored on the lower rails in incoming axle magazines at positions indicated by reference characters 71–73.

Following the machining operation in the lathes 62–64 the axles are lifted by means of an elevator (not shown in this figure) to the outgoing rails 66–68 where they roll down to the lower end and are stored until removed by a buggy 74 running on a second conveyer 76 which is driven by a motor 75. Buggy 74 transports axles to inclined rails 77, where they are stored at location 78 next to a burnishing lathe 79.

The axles are positioned on the burnishing lathe 79 as called for by controls of the system, and the journals and dust guards and wheel seats are burnished by means of pairs of rolls 81 and 82, which are hydraulically pressed against the surface of the journals while the axles are rotated. The pressure of these burnishing wheels is sufficient to smooth out minute burrs on the journal surfaces in order to reduce the friction of the bearings.

Following this burnishing operation the axles are loaded onto inclined outgoing rails directly under the incoming rails 77 and are allowed to roll down the outgoing rails to a third conveyer 83, which is parallel to conveyers 59 and 76. Conveyer 83 is provided with two buggies 84 and 85 which are driven by a motor 80 and which carry axles in the same direction as the buggy 61 on conveyer 59. Buggy 84 transports the axles to a testing station 86 connected to the conveyer 83 by pivoted rails 87. At station 86 axles are subjected to standard treatment for the location of cracks and other faults and are loaded onto the buggy 85. The few axles which fail to pass the test are unloaded from buggy 85 at a discharge rack 88, and the remaining axles are unloaded onto rails 89, where they may be stored at location 91. One of the features of this invention is that rails 89 are spaced the same distance from rails 87 that rails 87 are from the outgoing rails at burnishing lathe. As a result buggies 84 and 85 can be loaded simultaneously and can be unloaded simultaneously except in those rare instances when an axle is rejected.

The foregoing description has concerned the treatment of axles other than brand new ones. It is known from experience that some of the axles entering the system will be rejected by the tests carried out at testing station 86 and for this and other reasons it will occasionally be necessary to machine brand new axles from the rough state. However this rough machining operation is not normally a part of the standard operation of the system and it is contemplated that it would be carried out only occasionally, perhaps during a night shift once a week. For this purpose the new axles entering along track 51 are carried by the buggy 61 only to the first lathe 62, which is then not set up for finished machine work but instead has tools suitable for rough-machining the wheel seats, dust guards and journals of the axles. These axles can be stored in location 71 prior to the rough-machining operation, and after the rough-machining operation has been completed the axles will be carried by rails 66 to the buggy 74 on conveyer 76 just as in the case of axles that have been finish-machined. However, instead of passing directly over to the incoming rails 77 leading to the burnishing lathe 79, the rough-machined axles will be carried by the buggy 74 to an axle storage location 92 which comprises an upper set of rails 93 and a lower set of rails 94. Axles are carried from the upper rails to the lower ones by an elevator 96 and are stored on both sets of rails, for example at locations 97–99. The lower rails 94 lead from the elevator 96 back to the first conveyer 59, so that axles stored at location 99 are available to be placed on the buggy 61 at any time there may be an interruption in the flow of axles coming in along rails 51. The decision of taking axles from rails 94 instead of from rails 55 may be made by an operator at a control console 101 located approximately in the center of the complete layout near the testing sttaion 86. Console 101 is connected to the machinery by a cable 102.

The section of the layout described so far is in itself a novel arrangement for machining railroad axles and produces finish-machined and tested axles at location 91. This section of the system may be used independently of the remainder of the system and may, if desired, be located at some distance from it.

From rails 89 the axles are carried by a buggy 103 on a conveyer 104 to an axle-length measuring station 106. Conveyer 104 is powered by a motor 107 and is arranged to carry the axles sideways to station 106 to facilitate the length measurement to be made therein. This measurement primarily determines the load-carrying capacity of the axles and hence the type of wheel which must be mounted thereon. Heavy duty axles have long bearing journals at their outer ends, although, of course, the distance between the wheel seats is the same for either light duty or heavy duty axles, since all must run on the same railroad tracks. The axle-length measuring station 106 is also provided with calipers to measure roughly the diameter of one wheel seat, since this is a further element of information needed to select the proper wheels.

Information obtained from the axle-length measuring station 106 is transmitted via a cable 109 to a light panel 111 to signal an operator as to the type of wheels to be loaded onto a pair of conveyers 112 and 113. These conveyers are of the multiple-roller type operating by gravity or power to carry the wheels down to two wheel-boring machines 114 and 115, respectively. At these wheel-boring machines the wheels traveling on conveyer 112 are loaded onto an indexing table 116 by means of an air operated piston elevator 117, and wheels on conveyer 113 are loaded onto an indexing table 121 by means of an air operated elevator piston 122. The tables 116 and 121 each have three sets of wheel-gripping fingers and three positions of rotation: a loading position, a boring position and an unloading position spaced approximately 120° apart for most efficient operation. After receiving a pair of wheels in the loading position the tables 116 and 121 each rotate 120°. The wheel-gripping fingers thereupon release the wheels onto chucks of the boring machines 114 and 115, and the boring is done right through openings in the tables. Afterwards the fingers automatically grasp the bored wheels, and the tables rotate another 120° to deposit them on conveyers 124 and 126 which carry them away. Because of the equiangular rotation, new wheels may be brought to the boring machine as the bored wheels are being removed.

Meanwhile, the axles that determined the types of wheels placed on conveyers 112 and 113 have passed through the axle-length measuring station 106 and have rolled down a pair of inclined rails 123 under gravity to an axle gauging station 127. Axles awaiting measurement in the axle gauging station 127 may be either light-duty axles or heavy-duty, but in any case the wheels placed on conveyers 112 and 113 will be of the corresponding light- and heavy-duty types.

In the axle gauging station 127 the diameters of both wheel seats on each axle are precisely measured. Information corresponding to the measurement of the diameter of the right hand wheel seat is transmitted to boring machine 114, and information corresponding to the diameter of the left hand wheel seat is transmitted to boring machine 115 to control the operation of the head and boring ram in each of these machines. The purpose is to bore axle holes simultaneously in the pair of railroad wheels mounted on the boring machines 114 and 115 and to control the diameters of these axle holes very precisely so that when the wheels are later pressed onto the axles there will be the required degree of interference between the opening in the wheels and the external diameter of the wheel seats to achieve a force fit required by standards of the industry.

At the same time the axle which was measured and which provided the information for boring a pair of wheels is released from the axle gauging station 127 and permitted to roll along rails 128 to the wheel tip-up station 129, thereto be aligned with the corresponding pair of wheels brought in on conveyers 124 and 126. The matched wheels and axles then roll down toward a wheel press 131, the wheels on rails 132 and 133 and the axles on rails 128. Along the way the wheel seats of the axles are coated with white lead lubricant at a lubricating station 134 in accordance with industry practice.

It may be desirable to center the axles before they enter the wheel press 131, and so an axle-centering device 136 may be placed across the rails at the wheel press 131.

INCOMING STATION

Figure 2:
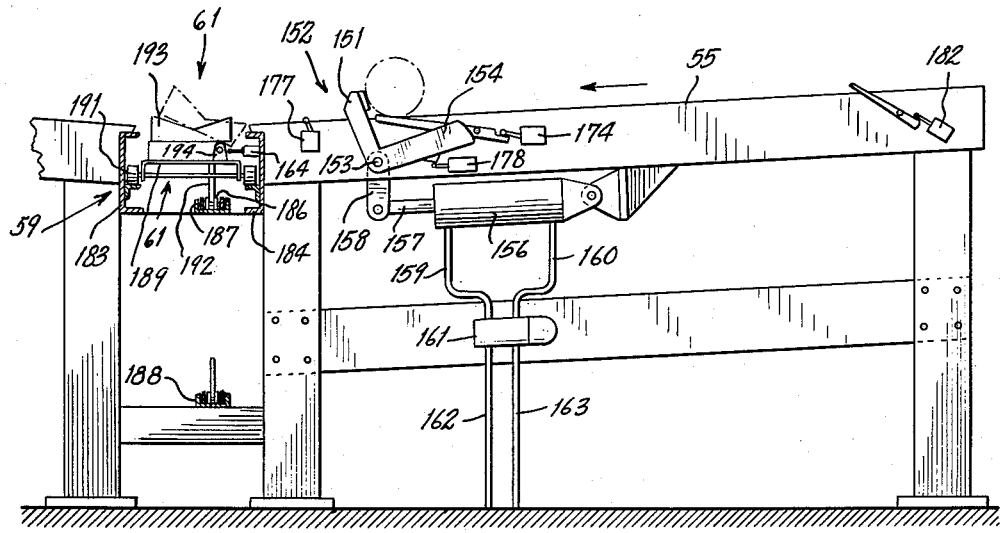
FIG. 2 is a partly sectioned elevation view and shows the incoming station for axles entering the conveyer system in FIGS. 1a and 1b.

Axles first enter the conveyer system by way of the incoming station, which is briefly indicated as rails 55 in FIG. 1a. FIG. 2 shows the mechanical arrangement of the incoming station in greater detail, and FIG. 3 shows the connections between electrical components.

Axles to be processed are placed on the upper ends of rails 55 and roll downward toward conveyer 59 under the force of gravity. At last the axles come to rest against an arm 151 of an L-shaped escapement 152, which is rigidly attached to a rod 153 rotatably supported by the rails 55. Escapement 152 has two purposes: first, it controls the axles so that they can pass through to the conveyer 59 only one at a time and only when the buggy 61 is ready to receive them; and second, it aligns the axles, which may have been placed askew on rails 55 or which may have rolled askew because the diameter of one end was slightly larger than that of the other. The first purpose is accomplished by having a second arm 154 at an angle to arm 151 so that when the escapement pivots counterclockwise, to let one axle pass, arm 154 will bar the passage of another axle. The second purpose is accomplished by having two such escapements one at each end of rod 153.

Escapement 152 is operated by a cylinder 156 which may be actuated either by air or liquid. To simplify the description, throughout this specification cylinder 156 and all other cylinders will be referred to as hydraulic cylinders, which term is intended to cover both operating media. A piston within cylinder 156 is connected via a piston rod 157 to a crank arm 158, which, in turn is securely fastened to the rod 153 to rotate the latter in response to movement of the piston in cylinder 156. The piston moves to the right, thus pivoting escapement 152 counterclockwise, in response to hydraulic pressure applied via line 159 and to the left in response to pressure through line 160. The hydraulic fluid is controlled by an electrically operated solenoid valve 161 which connects lines 159 and 160 alternately to high and low pressure lines 162 and 163, respectively.

Figure 3:
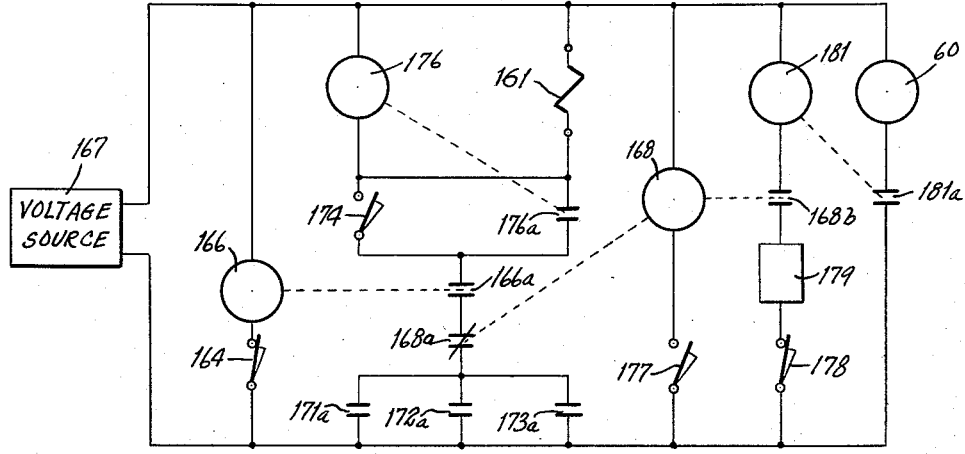
FIG. 3 is a schematic electrical diagram for components associated with the incoming station in FIG. 2.

The electrical signals to operate valve 161 are generated in the circuit of FIG. 3. The physical location of some of the electrical components of FIG. 3 is shown in FIG. 2.

Before the solenoid valve 161 can be energized to pivot escapement 152 and thus to let an axle pass through, the buggy 61 must be in a position directly opposite rails 55. The presence of the buggy at this location results in closing a normally-open switch 164 which connects the coil of a relay 166 across a source 167 of electrical power. As a result contacts 166a are closed. If, as should be the case, there is no axle already on the buggy, a latching relay coil 168 will not have been energized, and the contacts 168a controlled by it will be in their quiescent, normally-closed state.

Another condition which must be met before escapement 152 can be energized is that at least one of the lathes 62–64 (FIG. 1) must be ready to receive an axle. This is indicated by the contacts 171a–173a, which are connected to relays (not shown in this figure) that indicate the readiness of these lathes to receive an axle. If one lathe is ready, the corresponding pair of contacts 171a, 172a, or 173a will be closed.

The final condition that remains to be met before the escapement 152 can be actuated is that there must be an axle in position against arm 151. If there is, the axle will press on the arm of a normally-open switch 174 and will close the switch, thereby completing the circuit to power source 167 and energizing solenoid 161. At the same time a relay 176 is energized and this closes contacts 176a to short-circuit the pressure-operated switch 174 so that, when the latter opens up as the axle rolls away from the escapement, the escapement will not be returned to the closed position so hastily that the axle will be caught and thrown back upon the arm of switch 174.

Once the escapement has been pivoted, it will stay that way until the pressure of the axle, just before it rolls off the end of rails 55, momentarily closes a normally-open switch 177. This energizes the latching winding of relay 168 and opens contacts 168a to break the circuit to solenoid valve 161 and to permit the escapement 152 to return to its upright position, which is the position shown in FIG. 2. Relay 168 is latched while the buggy 61 is loaded and stays latched until the buggy is unloaded at rails leading to one of the lathes 62–64.

Relay 168 also closes contacts 168b. When the escapement 152 returns to its upright position, it closes a normally-open switch 178 and, assuming an unbroken circuit 179, energizes a relay 181 that closes contacts 181a and starts motor 60. Circuit 179 includes a series of switches or contacts that are all closed when there are no impediments along conveyer 59 that would interfere with the movement of buggy 61. These switches and contacts will be described in the section entitled Conveyer 59.

At the upper end of rails 55, as shown in FIG. 2, is a switch 182. Each time an axle rolls over the arm of this switch a warning signal is momentarily generated. When axles are placed on the rails faster than they can be removed by the buggy 61, the axles are lined up in what becomes in effect an incoming axle magazine. When enough axles have been stacked in the magazine, the last one will rest on the arm of switch 182 and cause it to remain closed, and therefore the warning signal will remain on to stop the loading by preventing further delivery from the washing machine.

CONVEYER 59

Conveyer 59 is seen in cross section in FIGS. 2 and 4 and in plan view in FIGS. 1a and 1b. Referring first to FIG. 2, it will be seen that the conveyer consists of two opposed channel members 183 and 184 on either side of a sprocket chain 186. Chain 186 is a closed loop and is preferably, because of its great length, supported in channel guides 187 and 188.

The buggy, or carriage, 61 consists of a frame 189 to which wheels 191 are attached. The frame is connected to the chain 186 by means of a fixed pin 192. V-blocks 193 rest on the frame 189 and are pivoted at one side of it by a hinge 194.

FIG. 4 shows the buggy 61 at the incoming rails 209 of lathe 62 with the V-blocks 193 pivoted to roll an axle off. The pivoting force is supplied by a plunger 208 which is pushed upward by an hydraulic cylinder 207. Pivoting the V-blocks 193 on one side of the frame simplifies the operation of the buggy by permitting it to unload on only one side, and this fits in with the efficient mode of operation of the buggy.

In describing the operation of conveyer 59 reference will be made to the mechanical arrangement drawings in FIGS. 1, 2, and 4 and to the electrical schematic diagram in FIG. 5.

Operation of conveyer 59 starts where the operation of the incoming station leaves off, with the buggy 61 traveling along the conveyer carrying an axle. This means that relay 181 in FIG. 5 has previously been actuated to close contacts 181a and thus to cause the motor 60 to operate in a forward direction. This in turn drives the chain 186 so as to move the loaded buggy from the rails 55 toward the incoming rails of the axle lathes 62–64.

The buggy moves along until it actuates one of the three switches 199–201 at the incoming rails of the three axle lathes 62–64, respectively. The first two of these switches are shunted by normally-closed contacts 171b and 172b, respectively. These contacts are governed by relays indicating the readiness of axle lathes 62 and 63 to receive axles for machining. Only one of these readiness-indicating relays, relay 171, is shown in FIG. 5 since the circuit in which the other such relay is connected is identical to it. If the axle lathes 62 and 63 are ready to receive axles, contacts 171b and 172b will be actuated and will therefore be open so that the opening of switches 199 or 200 will stop the buggy 61. Since the buggy reaches switch 199 first, the first axle will be stopped there.

Switch 199 is one pole of a multi-pole switch having a second pole 199a that closes at the same time connection is broken at pole 199. Closing the connection at switch 199a completes the circuit to a timer 203 and, after a predetermined interval, causes the contacts 203a to come together. Closure of the latter contacts actuates a solenoid valve 204 which is the same type as valve 161 in FIGS. 2 and 3. Operation of valve 204 applies hydraulic pressure to the cylinder 205, causing the plunger 208 thereof to move upward against the edge of the V-blocks 193 and to pivot the latter about hinge 194 so as to cause the axle thereon to roll off onto the incoming rails 209 leading to axle lathe 62. There are similar cylinders 206 and 207 at lathes 63 and 64. Momentary pressure of the axle as it rolls over the arm of a multi-pole switch 210 breaks the circuit to relay 171 at the same time that the other pole 210a closes the circuit momentarily to a relay 211, thus energizing the latter relay and causing normally-closed contacts 211a to open. Both switch 210 and contacts 211a are in series with relay 171, and opening either de-energizes relay 171 and opens contacts 171c. Opening of the latter contacts breaks the circuit to solenoid 204 thus retracting plunger 208.

When the plunger 208 moves up to tilt the V-blocks 193, it allows a normally-closed switch 212, which is held open by the plunger in its retracted position, to close, thus energizing the trip coil 168t of the previously-latched relay 168. This causes contacts 168b to open up the contacts 168c to close. A similar unlatching of relay 168 is effected by the closure of switches 213 and 214 operated by the buggy-unloading plungers of cylinders 206 and 207, in accordance with the previously-stated criterion that relay 168 is latched only while there is an axle on buggy 61. Each of the three switches 212–214 has a second pole 212a–214a connected in series with the motor-controlling relay 181 as part of circuit 179 to prevent the motor 60 from moving the buggy 61 while the plunger of any of the cylinders 205–207 is extended.

Upon retraction of plunger 208, the circuit to relay 181 is not restored, because relay 168 has been tripped and contacts 168b are open. However, contacts 168c are now closed, as is pole 164a of switch 164. The latter switch is located opposite rails 55 and is actuated by the buggy at the incoming station, and when the buggy moves away from there, pole 164a immediately closes. Closure of pole 164a, contacts 168c, and switch pole 212a completes the circuit to a relay 216 which actuates reverse contacts 216a to drive the motor 60, and hence the buggy 61, in reverse until switch pole 164a is again opened up by pressure of the buggy 61 thereon.

Switch pole 210a is shunted by contacts 211b in series with parallel contacts 172c and 173b. The latter two sets of contacts are controlled by readiness-indicating relays for lathes 63 and 64. If either of these lathes has no axle to work on, contacts 172c or 173b will be closed so that, when relay 211 is momentarily actuated by switch pole 210a, contacts 211b will close and there will then be a short-circuit around switch 210a, thus preventing relay 171 from being energized again. So long as relay 171 is not energized, no more axles will be delivered to lathe 62, and the buggy 61 will proceed directly to lathe 63 with the second axle and to lathe 64 with the third. Thereafter axles will be delivered to lathe 64 until its full-load indicating relay, similar to relay 211, remains actuated. When this happens, contacts 173b open up and remain open. The buggy 61 then begins delivering axles to lathe 63 until its full-load indicating relay remains actuated, thus opening contacts 172c and closing contacts 172b. Subsequently, buggy 61 delivers axles to lathe 62 until the arm of switch 210 remains depressed. At that point the buggy stops until one of the lathes can receive more axles.

If at any time, one of the three lathes 62–64 is jammed or otherwise stopped, even before its magazine is loaded, the corresponding switches 199–201 will be by-passed and rendered inoperative and no more axles will be delivered to the inoperative lathe. On the other hand if any of the lathes runs out of axles during the time the buggy 61 is shuttling back and forth to one of the other lathes, the lathe that is out of axles will automatically render inoperative all of the switches 199–201 except the one opposite its own incoming rails so that the buggy will automatically deliver the next axle to the lathe that is without any axles on which to work.

The simplicity of operation of conveyer 59 stems from the fact that the instructions given to the buggy 61 by way of electrical signals to the motor 60 are of only two kinds: to go forward and to go backward. These instructions occur in strict alternation and there is no need to provide a memory device to recollect how many axles have been delivered to which lathe, because the lathes will automatically call for axles as they are needed and will automatically reject axles if they are not needed. Once the buggy stops after having moved forward the next signal, automatically given, will inevitably and always cause it to move backward to the load position rails 55 and dwell until an open space occurs to the loading racks of any of the lathes.

INCOMING RAILS TO AXLE LATHE

The rails leading to and from lathe 62 are shown in plan view in FIG. 1a and in greater detail in FIG. 4. FIGS. 5 and 8 show the electrical connections for components mounted on or associated with the incoming rails 209 and FIG. 7 shows a mechanical detail of the rails in FIG. 4. Both the mechanical arrangement and the electrical circuits are substantially identical for all three of the lathes 62–64 and therefore only the arrangements for lathe 62 will be described in detail.

Referring first to FIG. 4, when the axles are ejected from the buggy 61 by the operation of cylinder 207 they roll onto the incoming rails 209 of axle lathe 62. These rails slope downward from the conveyer 59 towards the lathe. Near the bottom of the rails 209 is an escapement 217 which is substantially the same as escapement 152 described in the section entitled Incoming Station.

As in the case of escapement 152, the purposes of escapement 217 are to permit only one axle at a time to pass through to the lathe 62 and to align axles which may have gone askew in rolling down the incoming rails. Until the escapement 217 is actuated, axles line up along the upper section of rails 209 in an incoming axle magazine 71.

Below the escapement 217 at the end of rails 209 is a cradle 218 on which the axles come to rest one at a time after passing through the escapement. As shown more clearly in FIG. 6, cradle 218 is pivotally supported by a pin 219 at the end of an arm 221 which is extended from and retracted into the rails 209 by an hydraulic cylinder 220. The cradle is prevented by means of a hook 222 which engages a pin 223 from pivoting while it is holding an axle. The purpose of the cradle and arm is to move the axle forward to a location between the spindle centers of lathe 62. After this is done, the arm 221 is then retracted so as to be out of the way while the axle is being turned. In order to permit the cradle 218 to slide past the axle as the arm 221 is retracted, the hook 222, which is attached to a rod 220, is pivoted away from the pin 223 by means of an hydraulic cylinder 225, also attached to rod 220a, so that the cradle is free to pivot clockwise on the pin 219 to allow the upwardly extending outer end of the cradle to slide beneath the axle. Once free of the axle, the cradle pivots counterclockwise back into position automatically because most of its weight is behind the pin 219. The hook 222 may then be rotated back to re-engage pin 223.

To simplify the placement of the axle between the spindle centers of lathe 62 the left hand end of each axle is brought to a fixed location by means of a plunger 224 extending out of an hydraulic cylinder 226. This is shown in FIG. 7. The cylinder 226 is rigidly mounted with respect to the rails 209 and is located adjacent the cradle 218 when the arm 221 is in its retracted position. By causing the plunger 224 to extend a predetermined distance from the cylinder 226 each time an axle rolls onto the cradle, each axle is pushed to the right so that its left hand end is located in, or very near, a predetermined plane, no matter how long the axle may be. Then when the axle is placed between the spindle centers of lathe 62, the left hand end of the axle is properly positioned with respect to the left hand spindle center and only the right hand spindle head need be moved. Naturally both the right hand and left hand spindle centers must be retracted before an axle can be placed between them and both must then be extended to grip the axle before the arm 221 can be withdrawn and in fact before the hook 222 can be retracted from pin 223.

The electrical connections relating to the foregoing description of the mechanical operation of axles traveling from conveyer 59 to the lathe 62 are shown in FIGS. 5 and 8. These figures correspond electrically to parts of FIGS. 4, 6 and 7 which should be considered along with the circuit diagrams for greatest clarity. In FIG. 5 switch 210 is momentarily actuated by each axle as it rolls down the incoming rails 209. Actuation of switch 210 and particularly of pole 210a of the switch energizes the relay 211 which is so connected as to prevent another axle from being placed on the rails 209 while it is energized. The first few axles roll over the arm of switch 210 so that the relay 211 is only momentarily energized, but if axles are placed on the rails 209 rapidly enough, they line up along the rails 209 at location 71 until finally one of the axles remains in contact with the arm of switch 210. Thereafter no more axles can be placed on the rails 209.

The arm of a switch 227 is located adjacent the escapement 217 to be depressed by an axle waiting to pass through the escapement. This switch is shown in FIG. 8 as being in series with a relay 228. Also in series with the relay 228 is a switch 229 which is closed when the cradle 218 is in position to receive an axle and is locked by means of the hook 222. When switches 227 and 229 are both closed, the former by the weight of an axle waiting to pass through the escapement 217, relay 228 is energized from a voltage source 231, thus closing contacts 228a and 228b. The closing of contacts 228a energizes a solenoid valve 232 which operates the escapement-controlling cylinder 230 to open the escapement 217, thereby permitting an axle to pass through. The effect of closing contacts 228b is to short out the switch 227 so that, when the axle moves through the escapement, the circuit to the solenoid valve 232 will not be opened too quickly and thus cause the escapement 217 to revert to its closed position before the axle has gotten out of the way.

After passing the escapement 217 the axle rolls over the arm of a switch 233 just before dropping off of the rails 209 onto the cradle 218. The momentary closing of switch 233 energizes a relay 234 which opens the contacts 234a in series with the relay 228 and this in turn opens the contacts 228a which permits the escapement 217 to move back to its closed position. Closing the escapement 217 also closes a normally-open switch 236. The latter is connected in series with contacts 234b which are closed when the relay 234 is latched and with a switch 237 that is located adjacent the plunger 224 (FIG. 7) that positions the axle. The circuit is thus closed to a solenoid valve 238 that actuates the cylinder 226 to cause the plunger 224 to extend therefrom and to push the axle into its proper position. Movement of the plunger 224 opens one pole of switch 237 and closes pole 237a of the same switch, thus energizing a relay 239, to indicate that the axle has been positioned. This opens the contacts 239a and prevents another axle from moving past the escapement 217 and in addition it opens the contacts 239b to retract the plunger 224 by deenergizing the solenoid valve 238. Further, relay 239 closes contacts 239c which are connected in series with a relay 241. The purpose of relay 241 is to move the arm 221 forward. In order to prevent this from happening too soon, several switches are connected in series with relay 241, and all of them must be closed before the relay can be energized. Among the switches connected in series with relay 241 are two switches 242 and 243 which indicate that the spindles of lathe 62 are retracted and thus are out of the way so that an axle can be placed between them. Relay contacts 245a are closed when an elevator in lathe 62 is out of the way of incoming axles. The circuit to relay 241 is completed by contacts 234c which were closed by the latching of relay 234 as the axle moves onto the cradle 218. Completion of the circuit to relay 241 actuates the latter and closes contacts 241a, thus energizing a solenoid valve 244 that operates on the hydraulic cylinder 220 to extend the arm 221 so as to place the axle between the spindle centers of lathe 62.

The next step is to cause the spindle centers to move in and pick up the axle so that the arm 221 can be withdrawn. This is done by a relay 246 which is energized when a switch 247 is closed by a stop on the arm 221 when the arm is fully extended. Relay 246 energizes a mechanism in the lathe 62 to move the spindles centers in. This mechanism, which will be described in the section entitled Axle Machining Lathe, also closes contacts 248a which are connected in series with a solenoid valve 249 that operates the cylinder 225 governing hook 222. Also connected in series with the solenoid valve 249 are contacts 246a which are closed by the operation of relay 246 and contacts 239d which are closed by the operation of relay 239. Since contacts 246a and 239d were previously closed, the closing of contacts 248a when the spindle centers move in to pick up the weight of the axle permits the solenoid valve 249 to be energized and thus to energize the hydraulic cylinder 225 to retract the hook 222 away from the pin 223 to allow the cradle 218 to pivot on the pin 219.

When the cradle 218 pivots to release the axle, it closes a switch 229b, which is the second pole of switch 229, and energizes the tripping coils 234t and 241t of relays 234 and 241. Energizing the tripping coil 241t allows the normally-closed contacts 241b to close and thus to energize 244r, which is the solenoid governing the retracting cylinder 220 of arm 221. Arm 221 telescopes into the rails 209 and closes switch 251.

Since contacts 234d have already been closed by the tripping of relay 234, the circuit of the tripping coil 239t of relay 239 is completed. At the same time the second pole 251a of switch 251 is opened, breaking the circuit to relay 246 and opening the contacts 246a. This opens the circuit to solenoid 249 and locks the cradle 218 by pivoting hook 222 over pin 223. The mechanism and circuit are ready for the next axle.

AXLE

The incoming station, conveyer 59 and the incoming rails 209 to lathe 62 can handle any kind of railroad car axle or similar cylindrical object. Not so the axle lathe, which is set up to perform only certain limited types of operations that depend entirely on the shape of the workpiece being machined. Therefore, before describing the axle lathe reference will first be made to FIG. 9 which shows one end of a railroad freight car axle of the type that the lathe is designed to handle. This axle is an elongated steel bar having an unmachined central section 252. The machined parts of the axle are at the ends and, starting at the outer end of the axle, there is a button, or end collar, 253 in which is a center depression 254. The purpose of this depression 254 is to enable the entire axle to be centered in the axle and burnishing lathes without resorting to a multi-jawed chuck. In this way the button 253 can be machined all the way out to the end. Next to the button 253 is the journal 256 which is the part on which one of the bearings of the freight car rests. In order to make the surface of journal 256 as smooth as possible, it is burnished in the burnishing lathe 79 after being finish-machined by one of the axle lathes 62–64.

At the inner end of the journal 256 is a dust guard 257 of somewhat larger diameter. The dust guard 257 and the journal 256 are joined by a fillet section 258 of standard radius. Depending on the relative diameters of journal 256 and dust guard 257, the profile of the fillet 258 may form a quarter circle or less than a quarter circle or may even be a quarter circle plus a radially flat section adjoining the outer end of dust guard 257. This latter condition would be obtained if the diameter of the journal 256 were relatively small and the diameter of the dust guard 257 were relatively large. At the inner end of the dust guard 257 is the wheel fit, or wheel seat, 259 joined to the dust guard by a fillet 261 of standard dimensions. Again there may be different relative diameters of the dust guard 257 and the wheel seat 259, so that the fillet 261 is subject to the same type of variations as fillet 258. At the inner end of the wheel fit 259 is a final fillet 262 which joins the wheel seat to the unmachined section 252.

The distance between the two wheel seats of an axle is fixed by the standard railroad track gauge since this is the section of the axle on which the wheels are mounted, but the load-bearing capacity varies, depending on the length and diameter of the bearing journal 256. The longer the bearing journal, the wider can be the bearings of the freight car and thus the greater will be the load-bearing capacity of the axle. The possible extra length of the journal 256 is indicated in FIG. 9 by the dotted extension 263 of the axle, and all of the component devices making up the system of this invention are easily or automatically adjustable to handle a wide range of axle sizes.

In each of the several standard axle sizes there are definite diameters which are permissible for the bearing journals 256. The diameters of the journals and other machined sections of an axle received into the system of the invention are determined by prior machining operations, if any, and must therefore be measured in order to perform a new machining operation. The measurements are automatically made within the lathe 62, itself, which is described and claimed in a co-pending patent application, Serial No. 770,347, filed on Oct. 29, 1958 now abandoned by William R. Miller and Frederic William Young, entitled "Axle Lathe," and assigned to the assignee of the present invention. Since the lathe forms a part of the automatic system of the present invention, its essential features will also be described in the following section.

AXLE MACHINING LATHE

In describing the axle lathe 62 reference will be made to: FIG. 6, which is a cross-sectional view of the bed of the lathe, including the axle elevator; FIG. 10, which is a front elevational view; FIG. 12, which particularly shows the operation of the automatic templet and tracing devices; and FIG. 11, which shows the operation of the platform of the elevator in FIG. 6. Reference will also be made to FIG. 13, which is an electrical schematic diagram of the automatic controls associated with the lathe. All description will be limited to lathe 62 since lathes 63 and 64 are essentially the same.

As shown in FIG. 10 the lathe 62 comprises a bed 264 on which two spindle heads 266 and 267 are supported. Spindle head 266 is relatively stationary except that it may be moved to different locations for different types of axles but once set up for a particular type of axle, it is fastened in place. Spindle head 267 on the other hand moves back and forth to accommodate each axle machined by the lathe. Motion of spindle head 267 to the left is accomplished by means of a pusher bar 268 which is threaded at one end so as to engage gears within a tower 269 that is firmly attached to the bed 264 of the lathe. The gears in the tower 269 are connected to and operated by a reversible pusher motor 271.

The bar 268 is not directly connected to the spindle head 267 but instead pushes on the center of a system of heavy leaf springs 272, the ends of which are attached to the spindle head 267. When an axle is to be machined, the pusher motor 271 causes the bar 268 to be pushed to the left and to exert pressure on the leaf springs 272 until these springs bow in by a predetermined amount corresponding to a fixed amount of pressure exerted on the spindle head 267.

The axles to be measured and machined are held between rotating thrust shoes 273 and 274 which are supported by the spindle heads 266 and 267, respectively. These thrust shoes have faces of friction material which engage the end of the axle to be supported and permit the axle to be held merely by longitudinal pressure on its ends rather than by being grasped by the jaws of a chuck. The left hand spindle head 266 has a center 276 which extends through the thrust shoe 273 and engages the depression 254 (see FIG. 9) of the axle. A corresponding center 277 extends from the right hand spindle head 267. Center 276 can slide a limited distance within spindle head 266 under the control of an hydraulic cylinder 275 and a spring (not shown) within the spindle head. Center 277 can also slide within spindle head 267 and is spring-loaded so that it normally extends as far out of the thrust shoe 274 as its limited range of movement will permit. The spindles are driven by motors 278 and 279 connected in parallel.

The cutting tools of the lathe are carried on a pair of carriages 281 and 282 which slide longitudinally along the bed 264 driven by longitudinal feed motors 283 and 284, respectively, operating on gears (not shown) that mesh with a fixed feed screw 286. The carriages 281 and 282 are also provided with cross feed motors 287 and 288, respectively, to drive the carriages in a direction perpendicular to the length of bed 264. Both the longitudinal feed motors 283 and 284 and the cross feed motors 287 and 288 are automatically controlled to machine each axle to a proper size and shape, that is, to reduce the diameter of the journal to the next smaller predetermined size and to reduce the diameters of the button, dust guard, and wheel seats by predetermined amounts, without changing the longitudinal location of the fillets between the journal and the dust guard and between the dust guard and the wheel seat.

Control of the operation of the longitudinal feed and cross feed motors is determined by templets 289 and 291 which govern the machining of the left and right ends of the axles. These templets are carried on supports 292 and 293, respectively, which in turn are pivoted about hinges 294 and 296 and a central bar 297. The pivoting force for the supports 292 and 293 is supplied by a pair of hydraulic cylinders 298 and 299 which are connected to the left spindle head 266 and to the right spindle head 267.

After the machining operation is over, axles are removed from the spindles by an elevator which is partially shown in FIG. 10 and somewhat more completely shown in FIGS. 6 and 11. The elevator consists of a platform 300 raised and lowered by a piston (not shown) in an hydraulic cylinder 301. A pair of pivoted V-blocks 302 rests on the platform 300. These blocks support the axle to lift it from the spindle level to the level of the outgoing rails 66. As shown particularly in FIG. 11, a dog 303 extending from the blocks 302 engages part of the framework of rails 66 to tilt the blocks and thus to roll the axle off onto the rails.

Operation of the templets may be more clearly understood by referring to FIG. 12 which shows a cross sectional view of the lathe in FIG. 10. Only one of the templets 289, together with its support 292, is shown in FIG. 12. After the axle has been delivered by the arm 221 to the spindle heads of the lathe, the templet support 292 is rotated forward so that the front edge of the templet 289 contacts the surface of the axle. The templet automatically adjusts itself to the configuration of the axle and further adjusts itself automatically to a corresponding next smaller size of the machined section so that, in essence, the axle is its own templet. Thereafter the templet support 292 is rotated back to the upright position where the rear edge of the templet can make contact with a feeler 304. The feeler is part of a sensing element 305 which in turn is supported on an upwardly extending arm 306 that is firmly attached to the left hand carriage 281 to move along therewith. One or more cutting tools 307 are connected to the front end of the carriage 281 to machine the axle. By means of electrical control circuits, which may be of the conventional automatic tracing or telautograph type, movement of the feeler 304 as the carriage 281 moves along longitudinally of the bed 264 is transformed into electrical signals. These signals are connected to the drive motor 283 and the cross feed motor 287 to control the speed of movement of the carriage both longitudinally of the bed 264 and at right angles thereto so as to cause the cutting tool 307 to cut a new surface on the axle controlled exactly by the surface of the templet, which itself is adjusted according to the surface of the same axle prior to machining.

The electrical control of the lathe 62 is by means of the circuit in FIG. 13, and in describing the operation of this circuit reference will be made not only to FIG. 13 but also to corresponding components shown in the mechanical drawings of FIGS. 6, 10, and 12.

When an axle rolls down to the end of the rails 209 and off onto the cradle 218, the lathe must be ready to receive the axle before the arm 221 will extend forward to bring the axle into place between the spindle heads 266 and 267. This is controlled by relay 245 which is energized only when switch 308 is closed. Switch 308 is actuated by an elevator platform 300 and is closed when the elevator mechanism is in the "down" position as indicated in FIG. 6. This permits the hydraulic cylinder 220 to extend the arm 221 so as to bring the axle into place between the spindle heads 266 and 267.

Next the axle must be picked up and held between the thrust shoes 273 and 274 shown in FIG. 10. In order to do this in such a way as to assure that the axle will be properly centered, the left hand center 276 is pushed out, that is, to the right, by means of the hydraulic cylinder 275 so as to engage the center depression 254 in the end of the axle while the axle is still supported by the cradle 218. Movement of the piston within the cylinder 275 is controlled by a solenoid valve 309 which is energized when the contacts 246c, controlled by relay 246 in FIG. 8, are closed. At the same time that the contacts 246c are closed, the contacts 246d are also closed, energizing a relay 310 which closes the normally-open contacts 310a to connect the pusher motor 271 to a source of power 315 so as to force the pusher bar 268 to the left. At this point the axle is suspended between the center 276 extending from the left hand spindle head 266 and the center 277 extending from the right hand spindle head 267. The latter spindle head continues to move to the right under pressure from the bar 268 thereby exerting against the center 276 a greater pressure than is exerted by the hydraulic cylinder 275. As a result the center 276 is caused to retract into the spindle head and, at about the same time, the spring-loaded right hand spindle center 277 is compressed into the right hand spindle head 267.

The pressure applied by the bar 268 continues to build up until the leaf springs 272 bow to the left sufficiently to actuate a switch 311 which energizes a relay 248, indicating that the axle is supported by the thrust shoes 273 and 274. This relay opens up contacts 248b, which ultimately cause the arm 221 to draw back into the rails 209 as discussed in the section entitled "Incoming Rails to Axle Lathe." In addition relay 248 opens up contacts 248c to de-energize solenoid 309, since it is unnecessary to continue applying hydraulic pressure to the cylinder 275. Relay 248 also opens up contacts 248d to de-energize the relay 310 and thus to open up contacts 310a so as to stop the pusher motor 271. It has been found that the switch 311 should be set to operate when the deflection of the spring 272 indicates that a pressure of about 5 tons is being exerted on the spindle head 267 by the bar 268.

In addition to opening up the contacts 248b, 248c and 248d the relay 248 closes contacts 248e and 248f. Contacts 248e are connected in series with a solenoid 312 that energizes the hydraulic cylinders 298 and 299 to cause the templet supports 292 and 293 to swing over so that templets 289 and 291 can engage the axle sections to be machined. In order to be sure that the templets are firmly and properly positioned, the cylinders 298 and 299 continue to exert increasing pressure on the supports 292 and 293 until a pair of normally-closed pressure switches 313 and 314 open up, at which time the templet supports 292 and 293 swing back to the upright, or tracing, position. In the tracing position the templet supports close a pair of normally-open switches 316 and 317.

Closing of the contacts 248f and switches 316 and 317 energizes the spindle motors 278 and 279 to start the axle rotating. In addition, the closing of switches 316 and 317 also initiates operation of the left and right hand servo or telautographic contour-sensing and control apparatus 318 and 319, respectively, to generate the necessary electrical signals to control the drive motors 283 and 284 and the cross feed motors 287 and 288. All of these motors are operated by means of conventional amplidyne control circuits with amplidynes 321 and 322 operating the left hand longitudinal feed motor 283 and cross feed motor 287, respectively, and amplidynes 323 and 324 operating the right hand longitudinal feed motor 284 and cross feed motor 288 respectively. By means of sensing and control circuits of the telautograph or curve tracing type the motion of the two carriages 281 and 282 is properly controlled to guide the cutting tools 280 in machining new surfaces.

While the machining operations are carried on more or less simultaneously for both ends of an axle, it is not necessary that the machining be exactly simultaneous. However, when it is necessary to change the speed of spindle motors 278 and 279 to machine one section of a work piece at a different peripheral velocity than another section, it is necessary that both carriages 281 and 282 reach the same section of the work piece at the same time, or if one carriage reaches that section before the other, the first carriage must rest and wait until the second carriage catches up. This type of operation is more extensively described in the application of William Miller and Frederic Young referred to hereinabove.

After the axle has been completely machined so that the entire sequence of events determined by the contour-sensing and control apparatus has transpired, the contacts 318a are opened up cutting off the electrical power that drives the spindle motors 278 and 279 in the forward direction, and contacts 318b are closed to connect electrical power to these two motors to plug them, which means to stop the motors by connecting them so as to operate in the reverse direction. Such connection is broken once the motors come to a halt.

Also following the automatic machining sequence, contacts 318c are closed thus energizing a time-delay relay 326. This latter relay is connected to contacts 326a which are in series with a solenoid 327u that governs the control of hydraulic fluid to the hydraulic elevator cylinder 301 to cause the elevator to move upward against the axle. As the elevator rises, it actuates a switch 328 when the V-blocks 302 reach a position just under the axle. As a result of actuating switch 328, the physical location of which is shown in FIG. 10, the circuit to the solenoid 327u is opened, causing the elevator to stop rising. In addition, a second arm 328a of the switch 328 closes, thereby energizing a relay 329, which closes contacts 329a, energizing the solenoid 309 and again applying pressure to the cylinder 275 to push the center 276 to the right. At the same time contacts 329b are closed energizing the pusher motor 271 in the reverse direction so as to withdraw the pusher bar 268 to the right, thereby allowing the pressure of the center 276 to push the axle and the right hand spindle head 267 to the right until the right hand spindle head makes contact with an electrical switch 331. Switch 331 energizes a relay 332, which opens up contacts 332a and 332b to withdraw hydraulic pressure from the center 276 and to disconnect the motor 271 from its source of voltage. The axle is then free of both spindles and rests only upon the V-blocks 302.

When the center 276 moves back, it engages a switch 333 that energizes a relay 334 which in turn closes contacts 334a to short-circuit switch pole 328 and to supply power again to the solenoid 327u. The solenoid 327u then connects the elevator cylinder 301 again to the source of hydraulic fluid and causes the V-blocks 302 to move upward, carrying the axle to rails 66.

OUTGOING RAILS FROM AXLE LATHE

The rails 66 leading downward away from the vicinity of lathe 62 toward conveyer 76 are shown in FIG. 1a and FIG. 4. The electrical diagram for components shown in the latter figure is FIG. 14.

In FIG. 4, as the axles roll down the rails 66, they operate a shock absorber 334, momentarily actuate a switch 336, roll over a pivoted and counterweighted stop 337, and finally come to rest against an escapement 338. The purpose of the stop 337 is to prevent axles from bouncing off the escapement and rolling back up and over the end of rails 66. Shock absorber 334 also assists in dissipating the kinetic energy of the axles. Escapement 338 is similar to escapement 217 and is operated by an hydraulic cylinder 339. A switch 341 is located so as to be actuated by an axle in position to pass through the escapement.

In the circuit in FIG. 14 the electrical sequence moves from right to left, as indicated by the arrow 342, to correspond with movement of axles along the rails 66. The effect of actuating switch 336 is to energize a relay 343 by connecting it across a voltage source 344. Contacts 343a of the relay are connected in series with a solenoid 327d which reverses hydraulic pressure in the cylinder 301 to lower the elevator to the bottom. As long as switch 336 remains closed, the elevator cannot be raised again, as for example when the axle magazine 346 is filled, and this prevents an excessive number of axles from being loaded onto rails 66.

Before the escapement 338 can be lowered to allow an axle to pass through, several conditions must be fulfilled. In the first place switch 341 must be closed by the weight of an axle. Under normal conditions this energizes relay 347 through a chain of normally-closed contacts. In this chain contacts 348a are normally closed when the outgoing axle magazine of lathe 63 corresponding to magazine 346 is not full. Similarly, contacts 349a are normally closed when the outgoing axle magazine of lathe 64 is not full. If the magazines of either lathe 63 or lathe 64 are full, axles will be taken from them instead of from magazine 346 unless magazine 346 is also full, in which case contacts 343b will be closed and axles will be drawn from magazine 346 to be sent to the burnishing machine 79. Relays to operate contacts 348a and 349a are not shown but are equivalent to relay 343 except, of course, that one is associated with the outgoing rails 67 from lathe 63 and the other with the outgoing rails 68 from lathe 64. The final set of normally-closed contacts in series with relay 347 is indicated by reference character 351a. Once relay 347 has been energized, it remains energized via contacts 347a until contacts 351a is opened, which happens when an axle starts down the incoming rails 77 to the burnishing lathe 79.

Relay 347 closes contacts 347b in series with a solenoid 352 that controls the hydraulic cylinder 339. Also connected in series with solenoid 352 are contacts 353a, controlled by relay 353, and contacts 354a and 356a controlled by relays similar to relay 353 but associated with lathes 63 and 64, respectively. The final link in the chain consists of contacts 357a controlled by relay 357. The latter is energized by the closing of a normally-open switch 358 when the buggy 74 is in place in front of rails 66. Once the circuit to solenoid 352 is complete, the escapement 338 swings open, and the waiting axle rolls off the rails 66. As it rolls, it actuates a switch 359. Switch 359 energizes the latching coil of relay 353 to indicate that the buggy 74 has been loaded, and relay 353 opens up the contacts 353a to permit the solenoid 352 to be de-energized to let the escapement 338 swing back up.

CONVEYER 76

FIGS. 1a and 1b show conveyer 76 in plan view and FIG. 15 is a schematic diagram of the electrical components associated with the conveyer.

After the machined axles have reached the lower end of outgoing rails 66 of lathe 62 or the corresponding locations on rails 67 and 68 of lathes 63 and 64, they are ready to be transported by the buggy 74 to conveyor 76. Buggy 74 is identical with the buggy 61 on conveyer 59 and so it is unnecessary to describe it in detail. Furthermore, the conveyer 76 is of the same construction as conveyer 59 and likewise will not be described in detail.

Conveyer 76 has two modes of operation. In the normal mode the buggy 74 receives axles from the outgoing rails 66–68 at each of the three lathes 62–64 and delivers them to rails 77 leading to the burnishing lathe 79. In the second mode, buggy 74 receives rough-machined axles from lathe 62, only, and delivers them to the axle storage rack 92. In the first mode the buggy has three pick-up locations and one delivery location, while in the second mode the buggy merely shuttles back and forth between one pick-up location and one delivery location. In either mode when buggy 74 starts up after having stopped, either to receive or to deliver an axle, it always starts in the reverse direction from that in which it was moving just before it stopped. It never starts up again in the same direction.

When the automatic controls for conveyer 76 are set by the system operator at the control desk 101 to provide first-mode operation, an axle is removed from the buggy 74 onto rails 77 and the buggy immediately and automatically receives a signal to pick up the next axle from either rails 66, 67, or 68. If there is an axle on one pair of these rails but no axles on the others, the buggy will immediately move to the rails where an axle is waiting. At the other extreme condition, if there are axles on all of the sets of rails 66–68 and one of the sets, for example rails 66, has so many axles that the switch 336 (FIG. 14) is held closed, the buggy 74 will first take an axle from these fully-loaded rails before taking one from the partly loaded rails 67 and 68. Finally, if each pair of rails 66–68 is only partly loaded, the buggy will take the first axle from rails 66, the second from rails 67, and the third from rails 68 and will repeat this sequence until all axles have been taken.

It should be noted that the buggy 74 operates differently in receiving finish-machined axles from lathe 62 than in receiving them from lathes 63 and 64. This is because rails 66 are directly opposite the incoming rails 77 of the burnishing lathe 79 and therefore, an axle loaded onto the buggy 74 from rails 76 need not be transported along the conveyer 76 but may be expelled directly to the incoming rails 77. As a result the buggy 74 merely acts as a transfer device between rails 66 and 77. This is a very efficient way to transfer the axles and is one of the key reasons why the lathe 79 is located directly opposite lathe 62. In any event, lathe 79 must not be located to the right of lathe 62 as viewed in FIG. 1a for the reason that it would then be necessary to transport axles from left to right along conveyer 76, which would greatly complicate the electrical instructions which would have to be given to the buggy 74. Therefore, the lathe 79 is shown in the extreme right position that it could occupy according to the system of the invention. It would be possible of course to locate lathe 79 beyond its present location, that is to the left of its present location, but this would obviate the efficient mode of transfer of axles from rails 66 to rails 67.

It is contemplated that on occasion new axles would have to be machined in order to replace those which were tested and found to be unusable. In this case, lathe 62 would be set up to perform a rough machining operation on new axles. These axles would follow the same path through the rails leading to and from lathe 62 and would be loaded onto the buggy 74 at the end of the outgoing rails 66. Instead of being expelled directly to the incoming rails 77 of the burnishing lathe 79, these roughly machined axles would be transported to the left to the incoming rails 93 of the axle storage device. In this event the buggy 74 would move between only two stations, one where it received axles and one where it ejected them. This is the same type of operation as before, with axles moving only from right to left.

Referring now to the electrical diagram in FIG. 15 in conjunction with FIGS. 1a and 1b, the two modes of operation of conveyer 76 will be described separately, starting with the more common mode in which axles are finish-machined in lathes 62–64 and are then transported by buggy 74 to the rails 77 leading to the burnishing lathe 79.

The mode of operation is determined by whether or not push-button 361 is depressed. If it is depressed, relay 362 is energized and conveyer 76 is placed in condition to transport rough-machined axles from the outgoing rails 66 of lathe 62 to the incoming rails 93 of the axle storage rack. If it is not, axles go to the burnishing lathe.

In the latter case, contacts 362a remain in their normally-closed state and contacts 362b remain open.

In order to move the buggy 74, motor 75 must be energized. This is done either by closing contacts 363a, which causes the buggy to move forward (from right to left in FIG. 1a) or contacts 364a, which causes the buggy to move backward (from left to right). Contacts 363a are controlled by relay 363 and are closed when this relay is energized from a voltage source 366. In order to complete the energizing circuit one of the sets of contacts 353b, 354b, or 356b must be closed. Referring for the moment back to FIG. 14, it will be seen that contacts 353b are closed by a latched relay 353, which is energized as an axle rolls off the end of rails 66 and momentarily closes switch 359. Corresponding relays associated with the outgoing rails 67 and 68 of lathes 63 and 64 close contacts 354b and 356b when axles are taken from the latter rails instead of from rails 66.

The circuit to relay 363 is complete except for a normally-closed switch 358a, which is the second pole of a switch 358 in FIG. 14. This switch is located so as to be actuated when the buggy 74 is in place between rails 66 and 77. Thus, if the buggy happens to be in that location to receive an axle from rails 66, the buggy will not move because the relay 363, and hence the motor 75, cannot be energized. On the other hand, if the buggy were not at that location but were in front of rails 67, the switch 358a would be closed, and then relay 363 would be energized when contacts 354b were closed by the loading of an axle onto the buggy. The motor 75 would move the buggy along until it actuated switch 358a, whereupon the motor would stop. This is the way that axles are delivered from lathes 62–64 to the incoming rails 77.

Once the axles arrive, they must be unloaded by tipping the axle-carrying part of buggy 74. This is done by an hydraulic cylinder 366 underneath conveyer 76. This cylinder is similar to cylinder 205 under conveyer 59. The pressure fluid to cylinder 366 is controlled by a solenoid valve 367, which, in turn, is energized when a time-delay relay 368 closes the normally-open contacts 368a. In order to do so, relay 368 must be energized via contacts 357c together with one of the three sets of contacts 353d, 354d, and 356d, one of which would have been closed when an axle was loaded onto the buggy 74. Contacts 357c are closed by a relay 357, shown in FIG. 14, which is energized by the buggy's closing switch 358 at rails 66 and 77. Thus, if the buggy is already at the latter location by virtue of having received an axle from rails 66, the cylinder 366 can be actuated immediately to transfer the axle to rails 77.

When the axle is unloaded from the buggy 74 onto the rails 77, it rolls down and momentarily closes a switch 369. Because contacts 353e are already closed the momentary closing of switch 369 energizes a relay 351. The purpose of relay 351 is to indicate electrically that the buggy, having been loaded from rails 66, has been unloaded. Relay 351 is one of three similar relays the other two of which are not shown, but which serve similar functions to relay 351 by indicating that the buggy, having been loaded from rails 67 and 68, is now unloaded.

As part of the electrical indication that the buggy is now unloaded, contacts 351b are closed by relay 351. These contacts are in series with the tripping coil 353t of relay 353 which was energized when the buggy was loaded from rails 66. It will be seen, therefore, that the energized states of relays 353 and 351 indicate converse conditions: relay 353 is energized when the buggy is loaded from rails 66, and relay 351 is energized when the buggy is unloaded.

When the tripping coil 353t is energized, it opens up contacts 353b which were the only contacts of the three pairs 353b, 354b and 356b that were closed. Therefore this opens up the circuit to relay 363 and prevents the motor 75 from being energized again in the forward direction after the buggy is unloaded. In addition contacts 353c are permitted to return to their normally-closed state thus closing one link in the chain of connections to energize relay 364 and thus to cause the motor to draw buggy 74 backward.

Another link in the chain is switch 371 which is actuated by the piston of the unloading cylinder 368. This switch is a normally-open switch and is held closed when the piston is retracted, as it will be at all times except when solenoid 367 is energized. This solenoid is de-energized when contacts 353d are opened at the time the tripping coil 353t is energized.

A further link in the chain of connections is switch 369a which is the second pole of switch 369 and which is normally closed except during a momentary opening as it is actuated by an axle. However, switch 369a remains open if there are so many axles stored along rails 77 that the uppermost axle rests upon the arm of switch 369a. It thus forms an interlock which prevents the buggy from moving until the excess accumulated axles have passed through the burnishing lathe 79.

The circuit to energize relay 364 also includes a parallel circuit consisting of two sets of contacts 373a and 374a. These contacts are operated by relays corresponding to relay 347 (FIG. 14) and are closed when there is an axle waiting on rails 67 and 68 respectively. If there are no axles waiting on these rails, neither of the sets of contacts 373a nor 374a will be closed and therefore the motor 75 cannot be energized to haul the buggy 74 backward. On the other hand, if there is an axle waiting on rails 67, contacts 373a will be closed and the normally-closed contacts 373b will be open. The latter contacts are in parallel with a normally-closed switch 376 which is located opposite the rails 67 so as to be opened by the buggy 74 when it reaches the proper position to receive an axle from rails 67. A similar switch 377 is located opposite the rails 68. As the buggy moves back it encounters switch 376 first and will normally stop at rails 67 unless contacts 373b are closed, short-circuiting switch 376, in which case the buggy will proceed until it actuates switch 377 and de-energizes the relay 364 and consequently the motor 75.

However, before the motor 75 can be energized it is necessary, as a final link in the chain of connections to relay 364, that either the normally-closed contacts 347c remain closed or that contacts 357b be closed. Contacts 357b are energized, as described in connection with FIG. 14, when the relay 357 is energized and this occurs when the buggy is away from the position between rails 66 and 77. Therefore contacts 357b will always be open in the first mode of operation when the buggy is in position between rails 66 and 77 in order to deliver an axle to the latter rails. Therefore, the only pair of the two pairs of contacts 347c through which relay 364 can be energized is contacts 347c. There are two conditions when these contacts are closed, one is when there are no axles waiting on rails 66 to be transferred to the incoming rails 77 of thhe burnishing lathe 73. The other condition is when there has just been a transfer of an axle from rails 66 to rails 77. In that case the contacts 347c will be closed, even though there may be another axle waiting on rails 66. The reason for this second condition is that it permits axles to be drawn in sequence from rails 66, 67 and 68; otherwise axles would be drawn only from rails 66 so long as there were any axles there and no axles would be drawn from rails 67 and 68 until those rails were completely loaded with axles. This would mean that lathe 62 would do much more work than lathes 63 and 64.

It will be observed in FIG. 14 that there are normally-closed contacts 351a in series with the relay 347 that indicates the state of readiness of rails 66 to deliver an axle to the buggy 74. These contacts are opened when relay 351 is energized, and, as has just been described, relay 351 is energized when the buggy 74 is unloaded. By keeping relay 351 energized until the buggy 74 is loaded from one of the other pairs of rails 67 and 68, relay 347 may be kept de-energized and contacts 347e may be kept closed. The circuit for keeping relay 351 energized consists of contacts 351c and one of the three pairs of contacts 347e, 373e and 374b. Under the conditions postulated, contacts 347e cannot be closed, but contacts 373c and 374b will be closed if there is at least one axle waiting on rails 67 and 68, respectively. In that case, once an axle has been transferred from rails 66 to rails 77, the next axle cannot be drawn from rails 66 but must be drawn from either rails 67 or 68, depending upon which is ready to deliver an axle.

Contacts 343c, 379c and 380c are closed when the rails 66–68, respectively, are fully loaded. The result is that, if any one of these three pairs of rails is loaded and switch 369 is closed, relay 351 (and simultaneously the corresponding relays associated with rails 67 and 68) will be energized, thus de-energizing relay 347 (FIG. 14) and corresponding relays 373 and 374 associated with rails 67 and 68, respectively, and consequently all three sets of contacts 347e, 373c, and 374b will be opened. As a result relay 351 will be de-energized and the buggy 74 will pick up an axle from the nearest fully loaded rails 66, 67, or 68.

The alternative mode of operation is for the buggy to transport rough-machined axles from rails 66 to the axle-storage rack 92. In order to place the conveyer 76 in this second mode of operation the push button 361 must be depressed so as to energize relay 362. This closes contacts 362b and 362c and opens contacts 362d. In that case when an axle is loaded onto the buggy 74 at rails 66, closing contacts 353b, and the escapement 338 returns to the upright position holding the normally-open switch 382 closed, relay 363 will be energized.

It should be noted that switch 382 is merely representative of switches operated by the escapements at the ends of each of the outgoing rails from the axle lathes. All such switches would be connected in series with switch 382. As soon as the relay 363 is energized through this circuit, the contacts 363a will be closed and the motor 75 will drive the buggy 74 forward until it reaches a switch 383 opposite the rails 93. This switch is normally closed but is opened by the buggy so as to interrupt the flow of current to relay 363 and thus stop the motor 75.

Since the buggy was loaded from rails 66, contacts 353d would be closed. Thus when the second pole 383a of switch 383 is actuated, a time-delay relay 384 will be energized which in turn will cause the contacts 384a to close and thus to energize a solenoid 386 which is connected to an hydraulic cylinder 387 to tilt the axle-supporting structure of buggy 74 and causing the axle to roll off onto the rails 93. While this cylinder 387 is energized, the normally-open switch 372 associated therewith is allowed to open up so as to prevent either relay 363 or 364 from being energized.

As the axle rolls down rails 92, it momentarily closes a switch 388, which energizes relay 351 and, as described heretofore, results in de-energizing relay 353 (FIG. 14) and opening contact 353d so as to de-energize solenoid 386 and retract the piston back into cylinder 387. When the piston slides into cylinder 387, it closes switch 372, but relay 363 cannot be energized again because contacts 353b are now open. However, relay 364 can be energized to draw the buggy back to rails 66 for another axle.

The path for energizing relay 364 in this second mode differs from that of the first mode by including contacts 357b, now closed, and contacts 347d and 362c. Contacts 347d will, of course, only be closed if there is an axle waiting on rails 66, and unless there is, the buggy will stay beside the axle storage rack 92.

AXLE STORAGE RACK

Before turning to a detailed discussion of the burnishing lathe 79, the axle storage rack 92 will be discussed.

The purpose of the axle storage rack, which is shown in FIGS. 1a and 16, is to receive new axles which have been rough-turned on lathe 62 and to store these rough-turned axles until it is necessary to feed them into the system. Under normal conditions there will be an ample supply of old axles entering the incoming station (FIG. 3) and therefore it is expected that relatively few new axles will be required. Lathe 62 may be set up periodically to do the rough-turning at a time when it is not otherwise needed for doing the finished turning. For example, it may be that it will be necessary to operate lathe 62 only one night a week to rough-turn enough axles to last for a week's operation.

The storage rack 92 consists of two sets of inclined rails, an upper pair 93 which begins adjacent the conveyer 76 and slopes away from it, and a lower pair 94 directly under the upper set. Axles may be unloaded from the buggy 74 onto the upper rails by means of a cylinder 387 in the same way that axles are unloaded from buggy 61 onto rails 209 by cylinder 207 in FIG. 4.

Once unloaded the axles proceed down the inclined rails 93 under the force of gravity. If desired, one or more escapements 402 and 403 similar to escapement 152 shown in FIG. 2 may be attached to the rails 93 so as to control the movement of the axles and to prevent a large number of them from piling up together and exerting an excessive combined force on the second escapement 403 at the lower end of the rails 93.

Just beyond the lower end of the rails 93 is an elevator with a platform 404 supported on a pair of rod 406 (only one of which is shown in the drawing) which are raised and lowered by means of a pair of hydraulic or air-operated cylinders 407. These cylinders are actuated by the pressure of hydraulic fluid applied to the lower intake line 408 and are lowered by applying hydraulic fluid to the upper intake line 409. Platform 404 is somewhat V-shaped to give the axles a secure resting place while the elevator is descending to the lower rails 94, and in order to permit the axles to roll off onto the lower rails the platform is hinged near its front side at pin 411. As the elevator descends, the rear side of platform 404 strikes a stop 413 that tilts the platform enough to roll the axle forward onto the rails 94. These rails have at least one escapement 414 to stop the heavy axles at the lower end of the rails 94. Escapement 414 also controls the movement of axles onto the buggy 61 carried on the conveyer 59.

Since the purpose of the storage rack is only to store axles until they are needed for further use in the system, the rails 93 and 94 may be as long as desired, being limited only by the available space within the machine shop and by the necessity to have enough slope so that the axles will move when the escapements open up. By having the storage rack extend from a higher conveyer 76 to a lower conveyer 59, it becomes unnecessary to supply any motive power to move the stored axles. The only energy expended is in raising the elevator platform a relatively short distance. Furthermore, the unidirectional flow pattern of the axles on the conveyers 59 and 76 is maintained by locating the storage rack beyond lathe 62 (in the sense of being in the direction of travel of axles on conveyer 76). As explained in the description of conveyer 59, the advantage of having a unidirectional flow pattern is that it reduces the complexity of instructions that must be given (by means of electrical signals) to the buggies 61 and 74 and makes possible a simple, automatic axle handling system without an overriding memory device to keep track of operations.

The electrical circuit connected with the components of the axle-storage rack 92 is shown in FIG. 17.

As the axles roll down the upper rails 93 they strike a switch 416 at the first escapement 402. Assuming that the switch 417 on the other side of escapement 402 is not depressed by the weight of an axle, the closing of switch 416 energizes a relay 418 which closes contacts 418a and 418*b*. These contacts complete the circuit to energize a solenoid 419 from a voltage source 421 to open the escapement 402 and to permit an axle to pass on down the rails 93.

The axles work their way down to escapement 403 and actuate a switch 422. This switch is connected in series with a relay 423 that controls the operation of a solenoid 424 which in turn controls the movement of the escapement 403. In order for the relay 424 to be energized the entire circuit connected to it must be closed. This circuit includes the normally-closed contacts 426*a* of a relay 426, the normally-closed pole 427 of a switch, and a switch 428 which is normally open but is held closed when the elevator platform 404 is in the raised position ready to receive an axle. Assuming this circuit to be completed, the relay 423 is energized, thus closing contacts 423*a* and 423*b* to complete the circuit to the solenoid 424 and to open up the escapement 403, allowing an axle to roll forward onto the elevator platform 404. As the axle moves off the end of rails 93 it actuates a switch 429 which energizes the latching coil of relay 426 and opens up contacts 426*a*, thus returning the escapement 403 to the upright position. At the same time relay 426 closes contacts 425*b*. When the escapement 403 returns to the upright position it actuates a normally-open switch 432 which completes the circuit to a solenoid 432*a* which controls the hydraulic pressure in the cylinder 407 to cause the elevator platform 404 to descend carrying with it the axle. When the elevator platform reaches the level of the lower rails 94, the platform is tilted forward as described hereinabove and the axle rolls off onto the rails 94 and actuates switch 427*a* which is a second pole of switch 427. Switch 427*a* is connected in series with the tripping coil 426*t* of the relay 426 to open up the contacts 426*b*, thereby reversing the flow of pressure fluid to cylinder 407 and causing the elevator to move back up to the level of rails 93.

In the meantime the axle proceeds down rails 94 until eventually it strikes the escapement 414 and rests upon the arm of a switch 432. If the system operator at control panel 101 in FIG. 1*a* chooses to draw an axle from the storage rack 92 he depresses the push button 433. Then as the buggy 61 of conveyer 59 moves back to its home station it actuates a switch 164*a* which is the second pole of switch 164 discussed in connection with FIG. 2. The closing of push button switch 433 and switch pole 164*a* along with switch 432 energizes a relay 434 which closes contacts 434*a* and 434*b* and thus energizes a solenoid 436, solenoid 436 opens up the escapement 414 and permits an axle to roll off onto the buggy 61. As the axle rolls off the ends of rails 94 it actuates a switch 437 that is connected directly in parallel with switch 177 of FIG. 3 to energize relay 168 and start the motor 60 to cause the axle to be transported to one of the lathes 62-64.

INCOMING RAILS TO BURNISHING LATHE

The rails 77 that lead from conveyer 76 to the burnishing lathe 79 are shown in FIG. 4. The electrical diagram for components associated with these rails is FIG. 18.

The rails 77 are inclined slightly downward toward the burnishing lathe 79 so that axles placed on the upper ends of these rails from the buggy 74 of conveyer 76 roll downward toward the end where the lathe 79 is located. In so doing the axles first strike an escapement 438. Until this escapement is opened, axles may continue to pile up along rails 77 in an axle-storage magazine until enough axles have been stored to keep the arm of switch 369 depressed. The operation of switch 369 as an interlock was described in the section entitled Conveyer 76. Thereafter no further axles will be deposited on the rails 77.

As axles are burnished in the lathe 79, the escapement 438 is opened to let more axles through, one at a time. These axles then roll to a second escapement 441 where they are held to be positioned by the plunger of an hydraulic cylinder 442 similar to cylinder 226 in FIG. 7.

Thereafter the escapement 441 is opened as soon as an elevator comprising a platform 443 surmounted by pivoted V-blocks 444 is raised to receive the axle. The elevator is operated by means of an hydraulic cylinder 446.

In describing the operation of the electrical components associated with rails 77 reference will be made to FIG. 18 in conjunction with FIG. 4. The operating sequence of the circuit in FIG. 18 goes from right to left, corresponding to the movement of axles on rails 77 in FIG. 4.

In order to cause the escapement 438 to open up there must be an axle waiting to pass through. Such an axle will rest on the arm of a normally-open switch 447, and if there are no axles resting on the arm of a second, normally-closed switch 448 located in front of the second escapement 441, and further if the escapement 441 is in the upright position so as to close a normally-open switch 449, the circuit to energize relay 451 from a voltage source 452 is complete. Operation of relay 451 closes contacts 451*a* and 451*b* to complete the circuit to a solenoid valve 453 that controls the hydraulic cylinder 455 which operates escapement 438. Once an axle has passed through escapement 438 and has rolled forward enough to actuate switch 448, no further axles will pass through until escapement 441 has operated. The reason for this is that each axle is to be positioned in turn by the hydraulic cylinder 442.

In order to energize the position cylinder 442 an axle must rest upon the actuator of switch 448, closing the second pole 448*a* thereof. Then, if the contacts 454*a* controlled by a relay 454 are in their normally-closed condition, as they will be if relay 454 has not been energized, the circuit to a relay 456 is complete. This closes contacts 456*a* and completes the circuit to a solenoid valve 457 that controls the operation of the positioning cylinder 442.

As the plunger of cylinder 442 moves forward it actuates a switch 458 that closes the circuit to energize a relay 459, thereby opening the normally-closed contacts 459*a* in series with the solenoid 457 and de-energizing the latter so as to allow the plunger to retract into the cylinder 442. At the same time contacs 459*b* are closed, and if the elevator is up at the level of rails 77 so as to actuate a switch 461, the circuit to a solenoid 462 will be closed. Solenoid 462 operates the cylinder 465 that opens the escapement 441 and permits the axle to roll through onto the elevator.

As the axle rolls off the ends of rails 77 it actuates a switch 463 that energizes the latching coil of relay 454 and opens the contacts 454*a* to de-energize the escapement solenoid 462. Relay 454 also closes a pair of normally-open contacts 454*b*. As the escapement 441 moves back into the upright position, it again closes the normally-open switch 449. Assuming that there are not enough axles on the lower rails 464 to hold open a normally-closed switch 466, the circuit to a relay 464 is complete. Relay 467 closes contacts 467*a* and energizes a solenoid 468 that reverses the hydraulic pressure in cylinder 446 and lowers the elevator until the platform strikes and opens a normally-closed switch 469.

The tripping coil 454*t* of relay 454 is energized by a relay 471 (not shown in this figure) which is energized when the spindle motor of lathe 79 is turned on. Relay 471 closes contacts 471*a* to trip the relay 454 and to return the circuit to its initial condition, ready to process another axle as soon as the elevator moves back up at the end of a burnishing cycle.

BURNISHING LATHE

The burnishing lathe 79 is the subject of a separate patent application filed concurrently herewith and assigned to the assignee of the present invention. However, because it is a part of the overall system of the present invention, the burnishing lathe will be briefly described here.

FIGS. 19 through 21 show respectively a front, top and end view of the lathe 79. FIG. 22 shows a detail of the elevator mechanism and FIG. 23 an electrical schematic diagram of components associated with the burnishing lathe.

Referring first to FIG. 19, it will be seen that the basic components of the burnishing lathe, namely the bed 472, the left and right hand spindle heads 473 and 474 and the pusher motor 475 together with its gear tower 476 are substantially identical with corresponding parts of the axle machining lathe in FIG. 10. So are thrust shoes 477 and 478. Furthermore, the process of chucking axle between the spindle heads by first energizing an hydraulic cylinder 479 and then motor 475 is the same as that followed in the axle lathe 62 of FIG. 10.

However, the burnishing lathe, since it is not required to perform precise machining operations, has a much simpler carriage structure than the axle lathe. The left and right carriages 480 and 481 of the burnishing lathe are moved longitudinally by a pair of hydraulic cylinders 482 and 483 respectively. In addition the burnishing lathe 79 includes a pair of axle-supporting saddles 484 and 485 to support the axle prior to the time it is picked up between the lathe centers and also after the spindle heads have been withdrawn at the end of the burnishing cycle. Only a single spindle motor 486 is required because of the relatively light load placed on it by the burnishing rollers 81 and 82.

The arrangement of the carriages 480 and 481 is shown more clearly in FIG. 20. Referring to that figure it will be seen that these carriages are also much less complex than the tool carriages of lathe 62. The complicated arrangement of templets and tracing devices and servo mechanisms necessary to machine an axle are not required to burnish it. All that need be done is to press a burnishing roller, or preferably a pair of them, against the axle with a proper degree of pressure and to move the roller or rollers longitudinally along the surface to be burnished, depending primarily on the radially inward pressure to cause the roller to follow the particular shape of the axle.

Radially inward pressure is applied by cylinders 487 and 488 to a pair of support structures 489 and 490 by which the rolls 81 are mounted on carriage 480. Similarly, cylinders 491 and 492, which are affixed to carriage 481, apply inward pressure to a pair of support structures 493 and 494 on which the rolls 82 are mounted.

As shown in FIG. 21, wheels 81 and 82 are mounted so that their axes are in substantially the same plane as the axis of the axle being burnished. This results in direct, radial pressure on the axle. FIG. 21 also shows the position of the elevator platform 443 and V-blocks 444 when an axle is being put onto the rails 464. It will be noted that in order to accomplish this, the V-blocks 444 are tilted by engagement between a dog 496 and a bar 497 which is part of the structure of the rails 464. This bar 497 may also be seen in FIG. 20.

As described in the section entitled Axle Lathe and shown in FIG. 4, the incoming rails 209 to lathe 62 stop short of the lathe centers, and axles are carried forward to the lathe centers by a retractable arm 221 which forms a part of the incoming rail system. Since this arm is retracted at the time that an axle is subsequently lifted up to the level of the higher outgoing rails, there is never any contact between the arm 221 and the pivoted V-blocks 302 on which the axle is supported on the elevator. However, in the burnishing lathe 79, both the incoming rails 77 and the outgoing rails 464 extend substantially the same distance toward the center of the lathe, and each time the elevator platform 443 is raised, whether or not there is an axle on it, the dog 496 encounters the bar 497 and tilts the V-blocks 444 forward. Furthermore, when the elevator descends, the dog 496 also makes contact with the bar 497, and since the V-blocks 444 will pivot only in one direction, means must be provided to permit the dog 496 to swivel out of the way of the bar 497. This is shown in FIG. 22 where it can be seen that the dog 496 is pivoted about a pin 498 to allow it to swing upward to pass the bar 497 as the elevator descends but to engage the bar 497 and be tripped thereby as the elevator ascends.

The operation of the burnishing lathe 79 will now be described with particular reference to the electrical diagram in FIG. 23, but also in conjunction with the mechanical drawings in FIGS. 19 through 21.

At the beginning of the operation of the lathe the elevator is down, closing switch 469. The axle rests on the supports 484 and 485. When switch 469 is actuated, it energizes a solenoid 501 to apply hydraulic fluid to cylinder 479 to push the left hand center (not shown) toward the axle to engage the center depression in the left hand end thereof. Switch 469 also energizes a relay 502 which encloses the normally-open contacts 502a to energize the pusher motor 475. The latter in turn operates through gears in the tower 476 to cause the pusher rod 500 to exert a force against the leaf springs 504 and thus to move the right hand spindle head 474 to the left. As the right hand spindle head moves, it overcomes the force of cylinder 479, thereby causing the left hand center to be retracted into the left hand spindle head 473 and the right hand center (not shown) to be retracted into the right hand spindle head 474 thus centering the axle and supporting it between the two thrust shoes 477 and 478.

When the pressure applied to springs 504 is sufficiently great to cause the springs to bow toward the left by a predetermined amount, a switch 503 is closed, energizing a relay 506. This relay opens the normally-closed contacts 506a to relieve the hydraulic pressure on the left hand center by de-energizing solenoid 501, and opens up contacts 506b to de-energize relay 502 and thus to open the circuit to the pusher motor 475 to bring it to a halt.

At this point the lathe is ready to begin its burnishing operation which will be described here only with reference to the right hand end of the axle and to the mechanism for burnishing it, since the operations are identical with respect to both ends of the axle.

Switch 503 also energizes a solenoid to apply hydraulic fluid to cylinder 483 to cause carriage 481 to move to the right until carriage 483 contacts switch located on the side of the head 474. This switch starts spindle motor 486 which rotates the axle, also the switch energizes solenoid 507 to apply hydraulic fluid to cylinders 491 and 492 to cause the supports 493 and 494 of the burnishing rolls to move in toward the axle and to apply moderate burnishing pressure to the button.

When the burnishing wheels 82 contact the button, the previously-mentioned moderate burnishing pressure builds up in the hydraulic lines feeding cylinders 491 and 492 and actuates a pressure switch 511. Switch 511 energizes a solenoid 512 which in turn feeds hydraulic fluid to the right hand end of cylinder 483 to force the carriage 481 to move to the left so as to push the burnishing wheels 82 toward the journal.

The burnishing rolls apply only low burnishing pressure to the axle button, but as the carriage 481 moves to the left past the button, it trips another switch on the head 474, that stops the carriage motion and starts the burnishing rolls in toward the axle. The rolls contact the axle under low pressure and trips a pressure switch that energizes a solenoid 512 to move the carriage 481 to the right. The carriage continues to the right until the rolls make contact with the button edge. The rolls will dwell in this position until a pressure switch is tripped. This pressure switch energizes solenoid 514 to apply high pressure to the cylinders 491 and 492. Also this pressure switch energizes a solenoid 512 to apply pressure to the back of cylinder 483 causing the carriage to move to the left. This is done to achieve an exceedingly smooth surface on the journal portion of the axle. Carriage 481 continues to move to the left carrying the burnishing wheels 82 along the journal until the burnishing wheels come against the fillet 258 (see FIG. 9) between the journal and the dust guard section of the axle. This causes an increase in pressure in the hydraulic line feeding cylinder 483 and actuates a pressure switch 516 which in turn energizes a relay 517.

Relay 517 opens the normally-closed contacts 517a to cut out the high pressure applied to the cylinders 491 and 492 and to return these cylinders to a low pressure at which the dust guard is to be burnished. The relay 517 also closes contacts 517b to short-circuit the pressure switch 516 so as to keep the relay 517 energized even when burnishing wheels are no longer pushing against the fillet 258. Relay 517 also closes contacts 517c to energize a time-delay relay 518. The purpose of providing a time-delay is to prevent contacts 518a from closing until after the burnishing wheels 82 have moved over to the dust guard section of the axle. Thereafter when the pressure switch 516 is closed by the pressure applied to the burnishing wheels 82 by the fillet between the dust guard and the wheel seat, a relay 519 will be energized.

Provisions added by selector switch for burnishing wheel seat is required. The completion of burnish of the dust guard seat initiates a timer which de-energizes solenoids 6AM—6GM—6QM and 6CM, and energizes 6NM and 6BM causing cross-slide to move out until timer times out. This timer de-energizes (6NM and 6BM) and starts another timer. Solenoids 6QM and 6CM are energized causing carriage to fast feed toward wheel seat until the second timer times out. This timer de-energizes (6QM and 6CM) stopping carriage travel and energizes 6AM and 6GM and 6EM causing cross-slide to traverse in on low pressure. Contact with the axle builds up pressure closing a pressure switch energizing 6CM causing carriage to advance at a pre-set traverse rate of burnish. Carriage contact with limit switch on bed de-energizes 6CM—6AM and 6GM stopping carriage and energizes 6NM and 6BM causing slides to traverse out contacting limit switch 508 and 509. Switch 508 and 509 energizes solenoid 512 so as to cause carriage 481 to move to the right until carriage trips limit switch (located on back of bed) and stops carriage motion. This switch on the bed 472 indicates the burnishing lathe has completed its cycle and is ready for unloading axle and receiving another axle for burnishing. If wheel seat is not to be burnished the burnishing rolls will contact the radii between the dust guard and wheel seat contacting and holding limit switch located on the bed (6L5M5). The pressure builds up closing pressure switch (6P53R). 6P53 and 6L55 de-energizes solenoids 6AM, 6GM, 6QM and 6OM causing cross slides 493 and 494 to traverse out contacting limit switches 508 and 509. From here to end of cycle the carriage motion is duplicated as stated above.

CONVEYER 83

The plan view of conveyer 83 is shown in FIGS. 1a and 1b. FIGS. 4 and 24 are cross section views which include the conveyer and FIG. 25 is an electrical schematic diagram of components associated with the conveyer.

Conveyer 83 is similar to conveyers 59 and 76 in that it is power-driven and substantially level and consists of a pair of opposed channel members 523 and 524 which serve as guides for the buggies 84 and 85. Both buggies are driven by the same chain drive 526. The main difference between conveyer 83 and the other two discussed previously, is that conveyer 83 has two buggies instead of only one. However, the purpose of the two buggies is to effect the same simplified type of shuttle operation as buggies 61 and 74 of conveyers 59 and 76, respectively.

Buggy 84 is permanently attached to a particular point along the chain 526 so that it operates between the outgoing rails 464 of the burnishing lathe 79 and the rails 87 leading to and from the testing station 86. Buggy 85 is connected to a different point along the chain 526 so that it operates from the rails 87 to the outgoing rails 89. In order to achieve this type of operation, it is one of the features of this invention to space the rails 89 the same distance from rails 87 that rails 87 are from rails 464.

Then, in normal operation, while buggy 84 is carrying an axle from the burnishing lathe to the testing station, buggy 85 can carry another axle from the testing station to the outgoing rails. Only when it is necessary to eject a faulty axle at rails 88 is it necessary to interfere with this operation of the buggies and even then the buggies will only come to a stop momentarily to give the forward buggy 85 time to eject the axle onto rails 88, after which both buggies will continue to the end of their range of travel since buggy 84 will normally be carrying an axle to be delivered to the testing station.

Because of the necessity for human evaluation of the results of the testing carried out at testing station 86, conveyer 83, more than either of the other conveyers 76 and 59, is controlled by an operator. Since this primarily concerns station 86 and the rails 87, the latter will also be discussed as part of conveyer 83, as will the outgoing rails 464 of lathe 79.

As shown in FIG. 4, the outgoing rails 464 are very similar to the rails 55 of the incoming station shown in FIG. 2. Rails 464 include an escapement 527 at the lower end against which burnished axles come to rest after rolling down from the upper end of the rails. Several axles can be loaded onto the rails 464 to be stored there, the number of axles being determined by the position of switch 466 which, when actuated by the weight of an axle, prevents any more axles from being unloaded from the burnishing lathe 79.

The rails 87 leading to testing station 86 are shown in FIG. 24. These rails differ from any described heretofore in that they are pivoted about a bar 528 to three different positions indicated as 87D, which is the down position, 87L which is the loading position, and 87U which is the unloading position. In addition, rails 87 are provided with a retractable arm 529 which has two positions, 529F indicating that the arm is forward or extended and 529B indicating that the arm is back or retracted.

When an axle is to be delivered to the testing station, indicated by V-blocks 531, the rails 87 are placed in the load position 87L and the arm 529 is extended to position 529F. An axle is then rolled onto the rails 87 in the usual way from buggy 84. The axle then rolls down the slightly sloping rails to a position immediately over the V-blocks 531. The rails 87 are then dropped to the "down" position 87D and the arm 529 is retracted back out of the way to position 529B to leave the axle completely free on the V-blocks 531 where it can be tested without interference from arm 529 in accordance with standard industry practice.

Subsequently when it is desired to remove the axle to return it to the conveyer 83 the arm 529 is returned to position 529F and the rails 87 are raised to the unloaded position 87U in which the arm and rails are tilted slightly downwardly toward conveyer 83 so that the axle can roll back to the conveyer.

While the axle is being tested at station 86, buggy 85, having delivered a previously tested axle to the outgoing rails 89, will return to a position opposite rails 87. Simultaneously buggy 84, having delivered the axle being tested, will return to a position opposite rails 464. Therefore, when the rails 87 are raised to the unloaded position 87U, the axle rolls off onto the waiting buggy 85 to be delivered either to the outgoing rails 89 or to the reject rails 88.

In order to move the rails 87 to the three different vertical positions, two hydraulic cylinders 532 and 533 are connected end-to-end. When cylinder 533 is connected to the source of pressure fluid, it pushes the rails 87 up from position 87D to position 87L, and when cylinder 532 is connected to the source of fluid pressure, it pushes the rails up still further to position 87U.

The arm 529 is extended and retracted by means of another hydraulic cylinder (not shown) located between rails 87.

Although the operation of conveyer 83 could be described starting at any point, it will be assumed that at the beginning arm 87 is in the "down" position 87D, pressing upon and closing a switch 534 as shown in FIG. 25, and that the arm 529 is retracted, bringing a stop 536 up against a switch 537 to close the latter. It will also be assumed that the buggies 84 and 85 are opposite rails 464 and 87, respectively. In this position buggy 84 contacts and closes a normally-open switch 538.

In order to begin the operation an operator at the testing station 86 must push a button. If the system is just being put into operation and there are no axles already at station 86, it will be necessary for the operator to push button 539 which is the "load" button and energizes the circuit from a voltage source 540 to begin operation in the absence of an axle already at the testing station. If, on the other hand, there is an axle at the testing station 86, it is either good, in which case the operator presses button 541, or bad, in which case he presses button 542. If the system is being put into operation or is in normal operation, there will normally be an axle resting against the escapement 527 at the lower end of rails 464. This axle closes a normally open switch 543. Still another push button 544 is provided to take care of the situation when the system is being closed down, for example at the end of a day's production, and there is no axle resting against the arm of switch 543. Push button 544 energizes a relay 545 to unload the testing station 86 if there is no axle holding the normally-closed switch pole 543a open. Contacts 545a short-circuit the switch 544 once the relay 545 is energized.

Assuming that operation is just beginning and the operator pushes button 539 and there is an axle resting against and closing switch 543, relay 546 will be energized. Contacts 546a of this relay are then closed to keep the relay energized even after the momentary pressure on push button 539 is released. Contacts 546b of the relay are closed forming a short-circuit around push button switch 541 and energizing a second relay 547. Relay 547 has contacts 547a which maintain it in an energized condition even after the relay 546 has opened up or, in the event that push button 541 was operated, after the momentary pressure thereon has been released. In addition the relay 547 has contacts 547b connected in series with a solenoid 548 which operates the escapement 527 to release axles from the rails 464 onto buggy 84. As soon as the contacts 547b close, the solenoid 548 is energized. Solenoid 548 controls the cylinder that operates the escapement 527, and when the solenoid is energized, it opens up the escapement to let an axle go through.

In the event that an axle is to be rejected after having been tested at station 86, push button 542 is actuated, closing the circuit to a pair of relays 549 and 551. Relay 549 has contacts 549a to keep it energized after pressure on the push button 542 has been released. Relay 549 also has contacts 549b directly in parallel with contacts 547b of relay 547. Thus no matter whether push button 541 has been actuated to send a good axle from station 86 onto the outgoing rails 79 or push button 542 has been actuated to send a rejected axle from station 86 to the rails 88, the circuit to solenoid 548 will be closed and another axle will be deposited on buggy 84.

Contacts 547b and 549b are also connected in series with a solenoid 552 that controls the hydraulic cylinder that pushes the arm 529 forward to position 529F (FIG. 24). Initially, when the rails 87 are in the "down" position, a normally-closed switch 534a, which is a second pole of switch 534, is held open so that the circuit to solenoid 552 is completed by way of the normally closed contacts 553a.

As the arm 529 moves forward, it actuates a switch 554 thereby energizing a relay 556. Relay 556 has two sets of contacts, 556a and 556b, each connected in series with a solenoid. Contacts 556a are connected in series with a solenoid 557 that operates the hydraulic cylinder 532, and contacts 556b are connected in series with a solenoid 558 that operates cylinder 553. Initially both of these solenoids are energized so that both cylinders receive hydraulic fluid, thereby forcing the arm 87 up to position 87U. If there is an axle on the V-blocks 531, it will be picked up and it will then roll down the rails 87 onto the buggy 85. As it rolls, it will momentarily close the normally open switch 559, thereby energizing the latching coil of a relay 561 and tripping a relay 562 by energizing the tripping coil 562t. At about the same time, but not necessarily at exactly the same time, an axle will roll off the ends of rails 464, momentarily closing a normally open switch 563 and energizing the latching coil of a relay 564. Relay 564 opens up the normally closed contacts 564a and thus allows the escapement 527 to move back to the upright position. Normally, there will be axles at both rails 464 and station 86, but when the system is just being started up or closed down, there will not be any axles at one or the other of these places. In that case, as has been explained heretofore, either push button 539 or 544 will be actuated and either contacts 546c or 545c will be closed to energize all three relays 561, 562t, and 564 when either switch 559 or 563 is momentarily closed.

Relay 561, when energized, closes contacts 561a and energizes relay 566. The latter relay has contacts 566a connected directly in parallel with switch 538 so that even after the buggies move away from their loading positions, the circuits to relays 546 and 547 will remain complete. Relay 566 also has normally closed contacts 566b connected in series with solenoid 548 to de-energize the latter.

At this point both buggies 84 and 85 have been loaded, assuming that there were axles on rails 464 and at station 86. Of course, if the system has just been started up there will be no axle to be loaded on buggy 85 and if the system is being closed down there will be no axle to be loaded on buggy 84. In any event at least one of the buggies is loaded and is now ready to delivery its axle to the appropriate receiving point which would be either rails 87, 88 or 89. Relay 567 is provided to energize the motor 80 via contacts 567a. The energizing circuit for relay 567 includes switches 568–570, which are actuated by unloading cylinders at rails 87, 88 and 89, and a switch 571 that is closed by the pressure of the escapement 527 as the latter moves back to the upright position. In addition, the circuit includes a switch 572 that is normally closed unless the reject rails 88 are loaded with too many rejected axles. However, if the axle on buggy 85 is a good one, it will be headed for rails 89 rather than rails 88, and so a blockage of the latter rails should not keep the buggies from moving. For that purpose contacts 547c will be closed to short-circuit the switch 572 when the axle is a good one. The circuit to energize relay 567 also includes a switch 573 which is somewhat similar to switch 572 and is located on the outgoing rails 89 and which will normally be closed except when too many axles have been loaded on the rails 89. In that case switch 573 will be actuated by the weight of the last axle to be placed on it and will be open so that the relay 567 cannot be energized. However, if the axle on the forward buggy 85 is a rejected axle, contacts 549c will be closed and switch 573 will be short-circuited, since the buggy 85 will be unloading its axle at rails 88. Two sets of contacts 564b and 566d are connected in series and are closed by the latching of relays 564 and 566, respectively, as the switches 563 and 559 are actuated. Contacts 564b and 566d thus will not be closed unless there is an axle on each of the buggies 84 and 85 or unless either push button 539 or 544 was actuated to clear the circuits for operation with an axle on only one of the buggies.

With all of the foregoing contacts and switches in the energizing circuit of relay 567 closed, relay 567 will be energized and the motor 80 will also be energized via contacts 567a, thus driving both buggies 84 and 85 forward. In the event that buggy 85 carries a reject axle, as indicated by the fact that push button 542 was actuated, contacts 551a will be opened from their normally closed state and thus when the forward buggy 85 actuates a normally-closed switch 574, the circuit to relay 567 will be open and the motor 80 will stop so that the forward buggy can be unloaded and the axle on it placed on rails 88. In the more normal situation the axle on the forward buggy will not be a reject axle and the push button 541 or 539 will have been actuated instead of push button 542. In that case relay 549 will not be energized and therefore the contacts 549d will be in a normally closed condition short circuiting switch 574. The buggies 84 and 85 will thus continue until the leading buggy 85 actuates a normally closed switch 576 at rails 89. Because of the preferred spacing of rails 464, 87 and 89, and the corresponding spacing between the buggies 84 and 85, both buggies will be in position to unload axles onto their respective rails. This is automatically accomplished when the leading buggy actuates switch 576 and closes the normally open pole 576a. Closing this pole energizes a time-delay relay 577 and after a short delay the latter closes normally open contacts 577a. It will be recalled that the relays 564 and 566 were previously energized. Relay 564 closes contacts 564c so that when the time-delay relay 577 closes contacts 577a, a solenoid 578 is energized. This solenoid actuates an unloading cylinder 579 to unload axles from the leading buggy 85. Relay 566 closes contacts 566e to energize a solenoid 581 which in turn energizes an unloading cylinder 582 to unload an axle onto the rails 87. Solenoid 581 will only be energized, however, if a normally open switch 583 is closed. Switch 583 is located adjacent the rails 87 and is closed by means of a dog 584 only when the rails 87 are in the loading position 87L. As the axle rolls off of buggy 84 onto rails 87, it strikes and closes a switch 586 at the end of arm 529, energizing the latching coil of relay 562.

Since buggy 84 is now unloaded, the relay 564 which was latched during the time that the buggy has an axle on it, must be tripped. This is done by energizing the tripping coil 564t, either by contacts 549d, if the axle at the station 86 was rejected, or contacts 546d if there was no axle at the station 86, or by the momentary closing a switch 573a in the usual case where the axle at station 86 was a good axle. Switch 573a is the second pole of the switch 573 located on the outgoing rails 89 and serves as an additional interlock to prevent too many axles from being loaded on these rails. If enough axles have been loaded on rails 89 to keep the switch 573a closed, the tripping coil 564t will also be energized and it will therefore be impossible to energize the latching coil 564 and consequently impossible to complete the circuit to relay 567 to start the motor 80.

A final circuit connected to switch 576a includes a relay 553. Relay 553 is energized when the switch 576a is closed if, in addition, contacts 566f of relay 566 are also closed and either contacts 562b or contacts 545d are closed. When the relay 553 is energized, contacts 553a open up and no longer form a short-circuit across the switch 534a. At the time contacts 553a first open, switch 534a is closed because the rails 87 are not down against it but are in position 87L, so the opening of contacts 553a has no immediate effect. However, relay 553 also opens the normally-closed contacts 553b to de-energize solenoid 558 controlling cylinder 533. It will be recalled that cylinder 532 was previously de-energized. Opening the circuit to solenoid 558 results in dropping the rails 87 to position 87D at which the normally-closed switch 534a is opened so as to open the circuit to solenoid 552. In view of the fact that the contacts 553a are now also open, solenoid 552 is de-energized and causes the hydraulic cylinder located between the rails 87 to retract the arm 529 back to position 529B.

After the axles on the buggies 84 and 85 have been unloaded onto the rails 87 and 89, respectively, and the contacts 564c and 566e open up by tripping the relays 564 and 566, the solenoids 578 and 581 are de-energized, allowing the unloading pistons to retract back into cylinders 579 and 582. As these pistons retract, they again force switches 568 and 570 to close. Tripping the relays 564 and 566 closes contacts 564d and 566g and opens contacts 564b and 566d. Since the buggy 84 is away from rails 464, switch 538a, which is the second pole of the switch 538 is closed and so a relay 587 is energized. This relay closes contacts 587a to operate the motor 80 in reverse so as to pull the buggies 84 and 85 back to rails 464 and 87, respectively. As the buggy 84 reaches rails 464, it opens the normally closed switch 538a and stops the motor 80. It also closes switch 538, and since the arm 529 is back, closing switch 537, and the rails 87 are down, closing switch 534, the tripping coil 561t is energized returning the circuit to its original state ready to handle the next axles.

The only function of the conveyer 83 remaining to be discussed in the transportation of rejected axles to rails 88. To do this the operator at station 86 pushes button 542 which energizes relays 549 and 551. These relays are held in the energized state by contacts 549a and 551b, respectively. Axles are delivered to the buggies 84 and 85 from the rails 464 and 87, as before, and the motor 80 is energized to move both buggies forward.

Relay 551 opens up the normally-closed contacts 551a, and so when the buggy 85 reaches rails 88, it opens switch 574 and stops the motor. Contacts 551d are now closed and so, with the closing of switch 574a, which is the second pole of switch 754, a time-delay relay 588 is energized. Contacts 588a open up and after a short delay contacts 558b close. The latter contacts energize a solenoid 589 which operates an hydraulic cylinder 591 to tilt only the forward buggy 85 and roll off the rejected axle onto rails 88.

As the axle rolls along rails 88, it strikes and momentarily opens switch 572a, which is the second pole of the switch 572 in series with the motor-energizing relay 567. Opening switch 572a de-energizes the relay 551 and allows contacts 551d and 551a in parallel with switches 574 and 572, respectively, to close so as to energize the relay 587 again to reconnect the motor 80 for forward rotation. The buggies 84 and 85 now move to rails 87 and 88, although only buggy 84 is now carrying an axle. This axle is deposited on rails 87 as described before and the buggies return to rails 464 and 87.

RAILS 89 AND CONVEYER 104

After the axles have been tested and found to be acceptable, all machining and related processes that were to be performed on them are complete. The conveyer system, including conveyers 59, 76, and 83 that transport the axles from point to point as the machining process is carried out, finally delivers the finished axles to rails 89. These rails, as shown in FIG. 1b, are relatively short, almost identical, in fact, with the rails 55 shown in FIG. 2 and described in the section entitled Incoming Station. However, there is no necessary limit on the length of these rails 89 other than the broad physical limit imposed by the height of conveyer 83 above the floor level coupled with the desirability of having the rails sufficiently sloped to insure that the force of gravity will overcome any frictional resistance and will cause the axles to roll down the inclined rails. Specifically, the machines and stations connected together by the three motor-driven conveyers 59, 76 and 83 could be entirely separated from those elements of the overall system to be described hereinafter. In that case the rails 89 would simply be storage facilitates on which machined and tested axles would be stored until shipped to a location, which might be quite distant, where the wheels would be put on the axles.

In the embodiment of the invention shown in FIGS. 1a and 1b, rails 89 serve as part of a connecting link from conveyer 83 to the axle-classifying, or length-measuring, station 106. For this purpose the axle storage capacity of the rails 89 need not be particularly large—half a dozen axles, or less—and so the rails need be only a few feet long.

While the length-measuring station could be placed directly at the ends of rails 89, it adds convenience to insert the motor-driven conveyer 104 between the two. Doing so provides room for the roller-type conveyer 126 to carry wheels from the boring machine 115 to the wheel tip-up station 129. Conveyer 104 differs from the previously-described conveyers 59, 76, and 83 in that the buggy 103 on conveyer 104 carries the axles sideways. The reason is that buggy 103 carries the axles directly to the length-measuring station; there is no inclined ramp off to the side of conveyer 104 connecting it to the station, and as in every station in the system it is desirable to have the axle enter the station sideways to facilitate handling of the axle by mechanisms within the station. In each station such mechanisms are most conveniently arranged to grasp an axle traveling sideways.

The rails 89 and conveyer 104 are shown in FIG. 1b and the electrical circuit for directing their operation is shown in FIG. 26.

Rails 89 are so nearly identical with rails 55 (FIGS. 1a and 2) that a detailed description would be redundant. The rails 89 include a similar escapement 592 similarly hydraulically operated, and a plurality of switches, each of which finds its counterpart on the rails 55.

Conveyer 104 consists of a pair of channel members 593 and 594 which are essentially the same as channel members 183 and 184 of conveyer 59 (see FIG. 2) but, of course, spaced much farther apart. Two chains 596 and 597 are driven by sprocket wheels 598 and 599 connected to a common shaft 601 that is connected in turn to the motor 107. The buggy 103 is connected to one link of each of the chains to move forward and backward with the chains in response to automatically generated electrical signals supplied to the motor 107.

In describing the operation of the rails 89 and the conveyer 104 reference will be made to the electrical diagram in FIG. 26 in conjunction with the mechanical layout in FIG. 1b.

Axles unloaded from buggy 85 onto the rails 89 line up in a storage magazine 91. The stored axles are held back by a hydraulically operated escapement 592 controlled by a solenoid valve 593. In order to energize the valve 593 an axle must be against the escapement 592 so as to press upon the arm of a normally-open switch 602 and the buggy 103 must be at the ends of the rails 89 ready to receive the axle. When it is in that position, the buggy presses against the arm of a normally open switch 603. Closing both switches 602 and 603 completes the circuit to energize a relay 604 from a voltage source 606. Energizing this relay results in closing the contacts 604a and 604b to energize the valve 593 and to keep it energized after the axle has passed through the escapement.

As the axle rolls off the end of rails 89, it momentarily closes a normally open switch 606 in series with the latching coil of a relay 607. Closing the switch 606 latches the relay 607 and opens up the normally closed contacts 607a in series with the relay 604, thereby de-energizing the latter. As a result contacts 604a open and the solenoid valve 593 is de-energized, allowing the escapement 592 to return to the upright position. When it does, it closes a normally open switch 608, and this, together with the closing of contacts 607b when the relay 607 is latched, energizes a motor-controlling relay 609. Energizing the latter causes the contacts 609a to close, starting the motor 107 in the forward direction to drive the buggy 103 toward the axle length-measuring station 106.

The motor 107 moves the buggy 103 along until it trips a switch 611 just in front of the length-measuring station 106. Switch 611 is normally closed but is opened by the buggy to de-energize the motor-controlling relay 609 and stop the motor. The buggy remains stationary until a relay 612 associated with the length-measuring station 106 is energized. This relay can be energized only if the length-measuring station is ready to receive an axle, and when that condition exists the contacts 612a close after a predetermined lapse of time, driving the buggy 103 forward still farther. Just as the buggy reaches the end of the channel members 593 and 594 and starts to tilt forward over the end thereof, a switch 613 engaged by the buggy closes and energizes the tripping coil 607t of relay 607, thus de-energizing the relay 609 and stopping the motor 107 again. This time, since the buggy 103 is slightly tilted, the axle rolls forward into the length-measuring station 106.

When the relay 607 is tripped, normally closed contacts 607c close. Since the buggy is not pressing against the arm of switch 603, a second, normally closed pole 603a thereof is closed, and so when the contacts 612b, controlled by the relay 612 associated with the axle length-measuring station are also closed, the circuit is complete to energize a relay 614 that closes contacts 614a to operate the motor 107 in reverse and to drive the empty buggy 103 back to the rails 89 for another axle.

AXLE LENGTH-MEASURING STATION

As has been stated previously, axles fall into several categories of size, depending on the load they must carry. So do wheels, and a set must be matched up from similar categories. In accordance with the present invention each axle is automatically classified in the length-measuring station 106 and wheels of the proper size are selected to go with it. This eliminates the necessity for ascertaining ahead of time the exact style of axle that will be used and setting up a corresponding supply of wheels, only to find for some reason undiscoverable in advance that it was necessary to change categories. One factor that establishes the category of an axle is its length, so axles are automatically classified in station 106 by a length measurement.

Furthermore, and perhaps of equal importance, some of the axles will be old ones that have been machined several times and some will be new ones that have been machined only once. The latter will, of course, have wheel seat diameters that are the largest permissible for their category, according to industry standards. These new axles can therefore be used with wheels that have been used before on old axles and are still in good condition. In addition to the several major size categories, the only factor of significance in matching wheels and axles is to be sure that the axle hole in the wheel is at least no larger than the proper size to fit with the required degree of tightness on the particular axle with which it is to be assembled. While this means that a wheel that had previously been used on an old axle that had been machined down to the lower limit of its size category could theoretically be used on another old axle that had been machined more than once but still not down to the lower limit, in practice it is not necessary to make so careful a selection.

According to the present invention the diameter of one wheel fit is measured in what is essentially a go no-go gauge to determine whether the axle is new or old, and if it is new, a pair of old wheels is selected to go with it. Since these wheels must necessarily have relatively small axle holes, they obviously can be machined to fit the larger wheel seats of a new axle.

The location of the axle length-measuring station 106 with respect to other components of the overall system is shown in FIG. 1b. FIG. 27 shows a front view of the length-measuring station from the direction along which axles approach it. FIG. 28 is a front cross sectional view of the length-measuring station and indicates the internal components of the station behind the front panel, and FIG. 29 is a side cross sectional view. FIG. 30 is a detail of a yoke for measuring the diameter of one wheel seat of an axle in the station, and FIG. 31 is an electrical diagram of components associated with the length-measuring station of the preceding figures.

In the overall view in FIG. 1b the buggy 103 of conveyer 104 releases axles onto a pair of stub rails 616 at the entrance to the length-measuring station 106. This station consists of a front panel 617 having an elongated opening 619 through which the axles enter. Two hydraulic cylinders 619 and 620 are located at opposite sides of the station 106 to control the longitudinal movement of two sets of pistons 621—622 and 623—624. A housing 626 is attached to the upper side of the front panel 617 near the right hand end thereof to support a yoke (not shown in this figure) for measuring roughly the diameter of the right hand wheel seat of each axle as it passes through the station. The pistons 621—622 are linked together to a pair of connecting rods 627 and 628 joined at the center of the station by a crank arm 629 pivotally supported on a shaft 631.

The internal construction of the length-measuring station 106 is shown in FIG. 28, which is essentially FIG. 27 with the front panel 617 removed. In FIG. 28 the connecting structure of the length-measuring pistons is indicated. Pistons 621 and 622 are linked together by a yoke 632, the center of which is connected to a piston rod 633 which in turn is connected with a piston (not shown) in the hydraulic cylinder 619. Correspondingly, pistons 623 and 624 are connected by a yoke 634 to a piston rod 636 of a piston (not shown) in the right hand hydraulic cylinder 620.

A pair of switches 637 and 638 are shown adjacent the piston 622. These switches are energized by the piston as it moves in toward the center of the station in measuring the length of an axle. In order to make the station suitable for measuring a large number of axles, more than the two switches 637 and 638 may be provided, and such additional switches will normally be attached to the front panel 617 which is not shown in this figure.

The cross sectional view in FIG. 29 shows particularly the elevator mechanism and the wheel seat diameter gauge of the length-measuring station. The elevator mechanism includes an axle-holding saddle 641 mounted atop a piston rod 642 attached to a piston (not shown) within a hydraulic cylinder 643. The elevator mechanism is shown in its "down" position, which is the position it occupies to release an axle to the outgoing inclined rails 123.

In the upper part of the length-measuring station 106 in FIG. 29 is a wheel seat diameter gauge in the form of a yoke 644 supported in the housing 626. This yoke includes a pair of jaws 646 and 647 positioned at an angle to each other and mounted a fixed distance apart. These jaws are supported on a pair of piston rods of which only rod 648 is visible. Piston rod 648 moves up and down in a hydraulic cylinder 649, and, together with the companion rod, moves the yoke 644 up and down so as to engage an axle in the length-measuring station 106.

The yoke 644 is shown in greater detail in FIG. 30. Between the jaws 646 and 647 is a piston 651 which is biased by the spring 652 to extend downward against a collar 653 fixed on the piston 651. This piston is provided with several other collars 654–658 which engage the arm of a switch 659 as the piston is moved in and out against the pressure of the spring 652 in measuring the diameter of an axle inserted between the jaws 646 and 647.

In describing the operation of the length-measuring station 106 reference will be made to the mechanical drawings 27–30 in conjunction with the electrical diagram in FIG. 31. When an axle is on the buggy 103 of the conveyor 104 and is approaching the length-measuring station, the buggy, as was described in the section entitled Rails 89 and Conveyer 104 comes to a stop when it strikes a normally closed switch 609 a short distance in front of the length-measuring station. The buggy will not proceed further until a relay 612 is energized.

As shown in FIG. 31 a number of normally open limit switches must all be closed in order for the relay 612 to be energized. These switches include a switch 661, the location of which is shown in FIG. 29 and the purpose of which is to indicate that the yoke 644 is retracted; a switch 662, the location of which is shown in FIG. 28 and the purpose of which is to indicate that the length-measuring pistons 621–624 are retracted; a switch 663 located on the outgoing rails 123 and shown in FIG. 29; a switch 664 shown in FIG. 28 and serving to indicate that the elevator is in the "up" position; a switch 665 which is shown in FIG. 28 and which is actuated by an axle in the length-measuring station; and a switch 613 which is closed when the buggy 103 is in position in front of the station 106. When all of the foregoing switches are closed, the relay 612 is energized. This relay has instant closing contacts 612c which short-circuit the buggy-operated switch 613 so that when the motor 107 (FIG. 26) is energized to drive the buggy forward and away from switch 613, the relay 612 will remain energized.

When the buggy dumps the axle onto the stub rails 616, the axle rolls into the saddle 641 which is in its upper position at the level of rails 616. The axle bears upon an arm attached to the switch 665, actuating the latter switch. Since this is a normally closed switch, actuation of it opens the circuit and de-energizes the relay 612. At the same time a second pole 665a, which is normally open, becomes closed and completes the circuit to energize a solenoid 667 that controls the application of pressure fluid to the two hydraulic cylinders 619 and 620. These cylinders thereupon push their respective piston rods 633 and 636 in toward the center until the ends of the pistons 621 and 623 contact the axle resting in the saddle 641.

Pistons 622 and 624 are directly linked to the pistons 621 and 623 to move along with them to provide a balanced structure which will make the operation of the pistons easier and which will help prevent the pistons 621 and 623 from going askew and binding against the guide members 668 and 669. Another purpose of the piston 622 is to serve as a convenient indicator of the length of the axle. Since the pistons 621 and 622 are connected directly together, as the pistons 621 and 623 move in to make contact with the ends of the axle, the piston 622 moves in exactly the same distance and contacts one or another of several switches 637–640, each of which is connected in series with one of the lamps 670–673, respectively. These lamps are located in an indicator panel 111 outside of the shop where the axle-handling system is located and serve as indicating signals to a crane operator in the outer yard to load wheels of the proper category on the conveyers 112 and 113. Standard sizes of axles have journals that differ by lengths of approximately 1". The most common journals are 9", 10", 11" and 12" long, and therefore, by providing four switches 637–640 spaced the proper distance apart, it is possible to determine and to indicate the size of axle being measured. If the axle is a very long one and consequently has a high load-bearing capacity, only the first switch 637 will be energized and the light 670 will be on. If the axle is slightly shorter, both switch 638 will be actuated and light 671 will glow, and so on.

In addition to a measurement of length a measurement is made to determine whether new or old wheels should be placed on conveyers 112 and 113. This can be a very simple measurement which will determine only whether the wheel seat diameter is at the maximum limit or not, and it is made by the yoke 644 shown in FIGS. 29 and 30. When the switch pole 665a is closed, in addition to energizing the solenoid 667 it also energizes a time-delay relay 676. After the pistons 621–624 have made the length-measurement just described, the time-delay relay 676 will expire and the contacts 676a will close, thereby energizing a solenoid 677 which controls the application of hydraulic fluid to cylinder 649 and to its comparison supporting the yoke 644. When the solenoid 677 is energized the yoke 644 will be forced downward. As can be seen, the yoke is at a slight angle so that it clamps over the axle resting on the saddle 641 at the level of rails 616. As it does so, the piston 651 is pushed upward by the axle and the distance that the piston 651 moves is determined by the diameter of the axle; i.e., a smaller axle will fit farther into the jaws 646 and 647 and will therefore push the piston 651 farther up than will a large axle.

As the piston 651 moves upward in the yoke 644, each of the collars 654–658 makes contact with the arm of the switch 659 in turn. If the axle has a very large diameter, only the lowermost collar 654, if any, can make contact with the switch 659, but if an axle in the smallest category is being measured, the last collar 658, if any, will make contact. The collars 654–658 each have only a relatively narrow width so that they each make contact with the arm of the switch 659 over a limited range of travel of the piston 651. Accordingly, the collars are so arranged that each one makes contact with the arm of the switch 659 only if the axle whose diameter is being measured is a new axle, each collar serving that purpose for one of the four categories. For example, if the axle is of the largest size and is a new axle, the collar 654 will make contact with the arm of the switch 659 and will cause the light 675 to be on. However, if the axle is of the largest size but has been machined before the piston 651 will move up slightly farther so that the arm of the switch 659 will be between the collar 654 and the adjacent collar 655 and therefore the light 675 will not be on. The operator in charge of loading wheels onto the conveyers 112 and 113 will therefore know that the axle being measured is of the largest size but is not a new axle and therefore he will load a pair of new wheels of the largest load-bearing capacity on the conveyers 112 and 113.

As the operator loads a wheel on conveyer 112, a switch 676 is closed, energizing the latching coil of a relay 677 and closing contacts 677a and opening contacts 677b. Similarly, as the operator loads a wheel on conveyer 113, a switch 678 is actuated energizing the latching coil of a relay 679 and closing contacts 679a and opening contacts 679b. Opening contacts 677b and 679b de-energizes the solenoids 667 and 677 and causes the pistons 621–624 and the yoke 644 to retract. In addition, the lights 670–675 go out.

Furthermore, the closing of contacts 677a and 679a completes the circuit to a solenoid 681. This solenoid controls the application of hydraulic fluid to the elevator cylinder 643. Contrary to the usual case heretofore, the normal position for the elevator 643 is with the mechanism at its uppermost position, and energizing solenoid 681 causes the elevator to descend carrying the axle with it. As the saddle 641 drops below the level of a pair of inclined blocks 682, the latter take the weight of the axle and allow it to roll off onto the rails 123. As the axle rolls along, it actuates a switch 683 which is connected in series with the tripping coil 677t of relay 677 and also with the tripping coil 679t of relay 679. Tripping both of these relays opens up the contacts 677a and 678a and permits the elevator to rise up to the level of the incoming rails 616 to await the next axle to be measured in the length-measuring station.

AXLE-GAUGING STATION

After leaving the length-measuring station 106 the axles travel along rails 123 toward the axle-gauging station 124 in which both wheel seats of each axle are accurately measured and two electrical signals are generated corresponding to the diameter measurements of the two wheel seats. These two signals are then transmitted to the boring machines 114 and 115 to bore holes of corresponding size in a pair of railroad wheels.

In describing the axle-gauging station reference will be made to FIG. 1b for the overall layout, to FIG. 32 for a front cross sectional view of the station and to FIGS. 33 and 34 for detail views of the gauge used in the station. Reference will also be made to FIG. 35, which is a schematic electrical diagram of the electrical circuit associated with the movement of axles through the gauging station. This is not the electrical diagram of the measuring circuits associated with the gauges; that will be discussed hereinafter.

Referring first to FIG. 32 the gauging station is seen as it would appear with the front panel removed. Axles arrive at the gauging station on rails 123 and are stopped by a pair of stops 686 which are connected to a common shaft (not shown) to be pivoted simultaneously therewith. Just in front of the stops 686 and slightly below the level of the rails 123 is an elevator mechanism consisting of an I-beam platform 687 on which two axle-carrying V-blocks 688 are mounted. The platform 687 is pivotally suspended on pin 689 through the center thereof so that it is free to tilt slightly in order to accommodate the axles and to be sure that, when the elevator rises up, the axles will be properly placed in the gauges suspended overhead. The pin 689 is supported in a triangular member 690 which in turn is attached to a sub-platform 691. The sub-platform is supported on a piston rod 692 that is attached to a piston (not shown) in an hydraulic cylinder 693. A guide bar 694 is also attached to the sub-platform 691 to move in a channel member 695 in order to keep the elevator mechanism from pivoting. The frame 696 of the gauging station supports a pair of V-blocks 697 and 698 above the level of the rails 123. These V-blocks are spaced apart to receive the journals of an axle to be gauged in the station.

Between the V-blocks 697 and 698 are two micrometer-type hydraulically operated gauges 699 and 700 spaced apart by the standard railroad rail spacing so as to fit over the wheel seats of an axle to be gauged. Since the axle was centered on rails 123 by the operations of the pistons 621 and 623 (FIG. 28) just ahead of the gauging station, the wheel seats are sure to be located properly so as to fit in the gauges. These gauges are supported by a pair of pedestals 701 and 702 and the gauges themselves are free to slide back and forth, within limits, in a direction parallel to the rails 123 on ball bearing slides 703 and 704.

Since the gauges 699 and 700 are identical, only one will be described in detail, and in order to do so reference will be made to FIGS. 33 and 34. The gauge 700 comprises a C-shaped frame 706 having a precision-ground jaw 707 firmly attached to one side. An hydraulic cylinder 708 is attached to the other side and the piston (not shown) of the cylinder is attached to a slidable member 709 at the end of which is another precision-ground jaw 711. Measurement of the diameter of the wheel seat of an axle is made between the jaws 707 and 711 as the member 709 slides back and forth under the control of the hydraulic cylinder 708. The axle at the time of measurement is held up against the V-blocks 697 and 698 so that all axles to be measured, from the largest to the smallest, will fall within the line of the jaws 707 and 711.

The whole C-shaped frame 706 is free to slide back and forth a limited distance in the ball bearing slides 703 and 704. The purpose of this is to accommodate axles that may be slightly off center and also, and more importantly, to permit the frame to be moved out of the way of axles being lifted up to the V-block 697 and being lowered therefrom so that the jaws 707 and 711 will not be subjected to wear by the axles. The member 709 also moves back and forth in another pair of ball bearing slides 712 and 713, the length of movement being determined by the piston stroke of the piston in the cylinder 708.

A fixed stop 714 is attached to the support pedestal 702 to limit the movement of the frame 706 and the member 709 in one direction. The stop 714 is provided with an adjustment screw 716 to adjust the range of motion of the frame 706. This screw bears upon an upright member 717 attached to the member 709 so that as the piston moves to the right in the cylinder 708, it first draws the member 709 and the upright 717 to the right against the end of the screw 716, and when the upright 717 strikes the screw 716, continued movement of the piston in the cylinder 708 forces the C-shaped frame 706 to the left.

The upright 717 carries an adjustable bolt 718 which is held fast by means of a set screw 719. This bolt bears against the end of a longitudinally movable shaft 721 that is attached to an adjustable electrical element within a transducer 722. The purpose of the transducer is to transform longitudinal mechanical movement of the shaft 721 into an electrical signal of an amplitude dependent upon the distance of movement of the shaft. The body of the transducer 722 rests within and is entirely supported by the frame 706.

The operation of the wheel-gauging station 127 will be discussed with reference to the foregoing mechanical drawings in conjunction with FIG. 35 and the layout drawing FIG. 1b.

As the axles roll down the inclined rails 123 they strike an escapement 723 which is substantially identical with the escapements described in previous sections. A pair of normally-open switches 724 and 725 are provided to indicate whether or not the gauges 701 on the left and righthand sides of the station 127 are retracted so that an axle is free to move in between their precision-ground jaws. If the gauges are retracted, the switches 724 and 725 are held closed. In series with these switches are two more switches 727 and 728, the first of which is to indicate that the stops 686 are up in position to stop an axle as it rolls along the rails 123 and as it reaches the axle-gauging station. The second switch 728 is closed when the elevator sub-platform 692 is in its lowest position and therefore out of the way of an axle entering the gauging station. All four of the foregoing switches 724–728 must be closed before an axle can be introduced into the gauging station. In addition, another switch 729 must be closed by the weight of an axle ready to pass through the escapement 723. This switch completes the circuit to a relay 731 that energizes a pair of contacts 731a and another pair of contacts 731b. Closing of the contacts 731a energizes an escapement-controlling solenoid 732 to open the escapement 723 and to allow an axle to pass through. Contacts 731b keep the escapement open after the axle has passed through.

As the axle rolls along the rails 123 after passing through the escapement 723, it actuates a switch 733 which is normally open. When this switch is closed momentarily as the axle rolls along, it energizes the latching coil of a relay 734 which in turn opens up the normally-closed contacts 734a in series with the relay 731 and allows the latter relay to become de-energized, thereby de-energizing the solenoid 732 and permitting the escapement 723 to close.

The axle continues to roll until it strikes the stop 686 located just beyond switch 733. In the meantime a normally-open switch 736 is closed by the escapement 723 as the latter returns to the upright position. The closing of switch 736 is delayed by the relatively slow movement of the escapement, and so there is ample time for the axle to come to a halt against the stop 686 and in position immediately over the V-blocks 688. Therefore, when the switch 736 is finally closed, it energizes a solenoid 737 by means of a pair of contacts 734a which are now closed. The solenoid 737 governs the flow of hydraulic fluid to the cylinder 693 and raises the elevator.

When the elevator is in its uppermost position, it energizes a switch 738 in series with the latching coil of a relay 739. Also in series with the relay 739 are contacts 740a and 741a which are connected to relays associated with the operation of the two boring machines 114 and 115 and which are closed when the boring machines are in condition to start a boring operation on a pair of wheels. Assuming such to be the case, the relay 739 is latched, thereby closing contacts 739a and energizing a solenoid 742 which controls the flow of pressure fluid to the cylinder 706 of the gauge 700 and to the corresponding cylinder of gauge 699.

As the pressure fluid moves into the cylinders 708 the pistons therein move to the left (FIG. 33) causing the jaw 711 to move to the left until it contacts the wheel seat of the axle to be gauged. The fluid pressure continues to build up in the cylinder 706, and since the jaw 711 is now restrained from further movement to the left, the entire C-shapes frame 706 must move to the right until the jaw 707 is also in contact with the wheel seat. The amount of movement of the jaw 711 relative to jaw 707 is a direct function of the diameter of the wheel seat, and because the pressure in the cylinder 706 is the same for every axle measured, a high order of accuracy is maintained.

The signal to the boring machines 114 and 115 that the gauges are contacting the axle is given by a relay 743. This relay is energized when the switches 724a and 725a are allowed to close as the gauge jaws 707 and 711 move toward the axle. Closing these switches energizes a timer relay 744, and after a delay period has elapsed, the contacts 744a close and complete the circuit to the relay 743.

As the jaw 711 and the member 709 to which it is attached move to the left, the upright 717 also moves, bringing the head of the bolt 718 into contact with the end of the shaft 721 of the transducer 722. The result is that since the body of the transducer 722 is firmly attached to the frame 706, the total movement of the shaft 721 is a direct function of the distance between the jaws 707 and 711 and therefore a direct function of the diameter of the wheel seat. The accuracy of this device is such that wheels can be repeatedly bored in the boring machines 114 and 115 under the control of signals generated by the transducer in the gauges 699 and 700 to within .0005".

As the boring machines 114 and 115 finish their boring operation, which will be described hereinafter, contacts 746a and 747a open up. Both boring machines must be through so that both of the sets of contacts 746a and 747a can open up before the circuit that energizes the solenoid 742 is broken. After both boring machines finish a cycle of operation, the solenoid 742 is de-energized and the pressure fluid is withdrawn from the cylinders 708 to draw the pistons back into the cylinders, thereby retracting first the jaw 711 and then, after the upright 717 strikes the adjustment screw 716, the jaw 707 to the left.

At the time that the relay 739 was energized to start the gauging operation, contacts 739b were closed so as to energize a solenoid 746 and retract the stop 686. When the stop 686 is retracted, it actuates a normally-open switch 748, closing it and energizing the tripping coil 734t of the relay 734. This opens up the contacts 734a and de-energizes the solenoid 737 so that the elevator is free to move back down, carrying the axle with it. As the axle moves down, it comes to rest on the rails 123, but the elevator keeps on going down below that level. Since the stop 686 has been retracted, the axle is free to continue rolling down the inclined rails 123. As the axle rolls, it momentarily closes a normally open switch 749 and energizes the tripping coil 739t of the relay 739, thus returning the circuit to its initial state ready for another axle.

WHEEL CONVEYER SYSTEM

The conveyer systems for the wheels consist of a pair of inclined roller conveyers 112 and 113 leading to the boring machines 114 and 115, respectively, and another pair of inclined roller conveyers 124 and 126 leading away from the boring machines 114 and 115. At the boring machines 114 and 115 are two rotatable tables 116 and 121 to transport wheels from the incoming conveyers 112 and 113 to the boring machines 114 and 115 and from the latter to the conveyers 124 and 126. The layout of these elements is shown in FIG. 1b and a plan view of one of the tables is shown in FIG. 36 to illustrate the table in greater detail. FIG. 37 shows a partial side view of the table in FIG. 36 and FIG. 38 shows another partial side view of the table as well as the boring machine associated with it. FIG. 39 is an electrical schematic diagram of components associated with the operation of the wheel conveyer system and particularly with the rotatable tables 116 and 121.

Since the two wheel conveyer systems are essentially the same, only one will be described, starting with the parts shown in FIG. 38.

The boring machine 115 in FIG. 38 has a rotatable chuck 751 on which the freight car wheels are placed one at a time to be bored. In order to hold each wheel fast the chuck is provided with several jaws 752, each of which moves radially in and out in its own slot 753. The jaws are inter-connected to move in at the same time so as to center the wheel automatically. In order to carry the wheel across the tops of the chuck jaws 752 the table 121 is supported on a pedestal 754, and an elevator comprising an hydraulically operated piston 756 extends through the center of the chuck to receive the wheel from the table and to lower it into place between the jaws.

The mechanism that holds the wheel in place on the table 121 is shown in FIG. 37. This mechanism includes a set of four curved fingers 757 firmly attached to a pair of rods 761 and 762. Only two of the fingers appear in FIG. 37, the other two being directly behind them. The rods and the attached fingers are pivoted to grasp and to release a wheel by pressure from an hydraulic cylinder 763. One end of the cylinder 763 is linked to an arm 766 that is attached to the rod 761, and the piston rod 767 extending from the other end of the cylinder is connected to another arm 768 attached to the rod 762. When hydraulic fluid is applied to the cylinder 763 in such a way as to push the piston rod 767 to the left, the arms 766 and 768 pivot outwardly so that the fingers 757 are pivoted toward each other. In order to center the movement of the fingers a crank 769 is provided. The center of this crank is attached to a support 771 extending upward from the table 121, and a pair of rods 772 and 773 extend out from the ends of the crank to a pair of stub arms 774 and 775 that are secured to the rods 761 and 762, respectively. In this way motion of the opposing fingers 757 will be equal and opposite.

FIG. 37 also shows the arrangement of the loading elevator at the lower end of the conveyer 113. The reason for providing an elevator is to lift the wheel up to the table 121 so as to clear the side of conveyer 113 and the chuck jaws 752. The elevator comprises the piston 122 operated by an hydraulic cylinder 777. A collar 778 on the piston supports the hub of the wheel to lift it up to the position shown in broken lines where the fingers 757 can grasp it under the flange.

The relation between the locations of the loading station at the end of conveyer 113, the boring station at chuck 751, the unloading station at the upper end of conveyer 124, and the center of the index table 121 is shown in FIG. 36. By spacing the three stations 120° apart around a circle, in accordance with the invention, both loading and unloading operations can be carried on simultaneously and the number of movements of the table 121 for each cycle of operation can be kept to a minimum. The center shaft 779 of the table 121 must be at the center of the circle, and the three sets of fingers 757–759 are spaced 120° apart, corresponding to the locations of the three stations and directly over the loading elevator 122, the boring machine elevator 756, and an unloading elevator 781 which is a piston operated by an hydraulic cylinder 782. At each set of fingers 757–759 there is an opening 783–785 in the table 121 to permit the boring tool of the machine 115 to pass directly through to the wheel on the chuck 751 underneath.

Normal operation of the table 121 is carried out in a series of eight steps. Initially, a wheel that has been bored is resting on the chuck 751 and a new wheel is at the loading station.

(1) The loading elevator 122 and the boring machine elevator 756 lift these wheels up.
(2) The fingers 757 and 758 close and grasp the two upraised wheels.
(3) The elevators 122 and 756 descend.
(4) The table 121 rotates forward 120°.
(5) The table stops.
(6) The elevator 756 and the unloading elevator 781 move up to receive the new wheel and the bored wheel, respectively.
(7) The fingers 757 and 758 release these wheels onto the upraised elevators.
(8) The elevators 756 and 781 descend, carrying the new wheel into the chuck jaws 752 and the bored wheel onto the conveyer 124.

These eight steps will be further explained with reference to FIG. 39 in conjunction with the mechanical drawings in FIGS. 36–38.

Step 1.—Elevators Lift Wheels

At the beginning of a cycle of operation it will be assumed that there is a wheel at the lower end of the conveyer 113 resting against the arm of a switch 783 and thereby closing the switch. This energizes a latching relay 784 from a voltage source 790 and closes the contacts 784a. Three switches 785–787 are attached to the table 121 to indicate that the fingers 757–759 are open. These switches are normally open and are closed when the fingers are open, thereby energizing a relay 788. This relay, when energized, closes contacts 788a in series with the contacts 784a.

A switch 789 is located under the table 121 to indicate when the table is in proper position for loading and unloading. At such times the switch 789 is closed, and since the contacts 788b are already closed, a solenoid 791 is energized. This solenoid controls the supply of hydraulic fluid to the three cylinders 763–765 to keep the fingers 757–759 apart. At the same time a relay 792 is also energized since it is effectively in parallel with the solenoid 791.

At the end of a cycle of boring operations in the boring machine 115 a relay associated with the boring machine closes the contacts 793a, thereby completing the circuit to energize a solenoid 794 that controls the supply of hydraulic fluid to the loading elevator cylinder 777. At the same time, in the normal operation of the boring machine, another relay will have been energized so as to close the contacts 796a in series with a second solenoid 797 that controls the supply of hydraulic fluid to the elevator 756. When the solenoids 794 and 797 are thus energized, the elevators 122 and 756 rise up, carrying respectively a new wheel from the conveyer 113 and a wheel from the chuck 751 to the fingers 757 and 758 of the index table 121. This completes Step 1.

Step 2.—Fingers Grasp Wheels

When the loading elevator 133 is up, it closes a switch 798, and when the elevator 756 in the boring machine is up, it closes another switch 799 in series with the switch 798. Closing both of these switches completes the circuit to energize a relay 801 and this relay in turn opens up contacts 801a to deenergize the solenoid 791 that kept the fingers 757-759 closed. Relay 801 also opens contacts 801b in series with the relay 792. Opening the latter contacts de-energizes the relay 792 and therefore permits the normally-closed contacts 792a to close. These contacts are in series with a solenoid 802 that controls the supply of hydraulic fluid to close the fingers 757-759 by reversing the flow of fluid to the cylinders 763-765. Since the switches 798 and 799 remain closed, the closing of contacts 792a energizes the solenoid 802 and closes the fingers 757-759. The fingers 759 at this time have nothing to close upon but the fingers 757 close upon the flange of a new wheel resting on the elevator 122 and the fingers 758 close upon a bored wheel resting on the elevator 756. This completes the second step.

Step 3.—Elevators Descend

When the fingers 757 and 758 close, the pressure in the hydraulic line feeding the cylinders 763-765 to keep the fingers closed builds up and closes a pressure-operated switch 803 in series with a relay 804, energizing this relay. When the relay 804 is energized, it closes a pair of contacts 804a in series with a second relay 806. Energizing this relay opens up the normally-closed contacts 806a and de-energizes the solenoids 794 and 707 that supply hydraulic fluid to keep the elevators 122 and 756 up. At the same time relay 806 closes contacts 806b to complete the circuit to energize three solenoids 807-809 which control the hydraulic fluid to cause the elevators 122, 756 and 781, respectively, to descend. The third elevator 781 is already down, but it is more convenient and safer to energize its solenoid 809 at the same time as the other two. This completes Step 3.

Step 4.—Table Starts Rotating

When the eelvators are down they close three normally-open switches 811-813. A pair of contacts 806c has already been closed by the operation of relay 806 and so the circuit is complete to energize a relay 814. This relay closes contacts 814a in series with a solenoid 816 that causes the table 121 to rotate forward. This completes Step 4.

Step 5.—Table Stops After Rotating 120°

As the table 121 starts to rotate it permits a normally-closed switch 817 that had been held open while the table was not rotating, to close, thus energizing a relay 818 and closing the contacts 818a. The solenoid 816 may thus be energized through the path including the contacts 818a and the switch 817. In addition relay 818 closes the contacts 818b to energize the latching coil of a relay 819. When this relay is latched, it closes contacts 819a in series with a relay 821. Energizing relay 821 causes the normally closed contacts 821a in series with the relay 814 to open up and thereby to de-energize the relay 814. This opens up the contacts 814a but, as has just been explained, the solenoid 816 remains energized and the table 121 continues to rotate for 120° until a projection 820, which is one of three equally-spaced projections, strikes the arm of the switch 817, opening the switch and de-energizing the solenoid 816. This stops the table 121 and completes the fifth step.

Step 6.—Elevators Ascend to Receive Wheels

When the relay 821 is energized, it also closes contacts 821b. Contacts 788c are in their normally-closed state, and so when the switch 817a, which is the second pole of the switch 817 is closed by the projection 820, the circuit is complete to energize the solenoid 787 again. The contacts 796a are still closed since the boring machine 115 has not gone into the next cycle. Contacts 788a are open since the relay 788 is at this time not energized, and so the solenoid 794 cannot be energized again, but the contacts 806d are closed in series with a third solenoid 822 allowing it to be energized. Solenoid 822 controls the hydraulic fluid to cause the elevator 781 to go up. The two elevators 756 and 781 go up, ending Step 6.

Step 7.—Fingers Release Wheels

When the elevator 756 goes up it again closes the normally-open switch 799. A switch 723 in series therewith is closed when the elevator 781 goes up and this completes the circuit to energize the relay 792 again, thereby opening up the normally-closed contacts 782a and 782b. This de-energizes the relay 801, as well as the solenoid 802 that holds the fingers 757-759 closed. De-energizing the relay 801 allows the normally-closed contacts 801a to close, and since the table 121 is now stopped in position to release the wheels loaded on it, the switch 789 is also held closed. This completes the circuit to energize the solenoid 781 which reverses the flow of hydraulic fluid to the cylinders 763-765 and causes the fingers 757-759 to open up, thereby completing the seventh step.

Step 8.—Elevators Descend With Wheels

When the fingers 757-759 open up, they cause the switches 785-787 to close, thereby energizing the relay 788. This relay closes the contacts 788d, and since the contacts 721c are now also closed, because the relay 721 is also energized, the three solenoids 807-809 are closed to direct the hydraulic fluid so as to lower the elevators. Only two of the elevators need to be lowered at this time, but energizing solenoid 807 does no harm. This completes the last step.

Following the completion of the mechanical steps of operation involving the table 121, the electrical circuit automatically returns to the initial condition. Since the relay 819 is energized, the contacts 819b are closed and therefore energize the tripping coil 804t of the relay 804. A relay associated with the boring machine 115 completes its operation and closes the contacts 804a to energize the two tripping coils 784t and 819t of the relays 784 and 819 respectively. The circuit is then back in its initial condition ready for a second cycle of operation.

BORING MACHINE

The boring machine is the subject of an application filed by William R. Miller, George B. Anderson, Peter Hold and Francis E. Compton on November 12, 1958, Serial No. 773,278 now Patent No. 3,037,402, entitled Boring Machine and assigned to the assignee of the present invention. Since it is an integral component of the complete system of the present invention, it will also be described here.

Two boring machines 114 and 115 are used in the system as shown in FIG. 1b. This permits both wheels that are to be used with each axle to be bored simultaneously and greatly reduces the amount of shifting around that would be required if only one such machine were used. The two machines 114 and 115 are identical and so all discussion will be related to the latter machine 115.

FIG. 36 shows a top view of the boring machine 115 and FIG. 38 is a side view. FIG. 40 is a schematic diagram of the electric circuit to operate the boring machine automatically in the system of the present invention, and FIG. 41 shows in simplified schematic form the servo-mechanism by which the operation of the boring machine is controlled according to measurements made in the axle-gauging station.

The boring machine 115 in FIG. 38 is constructed on a base 826 which supports both the chuck 751 and an upright 827. The upright rests on ways 828 and is free, within narrow limits to slide back and forth in the direction of the arrow 829. This sliding motion is governed by an hydraulic cylinder (not shown) within the machine. The upright supports a ram 831, which is really an hydraulic cylinder having a piston (not shown) within it attached to the upper end of the upright 827 by a fixed rod 832 so that the cylinder, rather than the piston, moves up and down in a track 833 under hydraulic pressure. At the lower end of the ram 831 is a boring bar 834 with three bits 836–838 shaped and positioned to make, respectively, a rough cut, a smoothing cut, and a finishing cut in boring the axle hole in a wheel. A chamfering bit 840 is provided above the boring bits. The chuck 751 is rotated by a chuck motor 839, which means that it is the workpiece (wheel) that rotates and the cutting tools that remain stationary, just as in a lathe.

The radius of the hole is determined by how far the cutting edges of the bits 836–838 extend to the left of the center of the chuck 751 on which the wheel is held. For large holes, the entire upright 827 is moved to the left; for smaller holes it is moved back to the right. In the automatic system of the present invention the exact lateral position of the upright 827 relative to the base 826 is controlled by a servo system. This includes a bracket 841 extending out and down from the rear of the upright. The lower end 842 of the bracket extends a short distance back in toward the upright and is cut off at a slight angle. The purpose of the angled face on the end 842 is to match an angled face on a double wedge 844, shown in FIG. 36, that can be moved in a direction perpendicular to the plane of the drawing by a small motor 843 which, together with the wedge 844, is mounted on the base 826.

FIG. 41 includes both a schematic representation of the servo system and a simplified perspective view of the double wedge 844, so named because two of its surfaces 846 and 847 are not parallel to any of the other surfaces. In particular the lower surface 847 is not parallel to the upper surface 849 and the back surface 846, while perpendicular to the lower surface 847, is not perpendicular to the end surface 848. However, the back surface 846 is parallel to the end 842 of the bracket 841, as may also be seen in FIG. 36.

The motor 843 moves the wedge 844 back and forth in the direction indicated by the arrow 851. This motor is connected to a bridge circuit 852. The bridge circuit is schematically illustrated and comprises a transducer 722 in the gauge 700 of the axle-gauging station, a second transducer 853 attached to the base 826 of the boring machine 115, and two balancing impedances 854 and 856. The bridge is powered by a voltage source 857.

As was described in the section entitled Axle Gauging Station, when the shaft 721 of the transducer 722 is moved longitudinally, an electrical signal is generated. More precisely, what happens is that longitudinal movement of the shaft 712 varies the impedance (resistive, capacitive, or, as in the present case, inductive) of the transducer 722. The transducer 853 has similar characteristics to the transducer 722, and so a change in the transducer 722 unbalances the bridge 852 and creates an error signal that is connected to the motor 843 to turn it in one direction or the other. The shaft 858 of the transducer 853 bears against the lower wedge face 847, and, because of the angle of the face 847 to the direction of motion of the wedge 844, the shaft 858 moves into the transducer 853 as the wedge moves to the right and out of the transducer 853 as the wedge moves to the left. The motor 843 is polarized so as to cause the wedge 844 to move in a direction which will change the impedance of the transducer 853 in such a way as to bring the bridge circuit 852 back into balance.

When the wedge 844 moves left or right, the surface 846 moves away from or toward the correspondingly angled surface of the end 842 of the bracket 841. After the wedge has moved to a position at which the bridge 852 is again balanced, the cylinder that moves the upright 827 is energized to move the upright forward until the surface of the end 842 presses against the surface 846 of the wedge 844 with a predetermined pressure. The boring bits 836–838 have previously been set so that when the upright 827 is thus adjusted, a hole of the precisely desired size can be bored in the wheel on the chuck 751.

At the beginning of each cycle of operation the upright 827 is back in its rearmost position and the ram 831 is up at the top of its range of travel so that the boring bar 834 is out of the way of an incoming wheel. The chuck 751 is stationary and a wheel is resting between the jaws 752. From the starting position the operating cycle proceeds in a series of twelve steps.

(1) The upright 827 moves forward to a position determined by the servo system, ready to cut a hole of the proper size in the wheel.

(2) The chuck 751 starts to rotate to move the jaws 752 inwardly to grasp the periphery of the wheel.

(3) The chuck motor 839 changes to high speed.

(4) The ram 831 moves down at slow speed, making the first cut with the bit 836.

(5) The ram 831 speeds up to make the finishing cut with the last bit 838.

(6) The motor 839 drops to slow speed. (This is only done for boring steel wheels; cast iron wheels are bored at high speed.)

(7) The ram stays at the bottom of its range of travel.

(8) The chuck motor 839 is stopped.

(9) The upright 827 moves back.

(10) The ram 831 moves up.

(11) The motor 839 is reversed to loosen the jaws 752 of the chuck 751.

(12) The motor 839 is stopped.

In describing the electrical circuit connections that cooperate to produce the foregoing steps in a cycle of operation of the boring machine 115, reference will be made primarily to the electrical diagram in FIG. 40 together with the mechanical drawings in FIGS. 36 and 38.

*Step 1.—The Upright 827 Moves Forward From its Regular Position*

When the axle gauging is complete in the axle-gauging station 127, the relay 743 referred to in the section entitled Axle-Gauging Station is energized and its contacts 743a close. These contacts are in series with contacts 821e that are under the control of a relay 821 shown in FIG. 39 which, at the beginning of a cycle of operation of the boring machine, is energized. Therefore, the contacts 821e are closed and so the circuit to a solenoid 859 is completed, energizing the solenoid from a voltage source 861. This solenoid is part of the hydraulic fluid control system that actuates the cylinder to drive the upright 827 forward.

A relay 862 is connected directly in parallel with the solenoid 829. This relay contacts 862a which close instantaneously on the application of an energizing voltage to the relay. When these contacts 862a close a second solenoid 863 is energized. This second solenoid completes the hydraulic circuit to energize the cylinder which drives the upright 827 forward under the control of the servo mechanism system as was described in connection with FIG. 41. This completes the first step.

*Step 2.—The Chuck 751 Starts to Rotate*

As the upright 827 moves forward, it moves away from the arm of a switch 864. This switch is a normally-closed switch that is held open by the pressure of the upright 827, and so when the latter moves forward, this switch reverts to its normally-closed condition. After a period of time the time-delay contacts 862b of the relay 862 open up and cut off the hydraulic pressure pushing the upright 827 forward by de-energizing the solenoid 863.

In the meantime the circuit indicated by reference character 866 closes. This circuit is actually shown in FIG. 39 and consists of switches 811–813, a normally-closed switch 868 and contacts 821d and 878e. The switches 811–813 are located adjacent the three elevators 122, 756, and 881 that load the wheels onto the table 121 and unload the wheels therefrom. These switches are closed when the elevators are all down. The arm of the switch 868 extends out over the wheel when the latter is in the position in the chuck jaws 752 and the switch is normally closed unless the wheel is tilted up or comes free of the chuck jaws so as to actuate the switch. While the circuit in FIG. 40 is indicated by reference charcter 866, in actual practice the terminals 867 in FIGS. 39 and 40 will be connected directly together. Since the contacts 784c in series with the circuit 866 are already closed at this point in the operation of the boring machine, the immediately effect of completing the circuit 866 by closing the switches 811–813 is to energize a relay 869 and two time-delay relays 871 and 872.

As was stated in the preamble to the list of the series of operations of the boring machine, at the beginning of each operating cycle the ram 831 is in its uppermost position at which it actuates a normally-open switch 873 holding the latter closed and thereby energizing a relay 876. Energizing this relay closes contacts 876a to complete the circuit to energize a solenoid 874. The purpose of this solenoid is to operate a brake within the chuck 751 so that when the chuck begins to revolve, the jaws 752 will be forced to move toward the center thereof and will grip the wheel resting on the chuck. This brake is controlled by an hydraulic cylinder (not shown) within the base 826 of the boring machine 115, and the force with which the jaws grip the wheel will be determined by the speed with which the chuck 751 is rotated and also by the force applied by the hydraulic cylinder to the brake.

At about this time the delayed closing of contacts 872a takes place, thereby completing the circuit to a relay 877. This is the starting relay for the motor 839 that drives the chuck 751. Energizing the relay 877 closes the contacts 877a–877c and starts the motor 839. This completes Step 2.

*Step 3.—The Chuck Motor Changes to High Speed*

Subsequently, the delayed closing of contacts 871a takes place, energizing a relay 879. The latter opens up normally-closed contacts 879a to de-energize the relay 869. The time-delay relay 871 also actuates a pair of normally-closed delayed opening contacts 871b. When these contacts open after the delay period has passed, relays 877 and 878 are de-energized along with the solenoid 874. As long as the solenoid 874 was energized a pressure was applied to the jaws 752 of the chuck 751 tending to increase the force with which the wheel was held in place. De-energizing the solenoid 874 does not reduce the gripping force but merely holds it constant.

Deenergizing the relay 877 allows the contacts 877d to close and this, in combination with the closing of the contacts 879b permits a relay 881 to be energized. Relay 881 closes a set of contacts 881a–881e to energize the high speed windings of the motor 839. This completes Step 3.

*Step 4.—The Ram 831 Moves Down*

The relay 881 also closes contacts 881f to energize a relay 882 which in turn closes contacts 882a in parallel with the contacts 881f to keep the relay 882 energized even after the relay 881 has become de-energized. Energizing the relay 882 opens up the normally-closed contacts 882b to de-energize the timer relay 871. This results in opening the contacts 871a to de-energize the relay 879, and thus to open the contacts 879b. However, the high speed control relay 881 remains energized through contacts 881g.

De-energizing the timer relay 871 permits its normally-closed contacts 871b to return to their normally-closed condition, completing the circuit to the timer relay 872 so that this relay is energized for a second time in the cycle.

It may be recalled that the first time the relay 872 was energized it resulted in energizing the starting relay 877 of the motor 839. However, the motor is already rotating by the time the relay 872 is energized a second time and so there is no need to energize the relay 877 again. The normally-closed contacts 881h are provided for the very purpose of keeping the relay 877 de-energized, for at this point in the cycle, these contacts 881h are open.

Up to this point the ram 831 is still in its uppermost position holding the switch 873 closed and keeping the relay 876 energized. This keeps the contacts 876b closed. The upright 827 has moved forward, allowing the switch 864 to close, and so when the relay 882 closes the contacts 882d, a solenoid 883 is energized. This solenoid controls an hydraulic switch to start the hydraulic fluid to the ram 831 to force the ram downward. This completes the fourth step.

*Step 5.—The Ram 831 Slows Down Temporarily to Make a Rough Cut*

As soon as the solenoid 886 actuates the hydraulic switch to start the hydraulic fluid flowing into the upper end of the ram cylinder 831, the solenoid can be de-energized. In fact this is what happens since the switch 831 opens up as soon as the ram starts down and de-energizes the relay 876 which causes the contacts 876b to open up.

As the ram moves downward it actuates a mechanical cam 884 which changes the rate of flow of oil to the upper end of the ram cylinder 831 to cause the ram to progress more slowly while the first tool bit 836 bores a rough hole in the wheel being machined. Before the finishing tool 838 begins to cut, the ram 831 actuates the mechanical cam 884 in the reverse direction to speed up the downward progress of the ram. This completes the fifth step.

*Step 6.—The Motor 839 Drops to Slow Speed to Make a Finishing Cut (This Step is Omitted for Boring Cast Iron Wheels)*

At about the same time that the ram actuates the mechanical cam 884 to speed up the downward progress of the ram 831, the ram also momentarily actuates a switch 886. This switch is in series with the relay 881 that energizes the high speed windings of the motor 839 and the result of opening up the switch 886 is that the high speed windings are disconnected by opening up the contacts 881a–881e. If cast iron wheels are being bored the switch 886 may be short-circuited by a push button switch 887. However, assuming that the switch 887 has not been closed, the momentary opening of the switch 886 disconnects the high speed windings and allows the contacts 881h to close. Since the contacts 872a are already closed, the circuit to the relays 877 and 878 is complete. The relay 877, when energized, closes the contacts 877a–877c to energize the low speed windings of the motor 839.

At the same time that the relay 881 is de-energized by opening the switch 886, a second pole 886a of the switch closes. Contacts 882c are already closed so a relay 888 is energized. This relay is provided with contacts 888a in parallel with the switch 886a to keep the relay 888 energized after the ram 831 has passed by the arm of the switch. Energizing the relay 888 also results in closing the delayed-action contacts 888b a short time later, thereby energizing a relay 889 and short-circuiting the starting resistors 891a–891c. This completes the sixth step.

*Step 7.—The Ram 831 Stops at the Bottom of its Range of Travel*

The ram 831 continues downward while the finishing tool 838 makes a finishing cut on the surface of the hole in the wheel. The ram continues still farther while a chamfering tool 820 chamfers the edge of the hole in the wheel and as soon as this is done the ram 831 actuates a switch 892 which stops the downward motion of the ram and completes the seventh step.

Step 8.—*The Chuck Motor 839 is Stopped*

Closing the switch 892 energizes a time-delay relay 746. This relay has a pair of normally-closed contacts 746c that open up as soon as the switch 892 is closed. This results in de-energizing the relays 872, 877, 878 and 882. As a result all of the contacts through which current is supplied to the motor 839 to drive it in the forward direction are opened. When this happens, the motor would normally coast to a stop after a period of time. However, it is desirable to brake the motor more quickly. This is done by plugging which is the process of connecting the motor 839 to operate in the reverse direction.

The motor 839 operates a plug switch 893. This switch is mechanically linked to the motor and is operated by the force of rotation so that the arm of the plug switch 893 makes contact with the terminal marked F when the motor is rotated in the forward direction and with the terminal marked R when the motor is rotating in the reverse direction. The arm of the plug switch 893 remains in contact with the appropriate one of these terminals so long as the motor continues to rotate in the corresponding direction, even though this rotation is constantly slowing down, as would be the case when the motor was being braked to a halt.

When the motor is rotating in the forward direction and the arm of the switch 893 makes contact with the terminal F, a relay 894 is energized. This relay closes a pair of contacts 894a in series with a reverse relay 896. As soon as the contacts 882e return to their normally-closed state when the contacts 746c open up, the circuit is complete to energize the relay 896. This closes the contacts 896a–896c and reverses the connection to the motor 839. Since at this time the motor 839 is rotating in the forward direction, the result of connecting it so as to operate in the reverse direction is that the motor quickly comes to a stop. However, the motor does not start in the reverse direction because as soon as it stops the arm of the switch 893 automatically returns to a neutral position at which it is not in contact with either of the two terminals R or F. Therefore, the relay 894 is de-energized and the circuit to the relay 896 is also de-energized, which means that the contacts 896a–896c are opened up. This completes the eighth step.

Step 9.—*The Upright 827 Moves Back*

Before the ram 831 can be pulled up, the upright 827 must be moved back so that there will be no chance for the tool bits, particularly the finishing bit 838, to score the surface of the wheel or to be broken by being rubbed against the wheel. At the time the contacts 746c open up and start the chain of events that stops the rotation of the motor 839, it will be seen by referring briefly to FIG. 39 that the contacts 746b are closed, thereby energizing the tripping coil 819t of the relay 819. When this happens the contacts 819a open up, de-energizing the relay 821 and returning all of the contacts of the latter relay to their normal states.

Returning to FIG. 40 it will be seen that the effect of de-energizing the relay 821 is to permit the contacts 821f to close. The closing of these contacts and the subsequent closing of the delayed contacts 746d energizes a solenoid 897. The solenoid 863 is already energized by a circuit including the normally-closed contacts 862b and 862c and the normally-closed switch 864. As a result, when both solenoids 873 and 897 are energized, the upright 827 is moved back, completing the ninth step.

Step 10.—*The Ram 831 Moves Up*

When the upright 827 moves back so that there is no danger that the tool bits 836–838 will contact the wheel, the ram 831 can move up. In order for this to happen the upright 827 must open the switch 864 thereby de-energizing the solenoid 863 and stopping the rearward movement of the upright. At the same time a second pole 864a of this switch is closed and energizes a relay 741. The latter closes contacts 741a and since the ram 831 is at the time still down against the switch 892, a solenoid 898 is energized. This solenoid is similar to the solenoid 883 in that operation of the solenoid 898 operates another hydraulic switch to feed hydraulic fluid to the lower part of the ram cylinder 831 so as to drive it upward. The solenoid 898 remains energized via the contacts 746e and 876c after the switch 892 opens. This completes Step 10.

Step 11.—*The Motor 839 Is Reversed To Loosen the Chuck*

When the ram 831 reaches the top of its range of travel it closes the switch 873 and energizes the relay 876 and relays 793, 899 and 901 through the now-closed contacts 821g. Energizing the relay 876 opens the normally-closed contacts 876c and de-energizes the relay 746, thus permitting the contacts 746c to close. Energizing the relay 901 opens the normally-closed contacts 901a so that the timer 872 is not energized when the contacts 746c are closed. Nor is the relay 877 energized at this time. However, since contacts 876a and 876d are both closed, both solenoids 874 and 902 are energized through a circuit including contacts 901b, 901c and 793b. The purpose of energizing both solenoids 874 and 902 is to increase the flow of hydraulic fluid to the brake that works the jaws 752 of the chuck 751. It requires a greater force to release the grip of the jaws 752, or to unchuck, the wheel than it did to chuck the wheel in the first place. As in the case of chucking the wheel, the unchucking operation is accomplished by the combined force of the brake and the rotation of the chuck 751. This latter force must, of course, be exerted in the opposite direction and this requires the motor 839 to be run in reverse.

The reverse contacts of the motor 839 are contacts 896a–896c which are closed when the relay 896 is energized. The relay 896 was previously energized via contacts 900a in order to plug the motor 839 to a stop from the forward direction, but during the process of releasing the bored wheel from the jaws 752 the relay 900 is energized and therefore the aforementioned contacts 900a are open. However, the relay 900 also has delayed-action contacts 900b which close shortly after the relay 900 is energized. This gives the solenoids 874 and 902 time to set the brake that will open up the jaws 752. After the contacts 900b close, energizing the relay 896, the contacts 896a–896c close and start the motor 839 in the reverse direction. At the same time contacts 896d and 901d are also closed, thereby energizing the relay 889 and shorting-out the starting resistors 890a–890c. As a result the motor 839 jumps from standstill to full reverse operation almost instantaneously, creating an impact-type of force which assists in loosening the grip of the jaws 752 on the wheel held therein. This completes the eleventh step.

Step 12.—*The Motor Stops From Reverse Rotation*

As the jaws move back, they close a switch 903, energizing the relay 796. This relay closes the contacts 796b in series with the terminal R of the plug switch 893. A short time later the contacts 793b open up and de-energize both solenoids 874 and 902, and the relay 896, allowing the contacts 896c to close. These contacts are in series with the forward-starting relay 877 and, since the reverse rotation of the motor 839 forces the arm of the plug switch 893 against the reverse terminal R, the relay 877 is energized, thereby closing the contacts 877a–877c to connect the motor to operate in the forward direction. As a result the motor is braked quickly, or plugged, to a stop from the reverse direction, and the cycle of operation of the boring machine 115 comes to an end.

WHEEL TIP-UP STATION

The basic aspects of the invention are fulfilled by the axle and wheel handling and machining system described so far. At this point the axles have been machined, tested, and gauged and wheels of the proper sort have been selected and machined in accordance with the gauging of the axles. Each axle could be paired with its corresponding wheels and sent any distance to a wheel press to be assembled into a unit for mounting on a freight car. However, the difficulties of doing so, the most obvious of which is the danger that these carefully matched axles and wheels might become separated, are overcome by ancillary features of the invention, starting with the wheel tip-up station 129 in FIG. 1b.

The basic reason for the existence of the tip-up station is that the wheels are carried in a horizontal position on the conveyers 112 and 113, the tables 116 and 121, the boring machines 114 and 115, and the conveyers 124 and 126 and must be tilted at some point to a vertical position to be mounted on the axles in the wheel press 131. The wheels are much easier to handle if they are horizontal rather than vertical, being in stable equilibrium in the horizontal position. Furthermore, it is much simpler to handle the wheels if the flanges are facing up rather than down. This requires that the wheels be conveyed to opposite ends of their matching axle and be tipped up toward it.

The tip-up station 129 is shown in plan view in FIG. 42 and in greater detail in FIG. 43. FIG. 44 is a front elevational view corresponding to FIG. 43, and FIG. 45 shows the tilt table of FIG. 44 rotated to the vertical position. The electrical circuit associated with the tip-up station is shown in FIG. 46.

Wheels move down the conveyers 124 and 126 to a pair of platforms 906 and 907 at opposite sides of the tip-up station 129. Subsequently, a pair of pusher bars 908 and 909 operated by hydraulic cylinders 910 and 911 push the wheels toward the center of the station and onto a pair of tilting tables 912 and 913, respectively. The wheels are stopped by a pair of rails 914 and 916 affixed at an angle to the tables 912 and 913 so that when the latter are pivoted to a vertical position, the rails will be sloped to allow the wheels to roll forward toward the press 131.

The conveyers 124 and 126 do not lead directly to the tilt tables 912 and 913 for the reason that it is desirable to provide means to remove improperly bored wheels from the system. This is done, in accordance with the invention, by tilting either or both of the platforms 906 and 907 by means of the cylinders 917 and 918 to allow the wheel or wheels thereon to continue forward in the direction of the arrows 919 and 921, which is also the direction that wheels travel on conveyers 124 and 126. Normally, however, it will be desired to stop the wheels on the platforms 906 and 907, the barriers 922 and 923 are provided for that purpose.

Referring now to FIG. 43 which shows the left hand side of the tip-up station 129, the tilt table 913 can be seen to be hinged about a rod 924. An extension 926 is linked by a wrist pin 927 to a piston rod 928 extending from a piston (not shown) within an hydraulic cylinder 929. The cylinder 929 is pivoted in a pair of uprights 931 attached to a frame 932 to take the back pressure of the cylinder 929 when the table 913 is tilted.

This arrangement may also be seen in FIG. 44. The arrow 933 indicates the path of movement of the wrist pin 927 as the table 913 tilts upward in the direction of the arrow 934 and illustrates the need for mounting the piston 929 so that it will be free to pivot to accommodate movement of the wrist pin.

In back of the table 913 is a frame 936 that supports two guide bars 937 and 938. These bars guide the wheel after it has been tilted to the upright position, as shown in FIG. 45. The inner bar 937 extends out over the tilt table mechanism so as to catch the wheel in the upright position and to prevent it from falling over onto the cylinder 929. The outer bar 938, of course, does not extend out as far as does the bar 937.

When the wheel is tilted upright it rests on a bar 939 and against a bar 940, both of which form a part of the rail 916, and is prevented from side movement by the table 913 and the bar 937. Since the rail 916 slopes downward, the wheel rolls forward away from the table 913 until it is guided only by the bars 937–940.

In describing the steps of operation of the tip-up station reference will be made to FIG. 46 in conjunction with FIGS. 42–45. In general only the left side of the tip-up station will be described since the right side is exactly like it.

A switch 942 is closed by a wheel on the platform 907 and a similar switch 943 is also closed by a wheel on the right hand platform 906. A third switch 944 is closed if the tilt table 913 is down in the horizontal position so as to rest against the arm of the switch 944. If these three switches are closed, the circuit to energize a relay 947 from a voltage source 948 will be complete.

When the relay 947 is energized, it closes a pair of contacts 947a to short-circuit the switches 942–944. In addition the contacts 947b are also closed, energizing a relay 949 which, in turn, closes two pairs of contacts 949a and 949b. The closing of contacts 949a energizes a solenoid 951 that controls the hydraulic fluid to the cylinder 911 to move the pusher bar 909 to the right, thus moving the wheel from the platform 907 onto the table 913.

A rod 952 is attached to the pusher bar 909 to slide along with it. This rod slides in a guide 953 and has a catch 954 that engages the arm of a switch 956 when the rod 952 is extended out over the platform 907. The switch 956 is normally closed except when it is opened by the catch 954 and, once the relay 949 is energized via contacts 947b, it will remain energized via the switch 956 as long as the latter remains closed. When both switch 956 and another normally-closed switch 957 are opened, both relays 947 and 949 will be deenergized, as will the solenoid 951, so that the pusher bar 909 can be retracted back into the cylinder 911.

A second, normally-open pole 956a of the switch 956 is closed by the action of the catch 954. This second pole 956a is connected in series with the latching coil of a relay 957 to latch the relay and thereby to close a pair of contacts 957a in series with a solenoid 958. This solenoid governs the flow of motive fluid to the tilt table cylinder 929 and causes the table to be pivoted up when the solenoid is energized. However, before the solenoid 758 can be energized, three switches 961–963, as well as the contacts 957a, must be closed. The first switch 961 (see also FIG. 42) is normally closed unless there are wheels on the rails 132 and 133 between the tip-up station 129 and the wheel press 131. The second switch 962 is of the normally-open type and is located so as to be held closed when the pusher bar 909 is retracted into the cylinder 911. The third switch 963 is located adjacent wheel escapement 964 similar to the axle escapements located at various points in the system. The escapement 964 is located on the rail 132 (FIG. 42) to prevent the wheel from rolling off the end of the rail. When the wheel escapement 964 is closed, the switch 961 is also closed, and since this completes the circuit, the solenoid 958 is energized, and the table 913 is tilted up to allow the wheel to roll forward.

As the wheel rolls down the rail 132, it strikes the switch 961, opening it and de-energizing the solenoid 958 to permit the table 913 to settle back down. At the same time a normally-open second pole 961a of the switch is closed, energizing the tripping coil 957t to return the circuit to its original state ready for another wheel.

Finally, a push button 966 is provided to energize a solenoid 967 that controls the cylinder 918 on those rare occasions when it is desired to operate the cylinder 918 in order to tilt the platform 907 forward to dispose of an incorrectly bored wheel. This is done so seldom that there is no need to incorporate an automatic circuit to operate the solenoid 967.

WHEEL AND AXLE LUBRICATION AND AXLE CENTERING STATION

It is common industry practice to lubricate the wheel seats of each axle and the axle hole in each wheel with a mixture of basic carbonate white lead and boiled linseed oil before pressing the wheels onto the wheel seats. In accordance with the present system means which are not per se part of this invention are automatically operated to deliver measured amounts of lubricant to each wheel bore and axle wheel seat.

In addition, means are provided in the present system to center the axles automatically just before they enter the wheel press. This latter feature may be omitted if the wheel press is not located adjacent the end of the rails 128 or if the wheel press to be used does not require a centered axle. The type of wheel press with which it is contemplated that the present system would normally be used is that described and claimed in an application, Serial No. 769,503, filed on October 24, 1958 by John W. Reed, Henry J. Halvorsen, Peter Hold, and William R. Miller and entitled Railroad Wheel Mounting Press.

In describing the wheel and axle lubrication and axle center reference will be made to: FIG. 42, which shows a plan view of the layout; FIG. 47, which shows a front elevational view of the axle centering structure; FIG. 48, which shows a top view of the structure in FIG. 47; and FIG. 49, which is a schematic electrical diagram of the circuit by means of which the automatic operation of components in FIGS. 42, 47, and 48 is controlled.

After each axle is released from the gauging station 127, it rolls along the inclined rails 128 to an escapement 968. There the wheel seats are lubricated by means which are illustrated as a pair of nozzles 969 and 971.

The wheels roll along the rails 132 and 133 to a pair of wheel escapements 964 and 972 respectively. Other nozzles 973 and 974 to lubricate the wheel bores are located near the escapements 964 and 972, in an area generally indicated by the reference character 134.

Beyond the end of the rails 128 is a cradle 976 into which each axle falls after it passes the escapement 968. This cradle is part of the wheel mounting press and, as described in the Reed application referred to hereinabove, it is desirable that axles be centered as they enter this press. For this purpose a centering device 136 as shown in FIGS. 47 and 48 is provided.

The centering device includes a pair of pistons 977 and 978 located approximately coaxially with the axle as the latter rests on the cradle 976. The pistons are connected by a pair of yokes 979 and 981 to a pair of connecting rods 982 and 983. These connecting rods are joined to a crank 984 that pivots at the center of the centering device 136 so that longitudinal motion of the piston 977 will be accompanied by exactly equal and opposite movement of the other piston 978.

The pistons 977 and 978 are moved back and forth by a pair of hydraulic cylinders 986 and 987. A pair of piston rods 988 and 989 extends from the cylinders 986 and 987 and connect the pistons (not shown) therein to the yokes 979 and 981. A second pair of pistons 991 and 992 is also attached to the yokes 979 and 981 to keep the pistons 977 and 978 properly aligned in their respective bearings. Pistons 977 and 991 are slidably supported in a pair of bearing blocks 993 and 994, and similar bearing blocks 996 and 997 slidably support the pistons 978 and 992.

A frame 998 supports the complete centering mechanism as well as the bars 937 and 938 and the rail 132 on one side and the corresponding rail 133 and bars 999 and 1000 on the other side.

The operation of the centering device 136 and that portion of the wheel and axle conveyers between the wheel tip-up station and the centering device will be described with reference to FIG. 49 in conjunction with FIGS. 42, 47, and 48. As in the case of the wheel tip-up station 129 only components associated with the left side will be described.

When an axle rolls down the rails 128 and strikes the escapement 968, it rests upon the arm of a normally-open switch 1001, closing the switch. When a wheel on the rail 132 also comes to rest on the arm of the switch 961, closing the second pole 961a, a relay 1002 is energized from a voltage source 1003. This relay closes a pair of contacts 1002a and energizes a solenoid valve 1004 that starts the lubricating action of the nozzles 969 and 973 to lubricate both the axle and the wheel.

After a measured amount of lubricant has been applied, a switch 1006 closes and energizes a relay 1007. This relay is kept energized by the contacts 1007a in series with a normally-closed switch 955a, which is the second pole of the switch 955 referred to in the section entitled Wheel Tip-Up Station, so that, after the relay 1007 has become energized by momentary closing of the switch 1006 at the end of the lubricating operation, the relay remains energized until the switch 955a is opened.

Contacts 1007b are closed at the same time as contacts 1007a, thereby energizing two solenoids 1008 and 1009. Solenoid 1008 controls the supply of pressure fluid to an hydraulic cylinder 1011 that opens up the escapement 968 to let the lubricated axle pass through, and solenoid 1009 controls the supply of pressure fluid to a cylinder 1012 to open the wheel escapement 964 to let the lubricated wheel roll on down the rail 132.

As the axle rolls off the end of the rails 128 and falls into the cradle 976, it passes over the arm of and actuates the switch 955 referred to hereinabove. This opens the second pole 955a and de-energizes the relay 1007 and allows the escapements 964 and 968 to close.

A third pole 955b is closed, energizing a relay 1013. This relay is provided with a first pair of instant closing contacts 1013a to keep the relay energized and a second pair of instant closing contacts 1013b to energize a solenoid 1014 that controls the cylinders 986 and 987 to center the axle. Subsequently a pair of delayed action, normally closed contacts open up, de-energizing the relay 1013 and the solenoid 1014 and releasing the centered axle. This completes the centering operation.

In some instances when pressing the wheels on the axle wheel seats proper pressure readings may not be obtained as required to meet specifications. This may be due to the machined texture of the wheel seats which varies with the cutting tools used, the metallurgy of the wheel seats, etc.

Any such trouble can be overcome by burnishing the wheel seats also while the axles are in the burnishing machine and this may be done automatically along the lines used in connection with the burnishing phase described hereinbefore. The present burnishing should be adjusted to flatten the lathe cut peaks without removing the valleys completely. With a proper burnishing of the wheel seats a proper wheel pressing may be obtained in those instances where trouble is experienced in this connection.

Such wheel seat burnishing may be done by causing the burnishing wheels 81 and 82, upon completing the burnishing operations already described, to separate to then traverse to the inner ends of the wheel seats, then to there move into contact with these inner ends and traverse outwardly across to the outer ends of the seats and down the adjacent fillets to some extent. In this way there can be no shoulder of unburnished surface at the beginnings of the wheel seat where the press fits with the wheel bores must start. The burnishing pressure and traverse speed would be adjusted to give the effect described.

What is claimed is:
1. A railroad car axle handling system for aligning mated axles and wheels for subsequent assembly comprising: a conveyer for transporting said railroad car axles along a predetermined path, each of said axles having a machined wheel seat and a bearing journal at each end; an axle gauging station at a point on said path, said station comprising gauging means to measure both wheel seats, respectively, of each axle and to transform the measurements into corresponding first and second control signals; means for actuating said gauging means in response to the delivery thereto of each of said axles on said axle conveyor; a pair of wheel boring machines having controls connected to said gauging means to bore axle holes in a pair of said railroad car wheels, the diameters of said holes being determined by said first and second control signals, respectively; means for releasing each axle from said gauging station to said axle conveyor in response to the boring of said pair of wheels corresponding thereto; aligning means located on said path at a point reached by said axles after passing through said gauging station, said aligning means having wheel-receiving means to receive the pair of bored wheels; wheel conveyers to transport different wheels of said pair of bored wheels from said boring machine to said wheel-receiving means, there to be aligned with the corresponding measured wheel seats, respectively; means for releasing said pair of bored wheels from said boring machines to said wheel conveyers in response to the boring of said pair of wheels and means for activating said aligning means in response to the delivery thereto of each of said axles and the pair of wheels corresponding thereto on their respective conveyors, all said conveyors as to path and rate and said aligning means with wheel receiving means being coordinated so that a given axle in the sequence of axles will be aligned and mated with the proper wheels bored in response thereto.

2. A railroad car axle handling system for aligning mated axles and wheels and for subsequent sequential assembly comprising: a conveyer for transporting said railroad car axles along a predetermined path, each of said axles having a machined wheel seat and a bearing journal at each end; an axle gauging station at a point on said path, said station comprising a pair of gauges to measure, respectively, the two wheel seats of each axle and to transform the measurements into corresponding first and second control signals; means for activating said gauges in response to the delivery thereto of each of said axles on said axle conveyor; a pair of wheel boring machines having controls connected to said gauges, respectively, to bore axle holes in a pair of said railroad car wheels, the diameters of said holes being determined by said first and second control signals, respectively; means for releasing each of said axles from said gauging station to said axle conveyor in response to the boring of said pair of wheels corresponding thereto; wheel tip-up means located on said path at a point reached by said axles after passing through said gauging station, said tip-up means having wheel-receiving means to receive the pair of bored wheels; a pair of wheel conveyers to transport different wheels of said pair of wheels in a generally horizontal position from said boring machines to said wheel-receiving means, there to be tipped up to a generally vertical position alongside the corresponding measured wheel seats, respectively; means for releasing said pair of bored wheels from said boring machines to said wheel conveyers in response to the boring of said pair of wheels; means for activating said tip-up means in response to the arrival adjacent thereto of said pair of bored wheels on said wheel conveyors; wheel and axle aligning and pressing means located adjacent said tip-up means to receive matched wheels and axles therefrom and to align said matched wheels and axles and to press said matched wheels and axles together into a unitary assembly; and means for activating said aligning and pressing means in response to the delivery thereto of each of said axles and the pair of wheels corresponding thereto from said axle conveyor and said tip-up means, respectively, all said conveyors as to path and rate, and said wheel and axle aligning and pressing means being coordinated so that a given axle in the sequence of axles will be aligned, mated, and pressed to the proper wheels bored in response thereto.

3. A railroad car axle handling system for aligning mated axles and wheels and for subsequent sequential assembly comprising: a conveyer for transporting said axles along a predetermined path, each of said axles having a machined wheel seat and a bearing journal at each end; an axle gauging station at a point on said path, said station comprising a pair of gauges to measure, respectively, the two wheel seats of each axle and to transform the measurements into corresponding first and second control signals; means for activating said gauges in response to the delivery thereto of each of said axles on said axle conveyor; first and second wheel boring machines for boring axle holes in said railroad car wheels, each of said boring machines having a control system to control the operation thereof; a pair of incoming wheel conveyers to carry wheels to said boring machines, respectively; a connection between said gauges and the control systems of said boring machines, respectively, to control said boring machines to bore axle holes of diameters corresponding to said first and second boring control signals in a pair of wheels, respectively; means for releasing each of said axles from said gauging station to said axle conveyor in response to the boring of said pair of wheels corresponding thereto; aligning means located on said path at a point reached by said axles after passing through said gauging station, said aligning means having wheel-receiving means to receive the pair of bored wheels; bored wheel conveyers to transport bored wheels from said boring machines to said wheel-receiving means, there to be aligned with the corresponding measured wheel seats, respectively; and a pair of indexing tables, one of said tables being located adjacent each said first boring machine to transport wheels from one of said incoming wheel conveyors to said first boring machine and from said first boring machine to one of said bored wheel conveyors, and the other of said indexing tables being located adjacent said second boring machine to transport wheels from the other of said incoming wheel conveyors to said second boring machine and from said second boring machine to the other of said bored wheel conveyors; means for activating each of said pair of indexing tables in response to the delivery thereto of a wheel on each of said pair of wheel conveyors; means for activating each of said boring machines in response to the transporting of a wheel from the indexing table related thereto to the boring machine; means for releasing said pair of bored wheels from said indexing tables to said bored wheel conveyors in response to the boring of said pair of wheels; and means for activating said aligning means in response to the delivery thereto of each of said axles and the pair of wheels corresponding thereto from their respective conveyors, said conveyors being coordinated in path and rate with said indexing tables so as to align a given axle with the proper wheels bored in response thereto in the sequence of axles.

4. The railroad car axle handling system of claim 3 comprising in addition an elevator at the end of each of said incoming wheel conveyors to lift the wheels into engagement with said indexing tables.

5. The railroad car axle handling system of claim 3 in which said incoming wheel conveyers are displaced approximately 120° around the periphery of said indexing tables from the respective boring machines, and said bored wheel conveyors are spaced 240° from said incoming wheel conveyers, whereby wheels may be engaged by said indexing tables from said incoming wheel conveyers and other wheels may be simultaneously engaged by said indexing tables onto said boring machines and said table may then be rotated 120° to allow wheels to be simultaneously released by said indexing tables onto said boring machines and onto said bored wheel conveyers.

6. The railroad car axle handling system of claim 5 in which each of said indexing tables comprises three sets of wheel-engaging clamps spaced 120° apart and means to control all said clamps simultaneously to engage and disengage said wheels.

7. A railroad car axle handling system for aligning mated axles and wheels for subsequent assembly comprising: a conveyer for transporting said axles sideways along a predetermined path, each of said axles having a machined wheel seat and a bearing journal at each end; an axle gauging station at a point on said path, said station comprising first and second gauges to measure, simultaneously, the two wheel seats of each axle and to transform the measurements into corresponding first and second control signals; means for activating said gauges in response to the delivery of each of said axles on said axle conveyor; first and second wheel boring machines for boring axle holes in two said railroads car wheels simultaneously, each of said boring machines having a boring tool and a control system to control the diameter of hole produced by said tool; a pair of inclined multiple-roller wheel conveyers to carry wheels to said first and second boring machines; means for activating said first and second boring machines in response to the delivery thereto of a wheel on each of said wheel conveyers; a connection between said first and second gauges and the control system of said first and second boring machines, respectively, to control said boring tools to bore axle holes of diameters corresponding to said first and second boring control signals in a pair of wheels; means for releasing each of said axles from said gauging station to said axle conveyor in response to the boring of said pair of wheels corresponding thereto; aligning means located on said path at a point reached by said axles after passing through said gauging station, said aligning means having wheel-receiving means to receive a pair of bored wheels; bored wheel conveyers to transport bored wheels from said boring machines to said wheel-receiving means, there to be aligned with the corresponding measured wheel seats of an axle; and means for releasing said bored wheels from said first and second boring machines to said bored wheel conveyors in response to the boring of said wheels and means for activating said aligning machine in response to the delivery thereto of each of said axles and the pair of wheels corresponding thereto from their respective conveyors, all said conveyors as to path and rate and said aligning means with wheel receiving means being coordinated so that a given axle in the sequence of axles will be aligned and mated with the proper wheels bored in response thereto.

8. A railroad car axle handling system for aligning mated axles and wheels for subsequent assembly comprising: a conveyer for transporting said axles along a predetermined path in a direction perpendicular to the axes of said axles, each of said axles having a machined wheel seat and a bearing journal at each end; an axle gauging station at a point on said path, said station comprising first and second gauges to measure, simultaneously, the two wheel seats of each axle and to transform the measurements into corresponding first and second control signals, and an elevator to move each axle into position to be measured by said gauges; means for activating said gauges in response to the delivery thereto of each of said axles on said axle conveyor; first and second wheel boring machines for boring axle holes in two said railroad car wheels, simultaneously, each of said boring machines having a chuck, a boring tool, and a control system to control the diameter of hole produced by said tool; a pair of inclined multiple-roller wheel conveyers to carry wheels to said first and second boring machines; a connection between said first and second gauges and the control systems of said first and second boring machines, respectively, to adjust said boring tools while an axle is being measured by said gauges to cause said tools to bore axle holes of diameters corresponding to said first and second boring control signals in a pair of wheels; means for releasing each of said axles from said gauging station to said axle conveyor in response to the boring of said pair of wheels corresponding thereto aligning means located on said path at a point reached by said axles after passing through said gauging station, said aligning means having wheel-receiving means to receive a pair of bored wheels; bored wheel conveyers to transport bored wheels from said boring machines to said wheel-receiving means, there to be aligned with the corresponding measured wheel seats of the measured axle; a pair of indexing tables, each of said tables being located between and extending over and clearing the lower end of one of said incoming wheel conveyers, the chuck of one of said boring machines, and one end of one of said bored wheel conveyers; an elevator at the lower end of each of said incoming conveyers to lift wheels into engagement with the corresponding table; an elevator in each of said boring machines to lower said incoming wheels to the chuck of the corresponding machine and to raise bored wheels to engagement with said table; means for activating each of the incoming wheel elevators in response to the delivery thereto of a wheel on each of said pair of wheel conveyors; means for activating said first and second boring machines in response to the transporting of a wheel from the indexing table related thereto to the boring machine; an elevator at the end of each of said bored wheel conveyers to lower bored wheels thereto from the corresponding table; means for releasing said pair of bored wheels from the bored wheel elevator to said bored wheel conveyors in response to the boring of said pair of wheels; and means for activating said aligning means in response to the delivery thereto of each of said axles and the pair of wheels corresponding thereto from their respective conveyors, said conveyers being coordinated in path and rate with said indexing tables and elevators so as to align a given axle with the proper wheels bored in response thereto in the sequence of axles.

9. A railroad car axle handling system for aligning mated axles and wheels for subsequent assembly comprising: a conveyer for transporting said railroad car axles along a predetermined path and with the axes of said axles substantially perpendicular to said path, each of said axles having a machined wheel seat and a bearing journal at each end; an axle gauging station at a point on said path, said station comprising a pair of gauges to measure simultaneously both wheel seats of each axle and to transform the measurements into a pair of corresponding control signals; means for activating said gauges in response to the delivery thereto of each of said axles on said axle conveyor; first and second wheel boring machines for boring axle holes in said railroad car wheels, each of said boring machines having control systems to control the operation thereof; a connection between said control systems and said gauges, respectively, to cause said machines to bore axle holes simultaneously in first and second railroad car wheels, the diameters of said holes being determined by said control signals, respectively; wheel tip-up means located on said path at a point reached by said axles after passing through said gauging station, said tip-up means having horizontal receiving means to receive a pair of bored wheels; first and second horizontal wheel conveyers to transport said wheels from said first and second boring machines, respectively, to said wheel-receiving means adjacent to the corresponding measured wheel seat of said axle, said wheel-receiving means comprising a pair of pivotable beds and an actuating piston connected to said beds to pivot them to a substantially vertical position, and means for releasing said pair of bored wheels from said first and second boring machines to said first and second wheel conveyors in response to the boring of said pair of wheels; and means for activating said tip-up means in response to the delivery thereto of said pair of bored wheels on said first and second wheel conveyors, all said conveyors as to path and rate and said aligning means and said wheel-receiving means and said tip-up means being coordinated so that a given axle in the sequence of axles will be aligned and mated with the proper wheels bored in response thereto.

10. A work handling machine tool system including a plurality of laterally spaced work conveyers, a machine tool located beside a first of said conveyers, means for transferring work from said first conveyer to said tool and means for transferring work from said tool to a second of said conveyers, a second machine tool also located beside said first conveyer, a second means for transferring work from said first conveyer to said second tool, and a second means for transferring work from said tool to said second conveyer, and means for controlling all of said transferring means so that predetermined work may be transferred selectively from said first conveyer to either of said machine tools and transferred from the latter to said second conveyer, each of said transferring means comprising magazine type assemblies for receiving a plurality of work pieces and storing them for transfer at a later time.

11. A work handling machine tool system including a plurality of laterally spaced work conveyers, a machine tool located beside a first of said conveyers, means for transferring work from said first conveyer to said tool and means for transferring work from said tool to a second of said conveyers, a second machine tool also located beside said first conveyer, a second means for transferring work from said first conveyer to said second tool, and a second means for transferring work from said tool to said second conveyer, and means for controlling all of said transferring means so that predetermined work may be transferred selectively from said first conveyer to either of said machine tools and transferred from the latter to said second conveyer, each of said conveyers comprising a reciprocative buggy and said first conveyer including a loading station for its buggy, in each instance said buggy serving both of said machine tools.

12. A work handling machine tool system including a plurality of laterally spaced work conveyers, a machine tool located beside a first of said conveyers, means for transferring work from said first conveyer to said tool and means for transferring work from said tool to a second of said conveyers, a second machine tool also located beside said first conveyer, a second means for transferring work from said first conveyer to said second tool, and a second means for transferring work from said tool to said second conveyer, and means for controlling all of said transferring means so that predetermined work may be transferred selectively from said first conveyer to either of said machine tools and transferred from the latter to said second conveyer, each of said conveyers comprising a reciprocative buggy and said first conveyer including a loading station for its buggy, in each instance said buggy serving both of said machine tools, each of said transferring means comprising magazine type assemblies for receiving a plurality of work pieces and storing them for transfer at a later time.

13. A work handling machine tool system including a plurality of laterally spaced work conveyers, a machine tool located beside a first of said conveyers, means for transferring work from said first conveyer to said tool and means for transferring work from said tool to a second of said conveyers, a second machine tool also located beside said first conveyer, a second means for transferring work from said first conveyer to said second tool, and a second means for transferring work from said tool to said second conveyer, and means for controlling all of said transferring means so that predetermined work may be transferred selectively from said first conveyer to either of said machine tools and transferred from the latter to said second conveyer, a third machine tool beside a third of said conveyers, means for transferring work from said second conveyer to said third tool and means for transferring work from said third tool to said third conveyer.

14. A work handling machine tool system including a plurality of laterally spaced work conveyers, a machine tool located beside a first of said conveyers, means for transferring work from said first conveyer to said tool and means for transferring work from said tool to a second of said conveyers, a second machine tool also located beside said first conveyer, a second means for transferring work from said first conveyer to said second tool, and a second means for transferring work from said tool to said second conveyer, and means for controlling all of said transferring means so that predetermined work may be transferred selectively from said first conveyer to either of said machine tools and transferred from the latter to said second conveyer, a third machine tool beside a third of said conveyers, means for transferring work from said second conveyer to said third tool and means for transferring work from said third tool to said third conveyer, the latter comprising two interspaced simultaneously and synchronously reciprocative buggys, and a fourth machine tool beside said third conveyer and an unloading station for the latter, said third and fourth machine tools and said unloading station being spaced apart the same distance said two buggys of said third conveyer are spaced apart.

15. A railroad car axle handling system for aligning mated axles and wheels for subsequent assembly comprising destination means forming the objective locus for said axles and said wheels, first transportation means for moving said axles along a predetermined path at a predetermined rate toward said destination means, gauging means at a point on said path adapted to measure both wheel seats of each of said axles in sequential transit past said point and to transform the wheel seat measurement for each axle end into a first and second corresponding control signal respectively, means for activating said gauge means in response to the delivery thereto of each of said axles on said first transportation means, a pair of wheel boring machines each adapted to bore a hole in one of said wheels in response to one of said control signals and to control the diameter of said boring to correspond to said one of said control signals, second transportation means for moving bored wheels from said boring machines toward said destination means along a predetermined path and at a predetermined rate, means for releasing said bored wheels from said boring machines to said second transportation means in response to the boring of said wheels, the paths and rates of both said first and said second transportation means being coordinated so that when a given axle reaches said destination means the proper wheels bored in response thereto will also reach said destination means in sequence, said destination means having axle receiving means and wheel receiving means adapted coordinately to receive said axles and said wheels in proper sequence, and to align them for assembly, and means for activating said axle receiving means and wheel receiving means in response to the delivery thereto of each of said axles and said wheels on said first and second transportation means, respectively.

16. A railroad car axle handling system for aligning mated axles and wheels for subsequent assembly according to claim 15 wherein said destination means comprises axle receiving means, and wheel tip-up means having a pair of wheel receiving means, said wheel receiving means and said axle receiving means being adapted to cooperate with said first and second coordinated transportation means to bring mated axles and wheels simultaneously into proximity, and said wheel tip-up means being adapted to align said mated wheels and axles by tipping said wheels up from the proximity of the mated axle in the sequence of axles to a mating approach between said axle wheel seats and said wheel bores in response to the attainment of said proximity.

17. A railroad car axle handling system for aligning mated axles and wheels and for subsequently assembling them comprising destination means forming the objective locus for said axles and said wheels, first transportation means for moving said axles along a predetermined path at a predetermined rate toward said destination means, gauging means on a point on said path adapted to measure both wheel seats of each of said axles in sequential transit past said point and to transform the wheel seat measurement for each axle end into a first and second corresponding control signal respectively, means for activating said gauging means in response to the delivery thereto of each of said axles on said first transportation means, a pair of wheel boring machines each adapted to bore a hole in one of said wheels in response to one of said control signals and to control the diameter of said boring to correspond to said one of said control signals, second transportation means for moving bored wheels from said boring machines toward said destination means along a predetermined path and at a predetermined rate, means for releasing said bored wheels from said boring machines to said second transportation means in response to the boring of said wheels, the paths and rates of both said first and said second transportation means being coordinated so that when a given axle reaches said destination means the proper wheels bored in response thereto will also reach, said destination means in sequence, said destination means having axle receiving means and wheel tip-up means with wheel receiving means and wheel and axle pressing means, said wheel receiving means and said axle receiving means being adapted to cooperate with said first and second coordinated transportation means to bring mated axles and wheels simultaneously into proximity, said wheel tip-up means being adapted to align said mated wheels and axles by tipping said wheels up from the proximity of the mated axle in the sequence of axles to a mating approach between said axle wheel seats and said wheel bores in response to the attainment of said proximity, and said axle and wheel pressing means being adapted to press said wheels from said mating approach to said axle wheel seats to a condition of unitary assembly therewith, said pressing being in response to said mating approach and in coordinated sequence with said first and second transportation means so as to complete said pressing before the arrival at said destination means of the succeeding of said sequence of axles and mated bored wheels.

18. A railroad wheel shop machine including the combination of means for feeding railroad axles successively to first and second stations, each said axle having wheel seats not necessarily of the same sizes at the opposite ends of the axle, individual means for measuring each of said wheel seats individually at said first station, means for activating said measuring means in response to the feeding thereto of said axles, at least two railroad wheel hub boring mills each having a bore size control means, means for rendering one of said control means responsive to one of said measuring means and the other of said control means responsive to the other of said measuring means, means for releasing said axle from said measuring means in response to the boring of said wheels, means for feeding a railroad wheel bored by one of said mills to said second station at a location adjacent to the railroad axle's wheel seat measured for the hub boring of that wheel end when that axle is at said second station, means for correspondingly feeding a railroad wheel bored by the other of said mills to said second station at a location adjacent to the other of that railroad axle's wheel seats measured for the hub boring of this second named wheel when that axle is at said second station, and means for releasing said bored wheels from each of said boring mills in response to the boring of said wheels; whereby to bring a sequence of axles and a sequence of wheels into congruence so that each axle is aligned with the mating wheels bored in response thereto for subsequent press assembly.

19. A railroad wheel shop machine including the combination of a plurality of means for automatically receiving a railroad axle and measuring at least the opposite journal and wheel seats thereof and machining each journal and seat individually in response to their measured initial sizes and thereafter delivering that axle, means for retaining a plurality of said axles in storage and for feeding them individually to either of the first named means automatically in response to the delivery of an axle thereby, means for automatically receiving a railroad axle and burnishing at least the opposite journals thereof under predetermined pressures applied independently of the journal sizes with respect to each other and thereafter delivering that axle, means for receiving and storing a plurality of said axles delivered by said machining means and feeding them individually to said burnishing means automatically in response to the delivery of an axle thereby, means for feeding each of said axles delivered by said burnishing means successively to first and second stations, means for measuring individually the opposite wheel seats of each of said axles individually at said first station, means for activating said measuring means in response to the delivery thereto of each of said axles from said axle feeding means, at least two means for automatically receiving railroad wheels and boring their hubs and delivering said wheels, one of said two means being automatically responsive to said measuring means to bore a wheel bore size corresponding to the measure of one axle wheel seat and the other of said two means being automatically responsive to said measuring means to bore a wheel bore size corresponding to the measure of the other axle wheel seat of the same axle, said two means being simultaneously actuated by the measuring of an axle at said first station to receive and bore and deliver the wheels, means for feeding the bored wheels from said two means to said second station in each instance with each wheel located adjacent to the wheel seat for which its bore was measured by said measuring means when the axle having the measured seat is at said second station, and mean for releasing said wheels to said wheel feeding means in response to the boring of said wheels.

20. A railroad wheel shop machine according to claim 19 wherein said second station comprises axle receiving means, and wheel tip-up means having a pair of wheel receiving means, said wheel receiving means and said axle receiving means being adapted to cooperate with said burnished axle feeding means and said bored wheel feeding means to bring mated axles and wheels simultaneously into proximity, and said wheel tip-up means being adapted to align said mated wheels and axles by tipping said wheels up from the proximity of the mated axle in the sequence of axles to a mating approach between said axle wheel seats and said wheel bores in response to the attainment of said proximity.

21. A railroad wheel shop machine according to claim 19 wherein said second station comprises axle receiving means, and wheel tip-up means with wheel receiving means and wheel and axle pressing means, said wheel receiving means and said axle receiving means being adapted to cooperate with said burnished axle feeding means and said bored wheel feeding means to bring mated axles and wheels simultaneously into proximity, said wheel tip-up means being adapted to align said mated wheels up from the proximity of the mated axle in the sequence of axles to a mating approach between said axle wheel seats and said wheel bores in response to the attainment of said proximity, and said axle and wheel pressing means being adapted to press said wheels from said mating approach to said axle wheel seats to a condition of unitary assembly therewith, said pressing being in response to said mating approach and in coordinated sequence with said burnished axle feeding means and said bored wheel feeding means so as to complete said pressing before the arrival at said second station of the succeeding of said sequence of axles and mated bored wheels.

22. A railroad wheel shop machine including the combination of a plurality of first means for automatically receiving a railroad axle and measuring at least the opposite journal and wheel seats thereof and machining each journal and seat individually in response to their measured initial sizes and thereafter delivering that axle, second means for retaining a plurality of said axles in storage and for feeding them individually to either of said first means automatically in response to the delivery of an axle thereby, third means for automatically receiving a railroad axle and burnishing at least the opposite journals thereof under predetermined pressures applied independently of the journal sizes with respect to each other and thereafter delivering that axle, means for activating said third means in response to the delivery of an axle from said second means, fourth means for receiving and storing a plurality of machined axles delivered by said first means and automatically feeding them individually to said third means for burnishing in response to the delivery of an axle by said third means, fifth means for feeding each of said burnished axles delivered by said third means successively past a first station in transit and to a second station in response to the delivery of an axle from said second station, said second, fourth and fifth means each further comprising an endless delivery chain for delivering said axles, an axle carrying buggy affixed to said chain, motor means for driving said chain in either direction, means for starting said chain in a delivery direction when an axle is delivered to said buggy, means for stopping said chain when said loaded buggy has reached its destination, and means for starting said chain in a direction reverse of said delivery direction when said axle carrying buggy is unloaded so as to return said buggy to reload with a succeeding axle.

23. A railroad wheel shop machine according to claim 22 further comprising means for measuring individually the opposite wheel seats of each of said axles individually at said first station, at least two means for automatically receiving railroad wheels and boring their hubs and delivering said wheels, one of said two means being automatically responsive to said measuring means to bore a wheel bore size corresponding to the measure of one axle wheel seat and the other of said two means being automatically responsive to said measuring means to bore a wheel bore size corresponding to the measure of the other axle wheel seat of the same axle, said two means being simultaneously actuated by the measuring of an axle at said first station to receive and bore and deliver the wheels, means for activating the feeding of said axle from said first station in response to the boring of said wheels, means for feeding the bored wheels from said two means to said second station in each instance with each wheel located adjacent to the wheel seat for which its bore was measured by said measuring means when the axle housing the measured seat is at said second station and means for activating the feeding means for said bored wheels in response to the boring of said wheels.

24. A railroad wheel shop machine according to claim 23 wherein said plurality of first means comprises a plurality of relays to indicate the readiness of each of said first means to receive axles, contacts associated with each of said relays to be energized thereby, a switch located at each of said first means, axle carrying means having a drive motor and adapted to pass each of said first means in turn and to thereby energize each of said switches in turn, a connection from each of said switches to said motor adapted to stop said motor when said axle carrying means reaches each of said first means, and a connection between said contacts of each of said relays and the switches at the other of said first means to by-pass the switches at the other of said first means when such other first means are machining an axle.

References Cited in the file of this patent

UNITED STATES PATENTS

| | | |
|---|---|---|
| 1,054,557 | Jensenius | Feb. 25, 1913 |
| 1,091,457 | Longaker | Mar. 24, 1914 |
| 1,094,391 | Longaker | Apr. 21, 1914 |
| 1,137,643 | Longaker | Apr. 27, 1915 |
| 1,196,963 | Mahr | Sept. 5, 1916 |
| 1,206,528 | Goddu | Nov. 28, 1916 |
| 1,502,474 | Kucera | July 22, 1924 |
| 1,515,347 | Kucera | Nov. 11, 1924 |
| 1,707,905 | Derbyshire | Apr. 2, 1929 |
| 1,794,424 | Smith | Mar. 3, 1931 |
| 1,875,423 | Daniels | Sept. 6, 1932 |
| 1,923,752 | Scofield | Aug. 22, 1933 |
| 1,991,231 | Shiffman | Feb. 12, 1935 |
| 2,139,403 | Cole | Dec. 6, 1938 |
| 2,202,018 | McCutcheon | May 28, 1940 |
| 2,352,726 | Maulding | July 4, 1944 |
| 2,445,498 | Schurr | July 20, 1948 |
| 2,559,360 | Kurzweil | July 3, 1951 |
| 2,585,559 | Lakso | Feb. 12, 1952 |
| 2,792,736 | Oster | May 21, 1957 |
| 2,804,961 | Carter | Sept. 3, 1957 |
| 2,809,539 | Hennessy | Oct. 15, 1957 |
| 2,817,991 | Richet | Dec. 31, 1957 |
| 2,842,987 | Schafer | July 15, 1958 |
| 2,844,053 | Wagner | July 22, 1958 |
| 2,889,912 | Franklin | June 9, 1959 |
| 2,906,012 | Rothfuchs | Sept. 29, 1959 |
| 2,934,819 | Sorensen | May 3, 1960 |
| 3,037,402 | Miller | June 5, 1962 |
| 3,050,837 | Reed | Aug. 28, 1962 |

FOREIGN PATENTS

| | | |
|---|---|---|
| 503,562 | Germany | July 24, 1930 |